(12) United States Patent
Sleeman

(10) Patent No.: US 11,880,804 B1
(45) Date of Patent: Jan. 23, 2024

(54) SYSTEM AND METHOD FOR AUTOMATED INVENTORY, TRANSPORT, MANAGEMENT, AND STORAGE CONTROL IN HYDRAULIC FRACTURING OPERATIONS

(71) Applicant: PROP SENSE CANADA LTD., Edmonton (CA)

(72) Inventor: Marlea Sleeman, Edmonton (CA)

(73) Assignee: Prop Sense Canada Ltd., Alberta (CA)

( * ) Notice: Subject to any disclaimer, the term of this patent is extended or adjusted under 35 U.S.C. 154(b) by 163 days.

(21) Appl. No.: 17/243,322

(22) Filed: Apr. 28, 2021

Related U.S. Application Data

(60) Provisional application No. 63/017,325, filed on Apr. 29, 2020.

(51) Int. Cl.
G06Q 10/087 (2023.01)

(52) U.S. Cl.
CPC .................................. *G06Q 10/087* (2013.01)

(58) Field of Classification Search
None
See application file for complete search history.

(56) References Cited

U.S. PATENT DOCUMENTS

| | | | |
|---|---|---|---|
| 3,664,072 A | 5/1972 | Lieckfeld | |
| 5,199,589 A | 4/1993 | Noble | |
| 5,897,012 A | 4/1999 | Sortwell | |
| 6,968,946 B2 | 11/2005 | Shuert | |
| 7,114,909 B2 | 10/2006 | McCrory et al. | |
| 7,140,516 B2 | 11/2006 | Bothor et al. | |
| 7,252,309 B2 | 8/2007 | Eng Soon et al. | |
| 7,309,205 B2 | 12/2007 | McCrory et al. | |
| 7,434,721 B2 | 10/2008 | Feltz | |
| 7,997,623 B2 | 8/2011 | Williams | |
| 8,231,316 B2 | 7/2012 | Ness | |
| D688,349 S | 8/2013 | Oren et al. | |
| D688,350 S | 8/2013 | Oren et al. | |
| D688,351 S | 8/2013 | Oren et al. | |
| D688,772 S | 8/2013 | Oren et al. | |
| 8,505,780 B2 | 8/2013 | Oren | |

(Continued)

FOREIGN PATENT DOCUMENTS

| | | |
|---|---|---|
| CA | 2450604 C | 4/2011 |
| CA | 2860091 A1 | 6/2013 |

(Continued)

*Primary Examiner* — Fateh M Obaid
(74) *Attorney, Agent, or Firm* — Foley & Lardner LLP

(57) ABSTRACT

A system for managing proppant inventory includes a plurality of silos, each silo having a sensor to sense a proppant level of proppant stored therein. The system also determines an amount of proppant that is expected to become available, and automatically creates and sends an order to request additional proppant upon determining that the combination of the proppant level within the at least one of the plurality of silos and the amount of proppant that is expected to become available is less than a predetermined threshold or expected to fall below the predetermined threshold. The system also automatically selects one or more of the plurality of silos to unload the additional proppant into based upon the proppant level in each of the plurality of silos at the time of unloading the additional proppant and at least one of a user preference parameter or historical data from a previous operation.

29 Claims, 28 Drawing Sheets

(56) References Cited

U.S. PATENT DOCUMENTS

| | | |
|---|---|---|
| 8,585,341 B1 | 11/2013 | Oren et al. |
| 8,616,370 B2 | 12/2013 | Allegretti et al. |
| 8,651,792 B2 | 2/2014 | Friesen |
| 8,668,430 B2 | 3/2014 | Oren et al. |
| 8,820,560 B2 | 9/2014 | Nolan |
| 8,827,118 B2 | 9/2014 | Oren |
| 8,887,914 B2 | 11/2014 | Allegretti et al. |
| 8,915,691 B2 | 12/2014 | Mintz |
| 8,926,252 B2 | 1/2015 | McIver et al. |
| 8,931,996 B2 | 1/2015 | Friesen et al. |
| 8,939,697 B2 | 1/2015 | Herman et al. |
| 8,944,740 B2 | 2/2015 | Teichrob et al. |
| 9,016,378 B2 | 4/2015 | Zhang et al. |
| 9,051,801 B1 | 6/2015 | Mintz |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,315,294 B2 | 4/2016 | Herman et al. |
| 9,346,583 B2 | 5/2016 | Ness |
| 9,421,899 B2 | 8/2016 | Oren |
| 9,428,094 B2 | 8/2016 | Herman et al. |
| 9,428,348 B2 | 8/2016 | Teichrob et al. |
| 9,440,785 B2 | 9/2016 | Oren et al. |
| 9,499,335 B2 | 11/2016 | McIver et al. |
| 9,499,348 B2 | 11/2016 | Teichrob et al. |
| 9,580,238 B2 | 2/2017 | Friesen et al. |
| D783,772 S | 4/2017 | Stegemoeller et al. |
| 9,643,789 B2 | 5/2017 | Teichrob et al. |
| 9,650,216 B2 | 5/2017 | Allegretti |
| 9,688,178 B2 | 6/2017 | Pham |
| 9,718,610 B2 | 8/2017 | Oren |
| 9,758,082 B2 | 9/2017 | Eiden et al. |
| 9,771,224 B2 | 9/2017 | Oren et al. |
| 9,776,813 B2 | 10/2017 | McMahon |
| 9,790,022 B2 | 10/2017 | Sheesley et al. |
| 9,809,381 B2 | 11/2017 | Oren et al. |
| 9,840,371 B2 | 12/2017 | Ho et al. |
| 9,862,538 B2 | 1/2018 | Pham et al. |
| 9,878,651 B2 | 1/2018 | Herman et al. |
| 9,938,093 B2 | 4/2018 | Sherwood et al. |
| 9,957,108 B2 | 5/2018 | Ho et al. |
| D819,920 S | 6/2018 | Friesen |
| D824,131 S | 7/2018 | Friesen |
| 10,017,686 B1* | 7/2018 | Babcock .................. C04B 35/14 |
| 10,059,535 B2 | 8/2018 | Herman et al. |
| 10,065,814 B2 | 9/2018 | Herman et al. |
| 10,150,612 B2 | 12/2018 | Pham |
| 2005/0230390 A1 | 10/2005 | Glenn |
| 2008/0179054 A1 | 7/2008 | McGough et al. |
| 2008/0179324 A1 | 7/2008 | McGough et al. |
| 2010/0187192 A1 | 7/2010 | Ness |
| 2013/0004272 A1 | 1/2013 | Mintz |
| 2013/0108402 A1 | 5/2013 | Herman et al. |
| 2013/0142601 A1 | 6/2013 | McIver et al. |
| 2013/0206411 A1 | 8/2013 | Zhang et al. |
| 2013/0206415 A1 | 8/2013 | Sheesley |
| 2013/0206753 A1 | 8/2013 | Zhang et al. |
| 2013/0209204 A1 | 8/2013 | Sheesley |
| 2014/0020892 A1 | 1/2014 | Oren et al. |
| 2014/0023465 A1 | 1/2014 | Oren et al. |
| 2014/0041322 A1 | 2/2014 | Pham et al. |
| 2014/0044508 A1 | 2/2014 | Luharuka et al. |
| 2014/0083554 A1 | 3/2014 | Harris |
| 2014/0097182 A1 | 4/2014 | Sheesley |
| 2014/0109992 A1 | 4/2014 | Ness |
| 2014/0166647 A1 | 6/2014 | Sheesley et al. |
| 2014/0169920 A1 | 6/2014 | Herman et al. |
| 2014/0203046 A1 | 7/2014 | Allegretti |
| 2014/0246341 A1 | 9/2014 | Oren |
| 2014/0286716 A1 | 9/2014 | Cochrum et al. |
| 2014/0299226 A1 | 10/2014 | Oren et al. |
| 2014/0305769 A1 | 10/2014 | Eiden et al. |
| 2014/0309936 A1* | 10/2014 | Abbassian ............ E21B 47/005 702/6 |
| 2015/0044003 A1 | 2/2015 | Pham |
| 2015/0044004 A1 | 2/2015 | Pham et al. |
| 2015/0086307 A1 | 3/2015 | Stefan |
| 2015/0166135 A1 | 6/2015 | Pham |
| 2015/0166260 A1 | 6/2015 | Pham et al. |
| 2015/0253459 A1* | 9/2015 | Aldridge .................. G01V 3/26 702/7 |
| 2015/0284194 A1 | 10/2015 | Oren et al. |
| 2015/0375930 A1 | 12/2015 | Oren et al. |
| 2016/0009489 A1 | 1/2016 | Lofton et al. |
| 2016/0031658 A1 | 2/2016 | Oren et al. |
| 2016/0039433 A1 | 2/2016 | Oren et al. |
| 2016/0130095 A1 | 5/2016 | Oren et al. |
| 2016/0185522 A1 | 6/2016 | Herman et al. |
| 2016/0236880 A1 | 8/2016 | Herman et al. |
| 2016/0244268 A1 | 8/2016 | Ritter |
| 2016/0264354 A1 | 9/2016 | Herman et al. |
| 2017/0021318 A1 | 1/2017 | McIver et al. |
| 2017/0291780 A1* | 10/2017 | Sherwood ............ B65G 11/146 |
| 2017/0297835 A1 | 10/2017 | Friesen |
| 2017/0313499 A1 | 11/2017 | Hughes et al. |
| 2017/0334654 A1 | 11/2017 | Friesen |
| 2017/0364607 A1* | 12/2017 | Kaushik .................. C09K 8/00 |
| 2018/0002066 A1 | 1/2018 | Allegretti et al. |
| 2018/0002120 A1 | 1/2018 | Allegretti et al. |
| 2018/0065814 A1 | 3/2018 | Eiden et al. |
| 2018/0072491 A1 | 3/2018 | D'Agostino et al. |
| 2018/0075547 A1 | 3/2018 | Pere et al. |
| 2018/0201437 A1 | 7/2018 | Surjaatmadja et al. |
| 2018/0257857 A1 | 9/2018 | Fisher et al. |
| 2018/0297503 A1 | 10/2018 | Hughes et al. |
| 2019/0264517 A1* | 8/2019 | Chong ................ B01F 35/7176 |
| 2021/0238983 A1* | 8/2021 | Singh .................... E21B 47/107 |
| 2021/0404303 A1* | 12/2021 | Hindman ................ E21B 21/06 |
| 2022/0106183 A1* | 4/2022 | Richmond ............... B67D 7/30 |

FOREIGN PATENT DOCUMENTS

| | | |
|---|---|---|
| CA | 2805469 A1 | 8/2013 |
| CA | 2510424 C | 1/2014 |
| CA | 2880909 A1 | 2/2014 |
| CA | 2881142 A1 | 2/2014 |
| CA | 2732170 C | 3/2014 |
| CA | 2858452 A1 | 2/2015 |
| CA | 2832169 A1 | 5/2015 |
| CA | 2936005 A1 | 8/2015 |
| CA | 2777284 C | 10/2015 |
| CA | 2852719 A1 | 11/2015 |
| CA | 2718595 C | 12/2015 |
| CA | 2893686 A1 | 12/2015 |
| CA | 2953504 A1 | 12/2015 |
| CA | 2747116 C | 5/2016 |
| CA | 2885668 A1 | 9/2016 |
| CA | 2932588 A1 | 12/2016 |
| CA | 2932589 A1 | 12/2016 |
| CA | 2745682 C | 7/2017 |
| CA | 2851290 C | 7/2017 |
| CA | 2945454 A1 | 12/2017 |
| CA | 2830145 C | 3/2018 |
| CA | 2971339 C | 7/2018 |
| CA | 2963102 C | 8/2018 |
| CA | 2964009 C | 9/2018 |
| WO | WO-2014/028317 A1 | 2/2014 |
| WO | WO-2016/023079 A1 | 2/2016 |
| WO | WO-2017/049264 A1 | 3/2017 |
| WO | WO-2018/052961 A1 | 3/2018 |
| WO | WO-2020/019064 A1 | 1/2020 |

* cited by examiner

1220

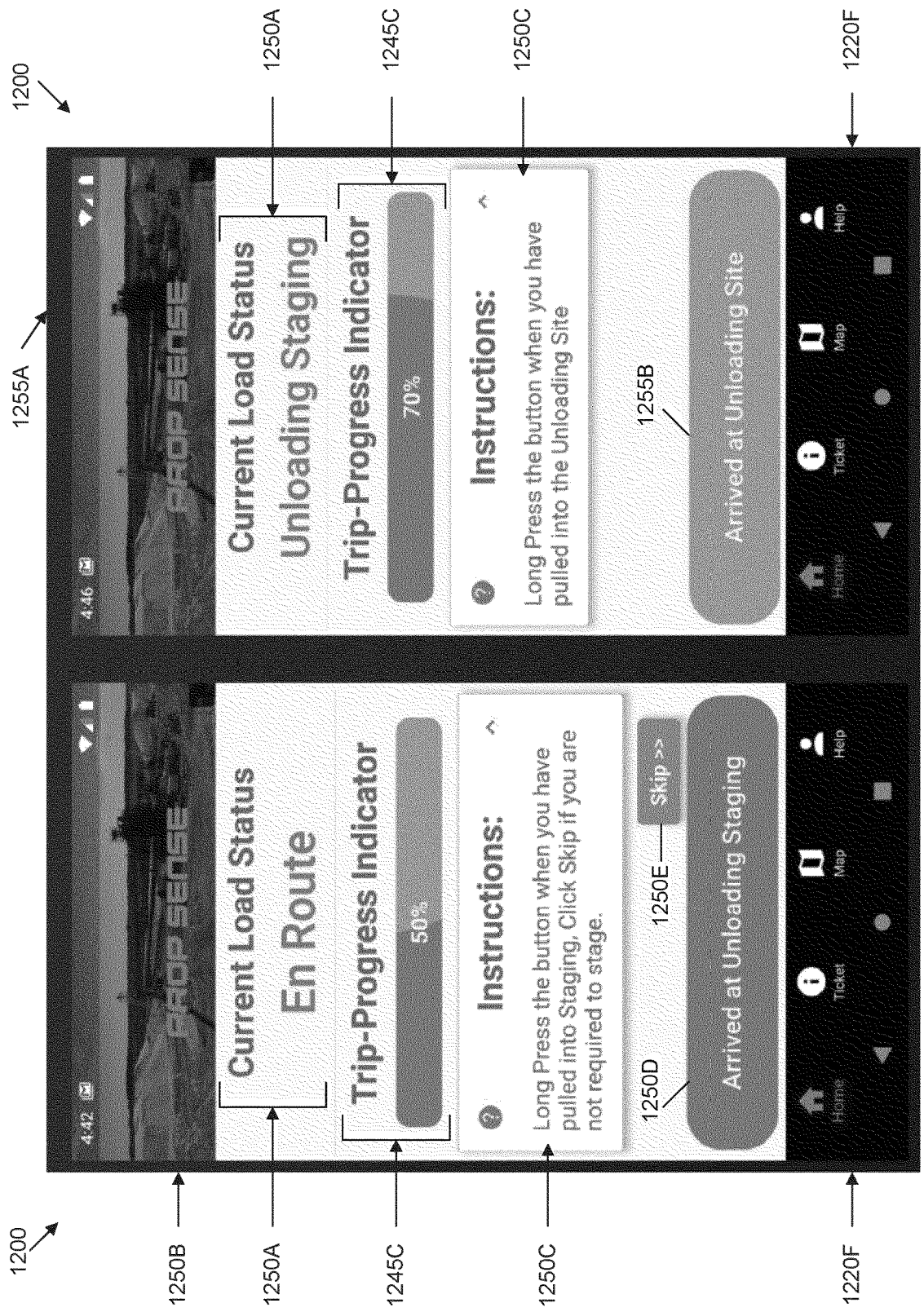

SYSTEM AND METHOD FOR AUTOMATED INVENTORY, TRANSPORT, MANAGEMENT, AND STORAGE CONTROL IN HYDRAULIC FRACTURING OPERATIONS

CROSS-REFERENCE TO RELATED APPLICATIONS

The present applications claims priority to and benefit of U.S. Provisional Application No. 63/017,325, filed on Apr. 29, 2020, the entire disclosure of which is incorporated herein by reference.

FIELD

The present disclosure relates to a system and method for automated inventory, transport, management, and store control in a variety of applications including hydraulic fracturing operations.

BACKGROUND

In a hydraulic fracturing (e.g., fracking) operation in the oil and gas industry, a fracturing fluid including granular material such as sand, known as proppant, is pumped into a well to create and prop open fractures in the ground. Hydraulic fracturing operations are commonly performed in remote locations known as wellsites. Each wellsite requires large amounts of one or more types of granular material, typically in excess of fifteen million pounds and often more than one hundred million pounds, to be readily available on demand, and which consumption typically occurs over a number of days or weeks. While a certain volume of granular materials is typically stored onsite at the wellsite in relocatable storage facilities, it is unusual for these storage facilities to accommodate more than approximately ten percent of total wellsite proppant requirements for the project. Thus, a continuous hauling of proppant to replenish the depleted volumes is needed. Further, daily consumption of proppant may exceed the total volume accommodated in the storage facility, effectively requiring that the consumer "turn the material storage volume" one or more times per day. Existing mechanisms to predict and manage proppant storage at the wellsite are limited in the way those mechanisms are configured and how they operate.

SUMMARY

The systems, methods, and devices of this disclosure each have several innovative aspects, no single one of which is solely responsible for all of the desirable attributes disclosed herein.

Various aspects of the disclosure may now be described with regard to certain examples and embodiments, which are intended to illustrate but not limit the disclosure. Although the examples and embodiments described herein may focus on, for the purpose of illustration, specific systems and processes, one of skill in the art may appreciate the examples are illustrative only, and are not intended to be limiting.

In accordance with some embodiments of the present disclosure, a system is disclosed. The system includes a plurality of silos, each of the plurality of silos having a sensor configured to sense a proppant level of proppant stored therein and a proppant management system. The proppant management system includes a memory to store sensor data received from the sensor of each of the plurality of silos and a user preference parameter and historical data from a previous operation, and a processor configured to determine, based on the sensor data, the proppant level within at least one of the plurality of silos, determine an amount of proppant that is expected to become available, automatically create an order and send the order to a proppant carrier to request additional proppant upon determining that the combination of the proppant level within the at least one of the plurality of silos and the amount of proppant that is expected to become available is less than a predetermined threshold or expected to fall below the predetermined threshold, and automatically select one or more of the plurality of silos to unload the additional proppant into. The processor is also configured to send instructions to unload the additional proppant into the one or more of the plurality of silos that are selected. The automatic selection of the one or more of the plurality of silos is based upon the proppant level in each of the plurality of silos at the time of loading the additional proppant and at least one of the user preference parameter or the historical data.

In accordance with another aspect of the present disclosure, a method is disclosed. The method includes determining, by a proppant management system, that a proppant level within at least one of a plurality of silos is below a predetermined threshold. The proppant level is determined based upon sensor data received from a sensor mounted at each of the plurality of silos. The method also includes determining, by the proppant management system, an amount of proppant that is expected to become available, automatically creating, by the proppant management system, an order and sending the order to a proppant carrier for requesting additional proppant upon determining that the combination of the proppant level within the at least one of the plurality of silos and the amount of proppant that is expected to become available is less than a predetermined threshold or expected to fall below the predetermined threshold, automatically selecting, by the proppant management system, one or more of the plurality of silos to unload the additional proppant into, and sending, by the proppant management system, instructions to unload the additional proppant into the one or more of the plurality of silos that are selected. The automatic selection of the one or more of the plurality of silos is based upon the proppant level in each of the plurality of silos at the time of loading the additional proppant and at least one of a user preference parameter or historical data from a previous operation.

In accordance with yet another aspect of the present disclosure, a non-transitory computer-readable media having computer-readable instructions stored thereon is disclosed. The computer-readable instructions when executed by a processor of a proppant management system cause the processor to determine that a proppant level within at least one of a plurality of silos is below a predetermined threshold. The proppant level is determined based upon sensor data received from a sensor mounted at each of the plurality of silos. The computer-readable instructions also cause the processor to determine an amount of proppant that is expected to become available, automatically create an order and send the order to a proppant carrier for requesting additional proppant upon determining that the combination of the proppant level within the at least one of the plurality of silos and the amount of proppant that is expected to become available is less than a predetermined threshold or expected to fall below the predetermined threshold, automatically select one or more of the plurality of silos to load the additional proppant into, and send instructions to load the additional proppant into the one or more of the plurality of silos that are selected. The automatic selection of the one or more of the plurality of silos is based upon the proppant level in each of the plurality of silos at the time of loading the additional proppant and at least one of a user preference parameter or historical data from a previous operation.

The foregoing summary is illustrative only and is not intended to be in any way limiting. In addition to the illustrative aspects, embodiments, and features described above, further aspects, embodiments, and features may become apparent by reference to the following drawings and the detailed description.

Figure 1:
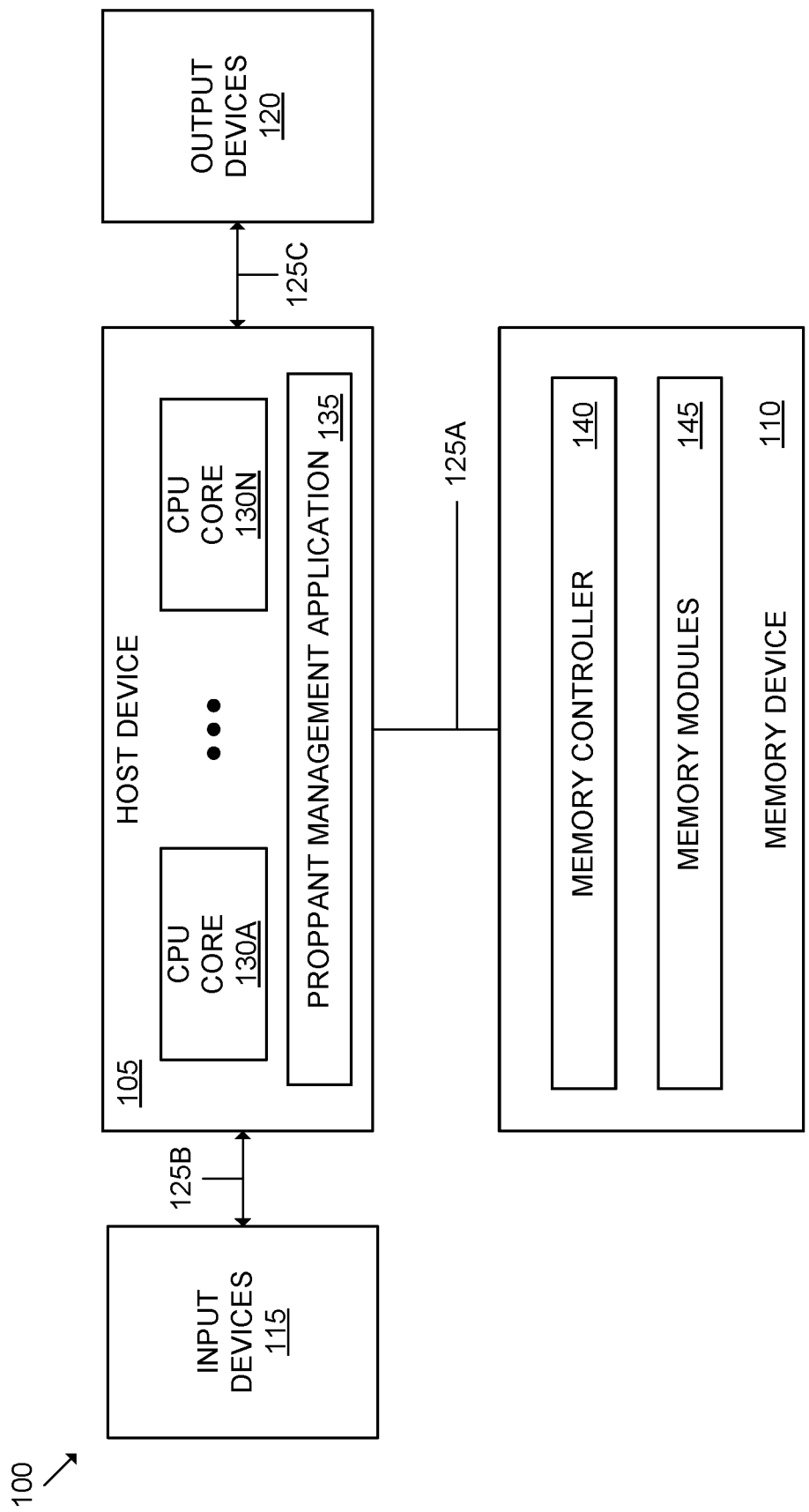
FIG. 1 is an example block diagram of a computing system implementing a proppant management application, in accordance with some embodiments of the present disclosure.

The foregoing and other features of the present disclosure may become apparent from the following description and appended claims, taken in conjunction with the accompanying drawings. Understanding that these drawings depict only several embodiments in accordance with the disclosure and are therefore, not to be considered limiting of its scope, the disclosure may be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It may be readily understood that the aspects of the present disclosure, as generally described herein, and illustrated in the figures, may be arranged, substituted, combined, and designed in a wide variety of different configurations, all of which are explicitly contemplated and made part of this disclosure.

The present disclosure provides an automated inventory and ticket management system to receive, coordinate, and manage job requests at a wellsite where a fracking operation is being performed. Although the present disclosure has been described with respect to a wellsite, the disclosure is applicable to warehouses, distribution centers, ready mix plants, asphalt plants, factories, order processing facilities, distribution centers, office buildings, or the like associated with a hydraulic fracturing operation. Further, although the present disclosure has been described with respect to a fracking operation, the disclosure may be applicable to other types of applications where automatic delivery, order, and management of goods or services is needed.

In a fracking operation, there are a number of separate companies (collectively referred to herein as "stakeholders") involved in the proppant supply, logistics, and consumption. For example, a proppant material supplier (referred to herein as "supplier") may supply the proppant to the wellsite, a carrier (e.g., a transport haul contractor) may transport the proppant from the proppant material supplier to the wellsite, a wellsite proppant storage operator may monitor the inventory of the proppant at the wellsite, a pressure pumping contractor or blender operator may use the proppant at the wellsite during the fracking operation, and the exploration and production company (referred to herein as a "customer") may commission the fracking operation or "job." The wellsite proppant storage operator and the blender operator are collectively referred to herein as "operator." Communication and collaboration between each of these stakeholders is key to ensuring that the fracking operation runs smoothly. Current systems do not permit these stakeholders to have access to all necessary information in real time, and/or to make decisions timely in a coordinated manner.

Further, when the wellsite runs out of proppant, any downtime at the wellsite while waiting for additional proppant to be replenished is expensive. For example, in some instances, each hour that a wellsite may be shut down waiting for more proppant may cost thousands of dollars. On the other hand, oversupplying proppant to the wellsite creates unnecessary waiting time for transport units (also referred to herein as "transport haulers," "transports," or the like), congestion and safety risk at the wellsite from the transport units waiting at the wellsite or nearby staging areas. Thus, effective management of proppant inventory and supply, including accurate predictions of proppant consumption volumes is necessary to the smooth operation at the wellsite. Furthermore, it is common for suppliers to provide transport haulers with loading times at the supplier's facilities as a way to manage production inventory, to manage transport loading capacity and to minimize transport demurrage associated with inefficient load scheduling. Managing these loading times together with the consumption demand needs at the wellsite, which may be many hours away, requires many personnel to calculate and then manage in order to meet the demands at the beginning and end of the transport. The intensity of the transport requirements, factored with the high consumption requirements, numerous companies and their personnel involved, long haul distances, limited loading opportunities at the supply source, limited storage volumes, human errors, typical content of third party hauling contractors, and unexpected sudden delays require many personnel to be involved in the management of inventory of proppant at the wellsite, and the corresponding transportation requirements to keep the storage system filled to desired levels. Yet, the more people that get involved in the decisions typically decreases the chance of managing the inventory and dispatch optimally, and leaves the various stakeholders to have conflict over who is responsible to pay for costs resulting demurrage or Non-Productive Time ("NPT").

Wellsites may have between 600 and 2000 tons of storage for proppant, which may be split between two or three types of proppant. The storage and use of multiple proppants complicates each individual inventory and dispatch requirements particularly when they are compounded by the factors listed here below:

There may be occurrences at wellsites which may suddenly interrupt the consumption of the proppant necessitating changes to the dispatch of transports enroute to the wellsite, as well as transports which are dispatched from the carrier but not yet loaded at the supplier. To further complicate managing proppant storage at the wellsite is that the operator may prefer that no proppant be loaded into a storage compartment (e.g., silo) at the same time proppant is being unloaded from so accurate control and measurement of the consumption may be achieved. Consumption of proppant may be rapid such that the inventory may be "turned" as often as five times per day, which means that there is no room for error in judgment of the people managing the inventory. Further, transport haul distances may exceed twenty-four hours round trip, which means that substantial volumes of proppant may be enroute, and which may start incurring demurrage time when stopped enroute or at the wellsite before being unloaded. Weather may additionally change not just the travel hours between the supplier and the wellsite, but may additionally have significant impacts to the rates at which the transport units may be unloaded at the wellsite. In winter conditions, haul times may be extended, and in raining conditions, unloading may be extended by hours per transport unit. Further, consistently intense daily demand with 24 hour per day operations on 7 days per week, preclude storage from being filled during non-operative hours as non-operative hours are not scheduled.

The dispatch order for the project is essentially "One Job" yet requires as many as thousands of loads required within short periods such as within a matter of a few weeks. Thus, attempting to fix any deficiency in judgment is not as simple as dealing with a few loads, but instead the error in judgment can result in a backup to the project supply that is impossible to recover from without incurring NPT because there are fixed capacity limiters including number of trucks available and the rate which storage equipment can physically unload trucks. Many systems can unload trucks at only 120 tons per hour, which is often less than the consumption rate which otherwise requires trucks to unload each minute of 24 hours per day to keep up with pumping at 12 or 18 hours per day. Thus if trucks fail to be dispatched and arrive for 6 hours, this may result in at least 6 hours NPT. The loading rate at the material supplier location, which may be further limited by loading times assigned to other customers or other projects. Capacity of the road to handle the traffic, since wellsites are typically accessed by lease roads which further limit capacity from the highways connecting to the lease roads, and which may be further limited as lease roads may be one-way roads which are radio controlled requiring trucks to wait to convoy in and out, resulting in further hours of delays before the trucks can gain access to the site.

The present disclosure combines physical equipment and software to complete, in some embodiments, the following in a volume-intense and changing environment, including:

1. Permit stakeholders to collectively pre-determine the optimal settings to balance the risk factors, and to enter such factors into computerized controls which then consistently monitor the hardware and control the decisions and communication between all the stakeholders;
2. Monitor inventory levels of the proppant in real-time using sensors;
3. Reduce human intervention in determining and predicting proppant levels at the wellsite and ordering the additional proppant;
4. Auto-select silos to receive the proppant to ensure the correct proppant type is loaded, as well as ensure that the proppant is loaded into the silo whose proppant levels are running low;
5. Optimize selection of silos that may be utilized to discharge proppant;
6. Ensure that the system never runs the downstream equipment out of proppant by monitoring inventory levels in real-time and automatically switching unloading from one silo to another silo storing the same proppant type when the first silo is nearing running out of proppant for discharge;
7. Improve the speed and efficiency of dealing with interruptions at the wellsite by automatically adjusting order requests to ensure additional transports are delayed so that they may not start to incur demurrage, and create alerts to either electronic or human dispatch teams to deal with any loaded truck units already enroute so that they may be diverted to staging areas in order to avoid queuing at the wellsite;
8. Permit the users to determine whether to prioritize or to prevent loading into silos which are simultaneously being unloaded from;
9. Provide for optimized management of wellsite storage volumes using predetermined judgment factors and computerized management and dispatch to support managing filling and consumption;
10. Reduce transport demurrage by predicting inventory requirements, predicting the replenishment rate and automating the dispatching of transport units to optimally meet the needs;
11. Reduce risk of Non-Productive Time at the wellsite by ensuring that dispatching is automated and not subject to human error;
12. Remove risk of equipment and freight downtime associated with non-interfaced handling and storage equipment, resulting from communication complexities in attempting to understand and evaluate inventory live-time;
13. Optimize the delivery of inventory to customer's downstream equipment by controlling discharge autonomously;
14. Improve the quality of preventative maintenance of handling and storage units;
15. Predict required action such as recertification or retraining based on the log of driver certification and qualifications, both providing alerting to the transport carrier or driver to schedule recertification or retraining, and furthermore integrating the information to the dispatch of the same driver;
16. Integrate billing for customers and integrate payables to suppliers or carriers; and 17. Integrate preventative maintenance prediction and planning for both the storage system and the carriers to increase effective operating time due to scheduled maintenance at times in which dispatch is coordinated not to be continuing to ship to the wellsite.

Referring now to FIG. 1, an example block diagram of a computing system 100 is shown, in accordance with some embodiments of the present disclosure. The computing system 100 includes a host device 105 associated with a memory device 110. The host device 105 may be configured to receive input from one or more input devices 115 and provide output to one or more output devices 120. The host device 105 may be configured to communicate with the memory device 110, the input devices 115, and the output devices 120 via appropriate interfaces or channels 125A, 125B, and 125C, respectively. The computing system 100 may be implemented in a variety of computing devices such as computers (e.g., desktop, laptop, etc.), tablets, personal digital assistants, mobile devices, wearable computing devices such as smart watches, other handheld or portable devices, or any other computing unit suitable for performing operations described herein using the host device 105.

The input devices 115 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 105 and that allows an external source, such as a user, to enter information (e.g., data) into the host device and send instructions to the host device. Similarly, the output devices 120 may include a variety of output technologies such as external memories, printers, speakers, displays, microphones, light emitting diodes, headphones, plotters, speech generating devices, video devices, global positioning systems, and any other output peripherals that are configured to receive information (e.g., data) from the host device 105. The "data" that is either input into the host device 105 and/or output from the host device may include any of a variety of textual data, graphical data, video data, sound data, position data, combinations thereof, or other types of analog and/or digital data that is suitable for processing using the computing system 100.

The host device 105 may include one or more Central Processing Unit ("CPU") cores or processors 130A-130N that may be configured to execute instructions for running one or more applications associated with the host device. In some embodiments, the instructions and data needed to run the one or more applications may be stored within the memory device 110. The host device 105 may also be configured to store the results of running the one or more applications within the memory device 110. One such application on the host device 105 may include a proppant management application 135. The proppant management application 135 may be executed by one or more of the CPU cores 130A-130N. The instructions to execute the proppant management application 135 may be stored within the memory device 110. The proppant management application 135 is described in greater detail below. Thus, the host device 105 may be configured to request the memory device 110 to perform a variety of operations. For example, the host device 105 may request the memory device 110 to read data, write data, update or delete data, and/or perform management or other operations.

To facilitate communication with the memory device 110, the memory device 110 may include or be associated with a memory controller 140. Although the memory controller 140 is shown as being part of the memory device 110, in some embodiments, the memory controller may instead be part of the host device 105 or another element of the computing system 100 and operatively associated with the memory device. The memory controller 140 may be configured as a logical block or circuitry that receives instructions from the host device 105 and performs operations in accordance with those instructions. For example, when the execution of the proppant management application 135 is desired, the host device 105 may send a request to the memory controller 140. The memory controller 140 may read the instructions associated with the proppant management application 135 that are stored within the memory device 110, and send those instructions back to the host device. In some embodiments, those instructions may be temporarily stored within a memory on the host device 105. One or more of the CPU cores 130A-130N may then execute those instructions by performing one or more operations called for by those instructions of the proppant management application 135.

The memory device 110 may include one or more memory modules 145 that store data and instructions. The memory modules 145 may be any of a variety of memory types, including a variety of volatile memories, non-volatile memories, or a combination thereof. For example, in some embodiments, one or more of the memory modules 145 or portions thereof may include NAND flash memory cores. In other embodiments, one or more of the memory modules 145 or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory device 110. In some embodiments, one or more of the memory modules 145 or portions thereof may be configured as other types of storage class memory ("SCM"). Generally speaking, the memory modules 145 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

It is to be understood that only some components of the computing system 100 are shown and described in FIG. 1. However, the computing system 100 may include other components such as various batteries and power sources, networking interfaces, routers, switches, external memory systems, controllers, etc. Generally speaking, the computing system 100 may include any of a variety of hardware, software, and/or firmware components that are needed or considered desirable in performing the functions described herein. Similarly, the host device 105, the input devices 115, the output devices 120, and the memory device 110 including the memory controller 140 and the memory modules 145, may include hardware, software, and/or firmware components that are considered necessary or desirable in performing the functions described herein. In addition, in certain embodiments, the memory device 110 may integrate some or all of the components of the host device 105, including, for example, the CPU cores 130A-130N, and the CPU cores may be configured to execute the proppant management application 135, as described herein.

Figure 2:
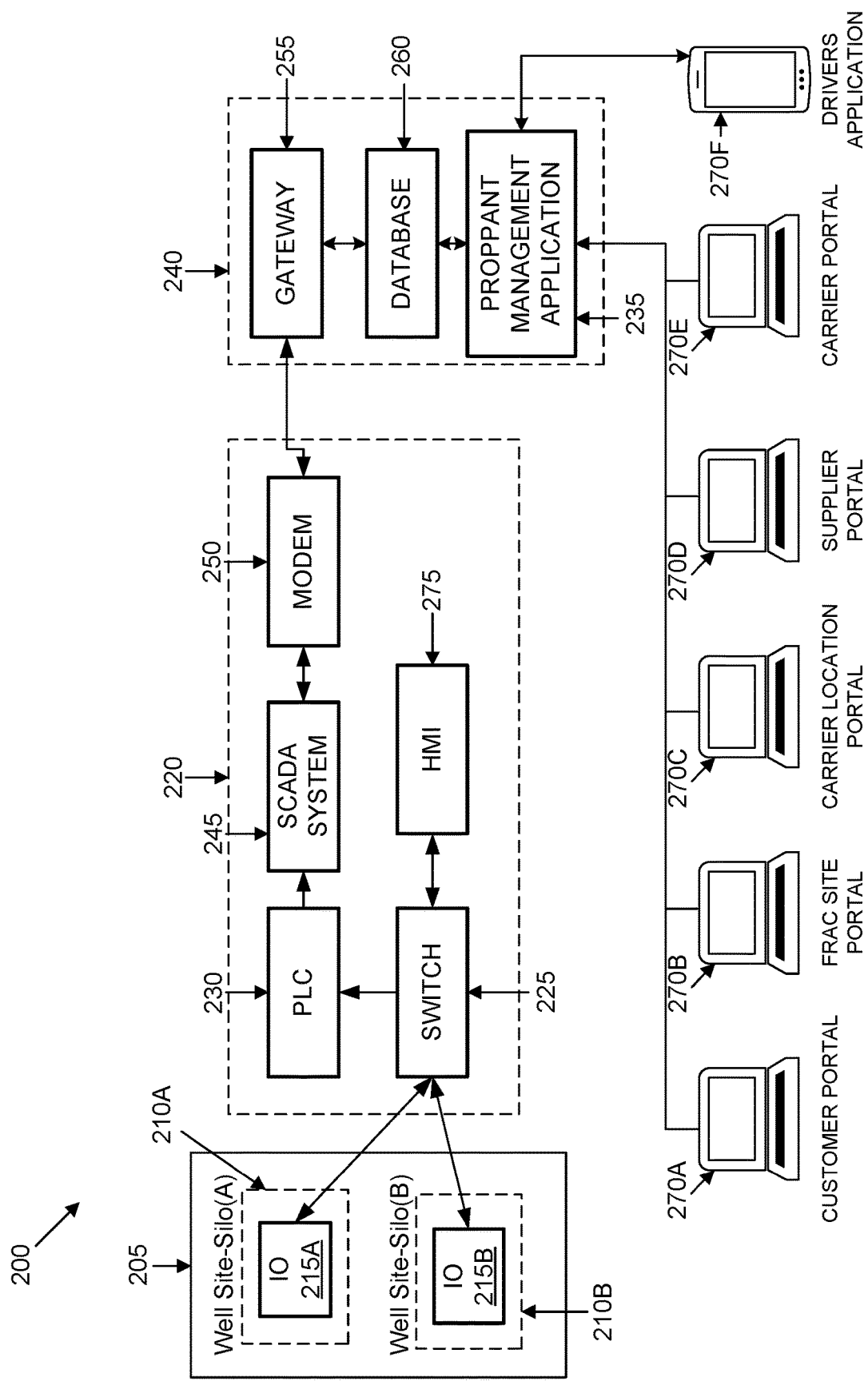
FIG. 2 is an example block diagram showing additional details of the proppant management application of FIG. 1, in accordance with some embodiments of the present disclosure.

Turning to FIG. 2, an example proppant management system 200 is shown, in accordance with some embodiments of the present disclosure. The proppant management system 200 may be used to manage the inventory of proppant stored at a wellsite 205 using the proppant management application 135. The wellsite 205 may be a remote location where a fracking operation is being performed. The wellsite 205 may include a first silo 210A and either a second conveying line associated with conveying line "B" or a second silo 210B. The first silo 210A and/or the second silo 210B are also referred to herein as container, containment area, storage area, storage compartment, and the like. Although only two silos (e.g., the first silo 210A and the second silo 210B) are shown at the wellsite 205, in other embodiments, the number of silos may vary to be greater than or fewer than two. Each of the first silo 210A and the second silo 210B may be used to store a pre-determined amount of proppant therein. Each of the first silo 210A and the second silo 210B may store the same type of proppant or a different type of proppant.

Further although not shown, the wellsite 205 may include or be associated with other equipment. For example, in some embodiments, each of the first silo 210A and the second silo 210B may be associated with a conveyor system having at least one skid and at least one an elevator to store the proppant into, and retrieve the proppant from, each of those silos. In some embodiments, one conveyor system may be associated with multiple silos. The first silo 210A and/or the second silo 210B may also be associated with one or more belt scales, and other types of equipment that may be needed or considered desirable to have in loading/unloading proppant into/from the first silo and the second silo, or for otherwise managing operations of the first silo and the second silo.

In some embodiments, the wellsite 205 may also include a blender feed system. In some embodiments, one blender feed system may be provided for each silo skid or for a plurality of silo skids. In some embodiments, one or two under bin conveyers, which are below the bins on each of the silo units may be provided. The blender feed system may also include a blender feed conveyor to move beside the under-bin conveyor for shipping. For blender operators, the blender feed conveyor may slide under head pulley of the under-bin conveyor. The blender feed conveyor may be actuated to pivot 180 degrees, to raise or lower discharge height to accommodate customer's blender, or to load into a transport. The blender feed system may also include two bin actuators per bin. The actuators that are "over top" of the under-bin conveyors may be opened such that a left actuator cannot open when the under bin conveyor is under the right side actuator. Slide gate sensors may be used to indicate how open each actuator is, which may then be controlled to adjust proppant discharge rate. The blender may also be set to auto-fill by using high limit and low limit sensors to activate actuators and/or belt speed. The blender feed system may also include belt scale or other scaling mechanism. Desired proppant type and weight may be used to direct opening of one or more actuators. The belt scale may also inform the amounts the actuators are opened based upon real time weight readings and may be considered more accurate than the percentage opening details of the actuators. The wellsite 205 may include or be associated with other drilling, digging, or other types of equipment, components, or elements that may generally be used or considered desirable to have at the wellsite.

Additionally, each of the first silo 210A and the second silo 210B may be associated with a sensor 215A and 215B, respectively, which may be used to determine the amount of proppant stored therein. In some embodiments, the sensor 215A and the sensor 215B may each be a radar sensor configured to sense the amount of proppant using radar technology. In other embodiments, the sensor 215A and/or the sensor 215B may include other or additional types of sensors. The data from the sensor 215A and the sensor 215B may be transmitted to a host device 220. Although not shown, in some embodiments, various components of the conveyor system (e.g., belt scales, blender scales, etc. on the conveying equipment) associated with the first silo 210A and/or the second silo 210B may also include one or more sensors (e.g., radar sensors or other types of sensors) to sense various designated parameters. Other components of the wellsite 205 may similarly be associated with one or more sensors to collect data therefrom. Any data collected by such sensors may be transmitted to the host device 220.

The host device 220 may be analogous to the host device 105. Thus, although not shown, the host device 220 may include one or more CPU cores that are configured to communicate with a memory device (e.g., the memory device 110). In some embodiments, the host device 220 may be located at or near the wellsite 205. In other embodiments, the host device 220 may be located at a remote location. Although the host device 220 is shown as receiving data from only the sensor 215A and the sensor 215B of the first silo 210A and the second silo 210B, respectively, in other embodiments, the host device may also be configured to receive data from other equipment at the wellsite that have sensors or other electronic communication capability associated therewith.

The host device 220 may receive the data from the sensor 215A and the sensor 215B via a switch 225. The switch 225 may be an interface and considered analogous to the interface 125B. The switch 225 may be configured to receive the data from the sensor 215A and the sensor 215B and transmit that data to a programmable logic controller ("PLC") 230 for use by a proppant management application 235 at a central server 240. Specifically, from the PLC 230, the data may be transferred to the central server 240 via a SCADA system 245 (e.g., an ignition edge SCADA server) and a modulator-demodulator ("modem") 250. Although the PLC 230, the SCADA system 245, and the modem 250 are described herein as transferring the data from the sensor 215A and the sensor 215B to the central server 240, in other embodiments, other or additional components may be used to transfer the data from the switch 225 to the central server. Thus, data may be sent from the sensor 215A and the sensor 215B via the switch 225 to the central server 240 in any suitable way. Although not shown in FIG. 2, the data collected by any other sensor at the wellsite 205 may similarly be received at the switch 225 and transmitted to the central server 240.

The central server 240 may be a repository to receive data from a plurality of wellsites. Thus, the central server 240 may receive data from the wellsite 205 and from any other wellsites with which the central server is associated. The central server 240 may include a gateway 255 to receive the data being sent by a particular wellsite (e.g., the wellsite 205). The central server 240 may also include a database 260 to store the data received from the wellsite 205 (and from any other wellsite with which the central server is associated). Although not shown, the central server 240 may include or be associated with one or more CPU cores similar to the host device 105. Generally speaking, the central server 240 may include any of a variety of software, firmware, hardware or combinations thereof that may be needed or considered desirable to have in operating the central server. The central server 240 may additionally host the proppant management application 235 that may be associated with the database 260 to provide the data from the sensor 215A and the sensor 215B to the various stakeholders that are involved in the fracking operation at the wellsite 205. For example, in some embodiments, the proppant management application 235 may be associated with a customer portal 270A that may be used by a customer to commission the fracking operation and monitor the fracking operation; a frac site portal 270B to manage equipment at the wellsite 205; a carrier location portal 270C that may be a global positioning system to monitor a current location of a transport of a carrier; a supplier portal 270D that may be used by a supplier to view and manage orders for additional proppant, monitor transports from the supplier location to the wellsite 205, create bill of ladings (BOLs), and communicate with a carrier; a carrier portal 270E to view and manage orders for additional proppant, manage and control fleet of transports, select one or more transports to fulfil the orders, monitor the transports from the carrier to the supplier location to the wellsite, manage maintenance of the transports, manage ticketing/licensing, and manage BOLs; and a driver's application 270F that may be used by a driver of a transport during transportation of the additional proppant from the supplier location to the wellsite. In some embodiments, the driver's application 270F may be a mobile application used by transport drivers to log into to access specific BOL information and instructions pertaining to the load including (a) log in feature for the driver; (b) BOL ticket information is accessible to driver when logged in; (c) activating GPS functionality to start following the driver; (d) automatically putting the driver in an unload queue when the driver arrives at the wellsite 205 site and crosses the wellsite geofence for the Storage Operator to choose which load is now available for unloading into the first silo 210A and/or the second silo 210B, although the Storage Operator may still enter any other load number into the system even if the load is not showing as being onsite on the geofence system. Such BOL information may be alphanumeric values, bar code, QR code or other electronic code, or any combination of the foregoing. In some embodiments, the Storage Operator may confirm the material type matches the BOL, and then selects which storage compartment (e.g., the first silo 210A and/or the second silo 210B) the material is to be put into if a silo autoselect feature is not enabled. The information may be stored in the database 260.

In other embodiments, the proppant management application 235 may be associated with other, fewer, or additional portals. Each of these portals are described in greater detail below. The drivers application 270F may provide various information to the driver and from the driver to other systems. Information provided to the driver may be interactive and may include scheduled load time, scheduled delivery time, supplier loactoin, supplier loading lane assignment, deliver location or product type.

Referring still to FIG. 2, the proppant management application 235 may include a Human Machine Interface ("HMI") 275 that serves the front end of the proppant management application. Although not shown, the proppant management application 235 may include or be associated with one or more CPU cores and a memory device of the host device 220 (e.g., similar to the CPU cores 130A-130N and the memory device 110 of the host device 105) and/or the central server 240. Generally speaking, the proppant management application 235 may include or be associated with any of a variety of software, hardware, firmware, or combinations thereof that are needed or considered desirable to have in the proper functioning of the proppant management application.

In some embodiments, the proppant management application 235 and/or the HMI 275 may be accessed via an Application Programming Interface ("API"). Specifically, to access the proppant management application 235 via the HMI 275 using the API, a user may use designated devices such as laptops, desktops, tablets, mobile devices, other handheld or portable devices, and/or other types of computing devices that are configured to access the API. In some embodiments, these devices may be different from the computing device on which the proppant management application 235 is installed. In other embodiments, the proppant management application 235 may be hosted on a cloud service and may be accessed through the cloud via a web or mobile application. In some embodiments, the user may access the HMI 275 of the proppant management application 235 via a web browser, and upon entering a uniform resource locator ("URL") for the API such as the IP address of the proppant management application or other web address. In some embodiments, the proppant management application 235 and/or the HMI 275 may be accessed via a mobile application downloaded to a mobile device. In other embodiments, the proppant management application 235 and/or the HMI 275 may be configured for access in other ways.

Further, upon accessing the proppant management application 235, users may send instructions to the proppant management application via the HMI 275 and receive information back from the proppant management application, also via the HMI. In some embodiments, an API may be used to send and receive data from the proppant management application 235 via the HMI 275. In some embodiments, the API that is used to communicate with the proppant management application 235 may be a representational state transfer ("REST") type of API. In other embodiments, the API may be any other type of web or other type of API (e.g., ASP.NET) built using any of a variety of technologies, such as Java, .Net, etc., that is suitable for facilitating communication between the proppant management application 235 and the users via the HMI 275. In some embodiments, the API may be configured to facilitate communication via a hypertext transfer protocol ("HTTP") or hypertext transfer protocol secure ("HTTPS") type request. The API may receive an HTTP/HTTPS request and send an HTTP/HTTPS response back. In other embodiments, the API may be configured to facilitate communication using other or additional types of communication protocols. By using the proppant management application 235, a user may monitor the amount of proppant stored within each of the first silo 210A and the second silo 210B. In some embodiments, by using the proppant management application 235, the user may also monitor and control other equipment (e.g., skids, elevators, etc.) at the wellsite 205.

It is to be understood that only some components of the proppant management system 200 are shown and described in FIG. 2. However, the proppant management system 200 may include any of a variety of hardware, software, and/or firmware components that are needed or considered desirable in performing the functions described herein. Similarly, the host device 220 including the switch 225, the PLC 230, the SCADA system 245, and the modem 250, as well as the central server 240 may be configured in a variety of ways, and may include hardware, software, and/or firmware components that are considered necessary or desirable in performing the functions described herein.

Figure 3:
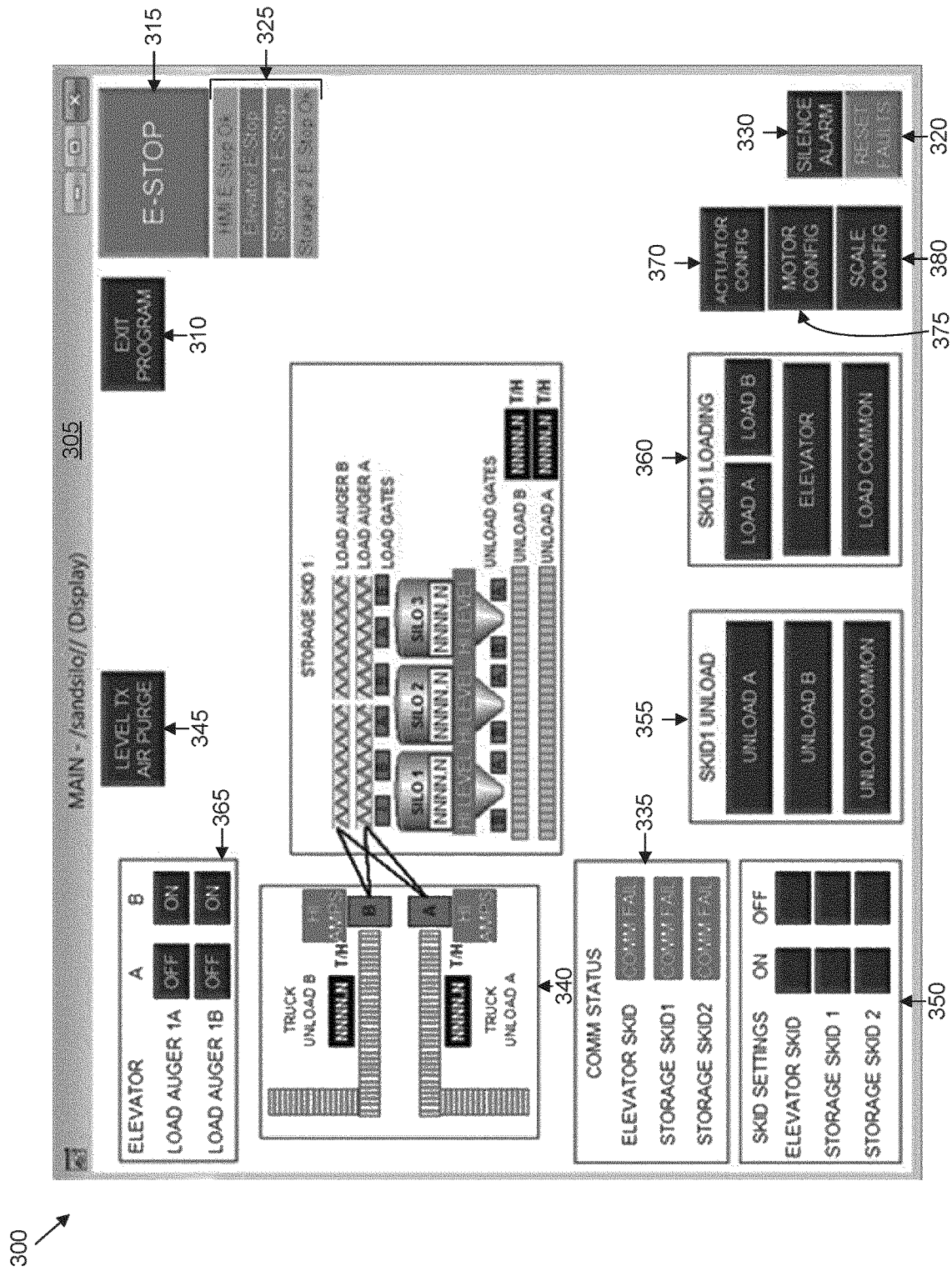
FIG. 3 is an example screenshot of a user interface of the proppant management application of FIG. 2, in accordance with some embodiments of the present disclosure.

Turning to FIG. 3, an example of an HMI 300 is shown, in accordance with some embodiments of the present disclosure. The HMI 300 is analogous to the HMI 275 of FIG. 2. Thus, the HMI 300 may be used to receive input (e.g., via the input devices 115) from a user and provide output (e.g., via the output devices 120) to the user. The HMI 300 may be associated with a proppant management application (e.g., the proppant management application 235). Therefore, the HMI 300 provides a user interface that facilitates human-computer interaction between the users and the proppant management application 235. The HMI 300 may present a graphical user interface ("GUI") to a user to receive input from and provide output to the user. The GUI may present a variety of graphical icons, windows, visual indicators, menus, visual widgets, and other indicia to facilitate user interaction. In other embodiments, the HMI 300 may be configured as other types of user interfaces, HMI 300 may be configured in a variety of ways.

Further, the HMI 300 may be configured to receive user inputs in a variety of ways. In some embodiments, the HMI 300 may be configured to receive user inputs via the input devices 115. In other embodiments, the HMI 300 may be configured to receive the user inputs in other ways. The HMI 300 may also be configured to present outputs/information to the users in a variety of ways. In some embodiments, the HMI 300 may present outputs to the user via the output devices 120. In other embodiments, the HMI 300 may be configured to present the outputs in other ways (e.g., audible or visual alarms, etc.). Generally speaking, the HMI 300 may be associated with any type of hardware, software, and/or firmware component that enables the proppant management application to perform the functions described herein.

Upon accessing the HMI 300, the user may be presented with a home screen 305. The home screen 305 may provide an information overview of and configuration of the equipment at the wellsite 205 and may enable access of specific equipment control screens. A description of the various features on the home screen 305 is as follows, where "button" is used in a general sense to describe a interface for specific features, for example, but not limited to a visual icon that may be activated via a touch-sensitive screen.

Exit Program button 310: pressing this button may shut down or close the HMI 300 and return to a panel view configuration screen of the proppant management application 235.

E-Stop button 315: pressing this button (e.g., pressing a first time) may initiate a stop or halt the operation of all (or a subset of designated) equipment at the wellsite 205. In some embodiments, pressing the E-Stop button 315 again (e.g., pressing a second time) may cancel the operation (stopping or halting of the equipment) that was initiated when the E-stop button was pressed the first time. In some embodiments, if the E-stop button 315 is pressed the first time to begin the stopping or halting of the equipment, the stopped e-stop condition may need to be reset by pressing a reset faults button 320 to restart the stopped equipment instead of pressing the E-stop button the second time. Further, in some embodiments, an E-stop indicator list 325 may be displayed below the E-stop button 315 to indicate the status of certain equipment at the wellsite 205. The E-stop indicator list 325 may also enable the operator to selectively stop or halt each equipment individually (as opposed to using the E-stop button 315, which may stop or halt all or a subset of equipment together). In some embodiments, the E-stop indicator list 325 may include a list of all or a designated subset of equipment at the wellsite 205, and each equipment item in the E-stop indicator list may indicate the status of that equipment. For example, an indicator of a particular equipment may be RED if that equipment is stopped, GREEN if the equipment is running normally, and blinking YELLOW/RED if the equipment is in fault. Other types of status indicators (e.g., textual indicators) may be used as well.

Silence alarm button 330 may be used to acknowledge a new alarm and/or silence an alarm horn associated with an equipment at the wellsite 205. For example, if an alarm goes off in some equipment at the wellsite 205, the silence alarm button 330 may blink (e.g., blink in a color coded fashion such as red/white). In some embodiments, the reset faults button 320 may also be configured to blink (e.g., blink in color coded fashion such as red/white colors) when an alarm is activated at an equipment of the wellsite 205. In some embodiments, pressing the reset faults button 320 or the silence alarm button 330 (whichever button is blinking) may acknowledge the alarm (e.g., indicate that the operator is aware of the alarm) to stop the blinking. In some embodiments, the reset faults button 320 may blink when a new alarm is activated and the silence alarm button 330 may be pressed to acknowledge the alarm. Upon pressing the silence alarm button 330, the blinking of the reset faults button 320 may stop.

Communication status indicator panel 335 may show a list of equipment at the wellsite 205 that may be having problems in their respective Ethernet/interface devices that may be preventing that equipment from communicating with (e.g., sending data to) the host device 220 (and particularly to the proppant management application 235). In some embodiments, the communication status indicator panel 335 may list all or a designated subset of equipment at the wellsite. For each equipment, the communication status indicator panel 335 may indicate whether that particular equipment is normally communicating with, and sending data to, the host device 220 or whether that equipment is having trouble communicating with the host device. If an equipment is communicating normally, an indication "ONLINE" may appear next to that equipment in the communication status indicator panel 335 to indicate the normal communication. On the other hand, if an equipment is having problems communicating with the host device 220, an indication of "COMM FAIL" may appear next to that equipment in the communication status indicator panel 335. It is to be understood that the "ONLINE" and "COMM FAIL" indicators are only an example, and other indicators indicative of normal or abnormal communication status may be used in other embodiments. In some embodiments, instead of or in addition to the textual indicators, color indicators may be used (e.g., GREEN for normal communication; RED for abnormal communication, etc.).

Level indication panel 340 may display the amount (e.g., measured in feet, etc.) of proppant that is stored within each of the first silo 210A and the second silo 210B. The level indication panel 240 may display absolute amounts, relative amounts, or relation to predetermined thresholds. For example, "HI LEVEL" Indicators in the level indication panel 340 may be displayed on the silo if the high level switch for that particular silo is tripped. Gate Indicators (e.g., "A" and "B") may be shown at the top and bottom of the silos, and may be red colored when the gate is on the closed limit switch and green colored when the gate is off the closed limit switch. Rate Indicators may be displayed in the level indication panel 340 for the elevator feed conveyors and the silo unload conveyors. They display the tons per hour as read from the belt scale.

Level Tx air purge button 345 may be pressed to activate a silo level transmitter air solenoid associated with each of the first silo 210A and the second silo 210B for a designated period (e.g., for a period of 2 seconds). Activating the silo level transmitter air solenoid may keep the transmitter sensors (e.g., the sensor 215A and the sensor 215B) free of dust/debris build-up that could affect the sensors performance. In some embodiments, pressing the Level Tx air purge button 345 may activate the silo level transmitter air solenoid of each silo (e.g., the first silo 210A and the second silo 210B) at the wellsite, while in other embodiments, separate Level Tx air purge buttons may be provided for each silo.

Skid settings panel 350 may allow the operator to enable or disable specific skids and elevators at the wellsite 205. The skid settings panel 350 may include a list of all or designated skids at the wellsite 205. Each skid may be enabled or disabled using the skid settings panel 350. For example, by pressing the button in the 'ON' column for a particular skid, that skid may be enabled. Once the skid has been enabled, that button that was pressed under the "ON" column may indicate "ON." By pressing the button in the 'OFF' column for a particular skid may disable that skid and the button may indicate "OFF." Further, based upon the enabled/disabled status of a particular skid or elevator, additional control screens may be activated. For example, when a silo storage skid (e.g., "STORAGE SKID 1" or "STORAGE SKID 2") is enabled using the skid settings panel 350, various options in a skid unloading panel 355 and a skid loading panel 360 may become activated. More specifically, in some embodiments, when a silo storage skid (e.g., "STORAGE SKID 1" or "STORAGE SKID 2") is enabled using the skid settings panel 350, UNLOAD A, UNLOAD B, and UNLOAD COMMON options on the skid unloading panel 355 may become activated, and LOAD A and LOAD B options on the skid loading panel 360 may become activated. Further, when the elevator skid (e.g., "ELEVATOR SKID") on the skid settings panel 350 is activated, the "ELEVATOR" option on the skid loading panel 360 may become activated. When both, the "ELEVATOR SKID" and a storage skid (e.g., "STORAGE SKID 1" and/or "STORAGE SKID 2") are enabled on the skid settings panel 350, the LOAD COMMON option on the skid loading panel 360 becomes activated.

In some embodiments, only the activated panels and options may appear on the home screen 305. In other words, the skid unloading panel 355 and the skid loading panel 360 may remain hidden from view and may not be displayed on the home screen 305 until a storage skid (e.g., "STORAGE SKID 1" or "STORAGE SKID 2") or the "ELEVATOR SKID" are enabled on the skid settings panel 350. In other embodiments, the skid unloading panel 355 and the skid loading panel 360 may display in an inactivated state on the home screen 305 at all times.

Elevator spout settings panel 365 may allow the operator to set spout locations for elevators A and B. The buttons in columns 'A' and 'B' are the specific elevators and the rows are for selecting the 'A' or 'B' side of the silo skid. Pressing the appropriate button may set the particular spout position represented by that button and may indicate 'ON' and an indicator between the particular elevator and the particular loading equipment on the silo skid in the level indication panel 340 may be displayed.

The home screen 305 may also include an actuator configuration button 370, a motor configuration button 375, and a scale configuration button 380, each of which are further described below.

Portions or certain features discussed above of the HMI 300 may be accessible via the portals 270A-270F based upon the permission levels set by the customer. In some embodiments, certain features of the HMI 300 that are accessible by one user may be inaccessible to another user. In other embodiments, certain features may be accessible by multiple users. Thus, depending upon the permission level of a user, various aspects of the proppant management application 235 and the HMI 300 may be accessible.

Figure 4:
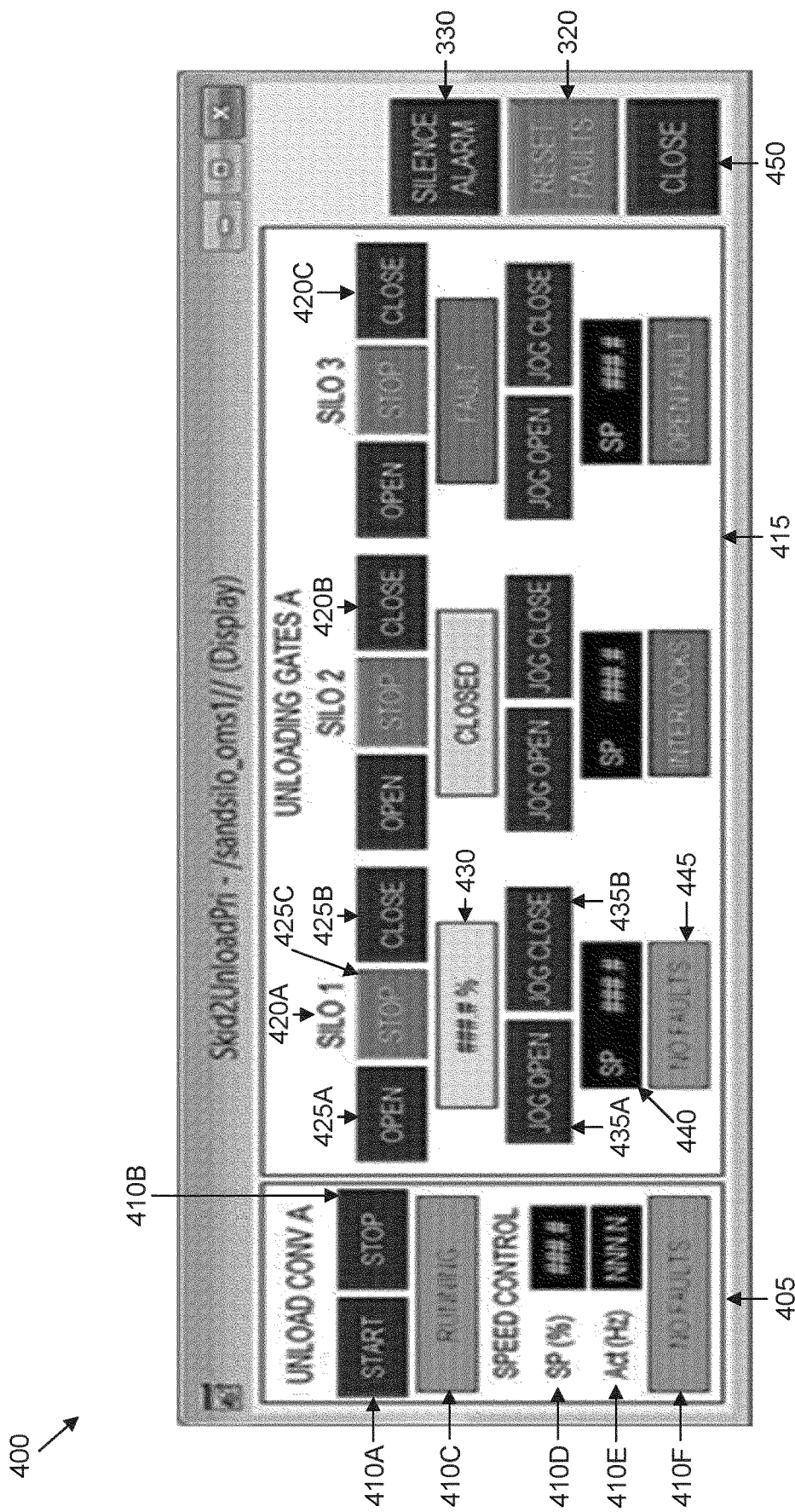
FIGS. 4-11 are additional example screenshots of the user interface of FIG. 3, in accordance with some embodiments of the present disclosure.

Referring to FIG. 4, an example interface 400 is shown, in accordance with some embodiments of the present disclosure. The interface 400 may be reached by clicking on the "UNLOAD A" or "UNLOAD B" options on the skid unloading panel 355 of FIG. 3. The interface 400 allows the operator to control the unloading of equipment on either an A or B train of the storage skid (e.g., "STORAGE SKID 1" or "STORAGE SKID 2") that has been enabled on the skid settings panel 350. The interface 400 is specifically directed to the "UNLOAD A" option on the skid unloading panel 355. However, an identical or substantially similar interface may be reached upon clicking the "UNLOAD B" option on the skid unloading panel 355.

The interface 400 may include an unload conveyor panel 405 having the following buttons, where "button" is used in a general sense to describe a interface for specific features, for example, but not limited to a visual icon that may be activated via a touch-sensitive screen.

Start button 410A to start the conveyor associated with the A train of the storage skid if that conveyor is clear of faults. A stop button 410B to stop that conveyor. A status indicator button 410C may display the current status of the conveyor. In some embodiments, the conveyor may be in one of three states: "STOPPED" (motor starter of the conveyor is deactivated), "STARTING" (motor starter of the conveyor is activated but run delay timer is still running), and "RUNNING" (motor starter of the conveyor is activated and run delay timer has finished running). In other embodiments, the status indicator button 410C may be configured to display other, additional, or fewer states. A speed control, SP (%) button 410D, is a numeric entry field that allows the operator to input a speed setting between 0-100% for the conveyor. A speed control, Act (Hz) button 410E, displays the speed feedback from the variable frequency drive ("VFD") for the motor of the conveyor within a range of 0-60 Hz. A fault indicator button 410F displays the current fault status of the conveyor. In some embodiments, the conveyor may have seven different fault states: "NO FAULTS" (conveyor is functioning normally), "INTERLOCKS" (conveyor interlocks are not satisfied), "VFD FAULT" (there is a fault condition detected on the VFD of the conveyor), "UNDERLOAD" (Not used on the VFDs), "MOTION" (the motion sensor of the conveyor failed to sense rotation of the tail pulley of the conveyor), "START FAIL" (If the PLC of the conveyor is calling for the motor to run but the run status has not been received within the set time duration), "COMM FAIL" (PLC of the conveyor has detected an Ethernet communications fault to the drive). In other embodiments, the fault indicator button 410F may be configured to display additional, fewer, or different fault states.

The interface 400 may also include an unload gate panel 415 that may include a set of controls for each silo. For example, the unload gate panel 415 may include a first set of controls 420A for the first silo 210A, a second set of controls 420B for the second silo 210B, and a third set of controls 420C for a third silo at the wellsite 205. If the wellsite 205 includes additional silos, additional sets of controls may be presented on the unload gate panel 415. In some embodiments, the first set of controls 420A, the second set of controls 420B, and the third set of controls 420C may all be identical or substantially similar. Thus, only the first set of controls 420A are described below. However, the second set of controls 420B and the third set of controls 420C may have similar elements.

Thus, the first set of controls 420A may include an open button 425A to command the gate of the first silo 210A to open if there are no faults present. The gate may open the open setpoint described below, or if the open setpoint is 0, the gate may fully open to the open limit switch. A close button 425B may command the gate of the first silo 210A to fully close to the closed limit switch. A stop button 425C may command the gate to stop moving or halt at its current position. A gate status button 430 displays the current state of the gate of the first silo 210A. In some embodiments, the gate may be in one of four different states: "CLOSED" (if the gate is on the closed limit switch), "OPEN" with current position % (when the gate is off the closed limit switch and is moving), "OPEN" with current position % (when the gate is off the closed limit switch and not moving), and "FAULT" (when the gate is in a fault condition). A jog open button 435A may pulse the gate open command for a duration of time set for the jog timer, which may be set using the actuator configuration button 370 of FIG. 3. A jog close button 435B may pulse the gate close command for a duration of time set for the jog timer, which may also be set using the actuator configuration button 370.

The unload gate panel 415 may also include an open setpoint button 440. The open setpoint button 440 may display an open setpoint value, which is a numeric entry that allows the operator to enter a setpoint in % for the gate to open to when the open button 425A is pressed. A fault indicator button 445 displays the current fault status of the gate. In some embodiments, the gate may be have five fault states: "NO FAULTS" (gate is functioning normally), "INTERLOCKS" (open interlocks for the gate are not satisfied), "OPEN FAULT" (gate failed to reach the open limit switch or setpoint in the allowed time (e.g., 20 seconds)), "CLOSE FAULT" (gate failed to reach the closed limit switch in the allowed time (e.g., 20 seconds)), and "LIMIT FAULT" (both open and closed limits are activated). In other embodiments, the gate may have additional, fewer, or different fault states.

In some embodiments, the silence alarm button 330 and the reset faults button 320 from the home screen 305 may be visible even when the interface 400 is open to allow the operator to see and acknowledge active alarms. Upon completing the various entries in the unload conveyor panel 405 and the unload gate panel 415, the operator may return to the home screen by pressing a close button 450.

Figure 5:
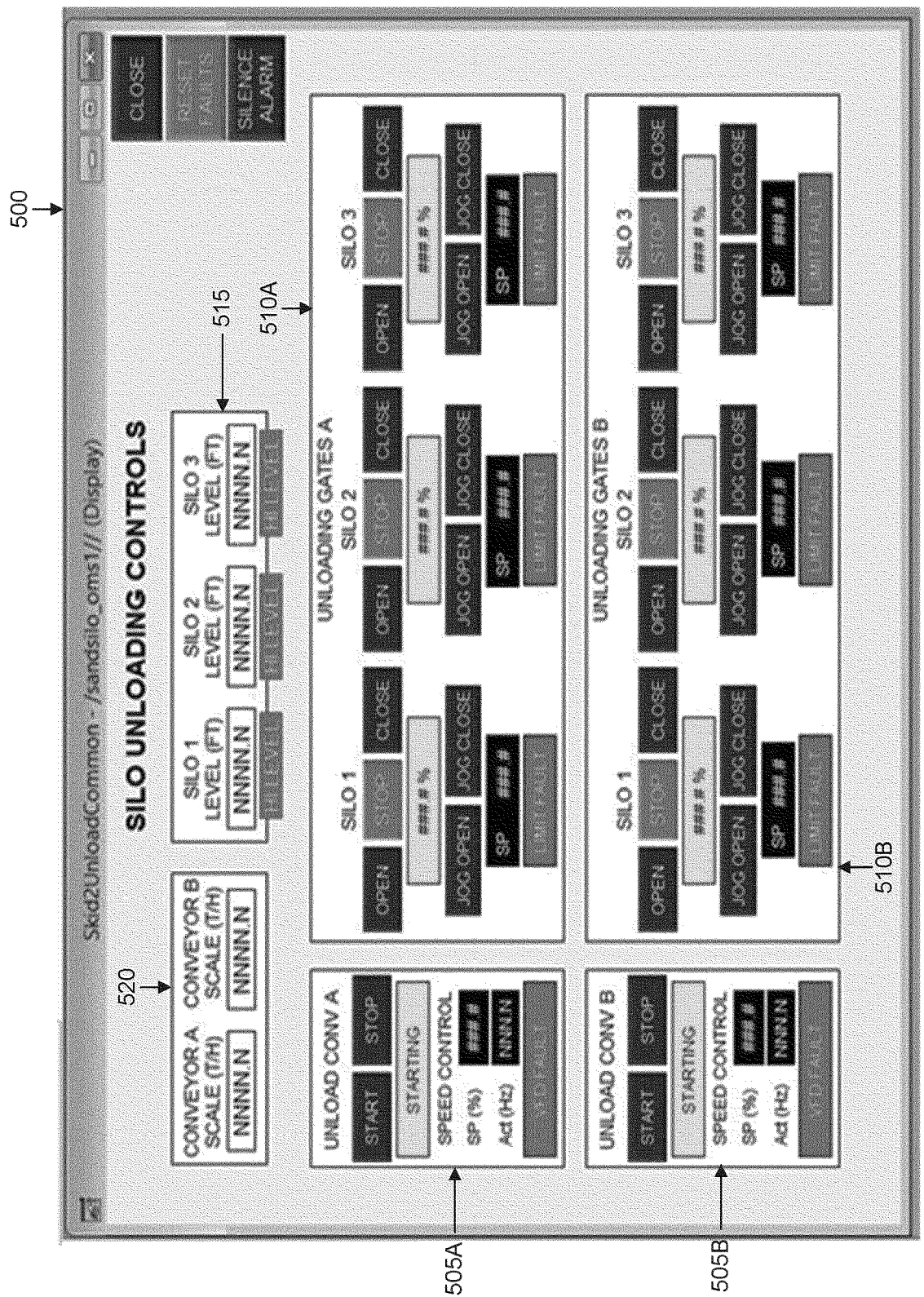

Referring now to FIG. 5, an example interface 500 is shown, in accordance with some embodiments of the present disclosure. The interface 500 may be reached by clicking on the "UNLOAD COMMON" option on the skid unloading panel 355 of FIG. 3. In some embodiments, the interface 500 includes the same controls as the interface 400 described above. Thus, those controls are not described in detail again. For example the interface 500 includes conveyor panels 505A and 505B, each of which is analogous to the unload conveyor panel 405. The interface also includes unload gate panels 510A and 510B, each of which is analogous to the unload gate panel 415. The interface 500 also includes a silo level panel 515 and a conveyor scale panel 520. The silo level panel 515 may display, for each silo at the wellsite 205, a high level notification of the amount (e.g., in tons per hour) of proppant within that silo. The conveyor scale panel 520 may display for each conveyor an unload scale rate (e.g., in tons per hour).

Figure 6:
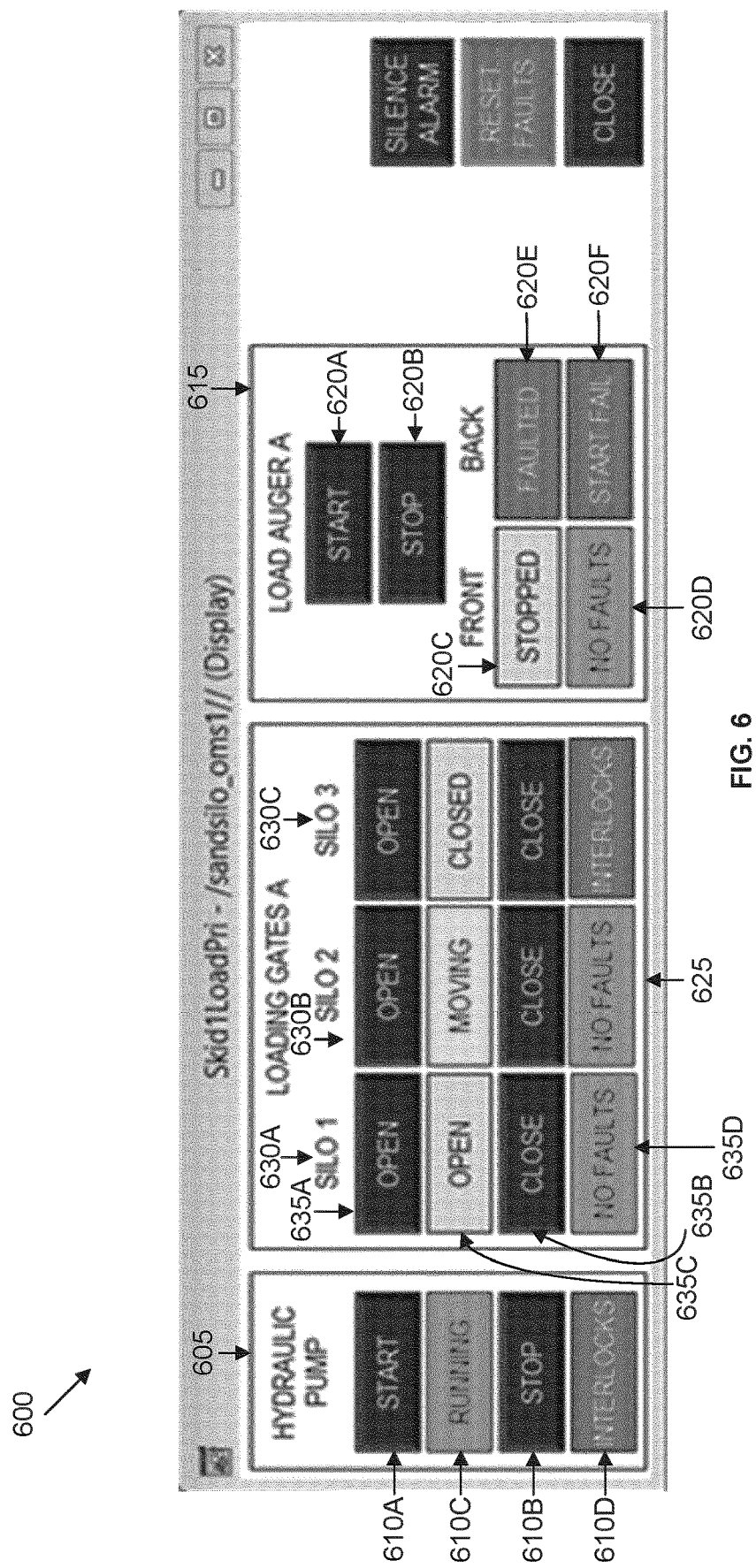

Turning to FIG. 6, an example interface 600 is shown, in accordance with some embodiments of the present disclosure. The interface 600 may be reached by clicking on the "LOAD A" or "LOAD B" option on the skid loading panel 360 of FIG. 3. The interface 600 may allow the operator to control the silo top gates, the load augers, and the storage skid hydraulic pump associated with each of the silos (e.g., the first silo 210A and the second silo 210B) at the wellsite 205. The interface 600 may include a hydraulic pump panel 605 having a start button 610A to start the hydraulic pump associated with the various silos at the wellsite 205 if the hydraulic pump is clear of faults. A stop button 610B may stop the hydraulic pump. A status indicator button 610C displays the current status of the hydraulic pump. In some embodiments, the hydraulic pump may have three operational states: "STOPPED" (motor starter of the hydraulic pump is deactivated), "STARTING" (motor starter of the hydraulic pump is activated but a run delay timer is still running), and "RUNNING" (motor starter of the hydraulic pump is activated and run delay timer has completed running). In other embodiments, the hydraulic pump may have other, additional, or fewer operational states. A fault indicator button 610D displays the current fault status of the hydraulic pump. In some embodiments, the hydraulic pump may have seven fault states: "NO FAULTS" (equipment is functioning normally), "INTERLOCKS" (equipment interlocks are not satisfied), "OVERLOAD" (an overload fault status read from the motor starter), "UNDERLOAD" (an underload fault status read from the motor starter), "MOTION" (motion sensor fail. In some embodiments, there may be no motion faults in hydraulic pumps, in which case the MOTION status may be disabled), "START FAIL" (If the PLC of the hydraulic pump is calling for the motor starter to run but the run status has not been received within the set time duration), and "COMM FAIL" (PLC of the hydraulic pump has detected an Ethernet communications fault). In other embodiments, the hydraulic pump may have other, additional, or fewer fault states.

The interface 600 may also have an auger panel 615 to control the augers or other conveying systems at the wellsite 205. The auger panel 615 may include a start button 620A to start the front and the back augers. A single start button (e.g., the start button 620A) may start both the front and back augers together. The auger panel 615 may also include a stop button 620B to stop both the front and back augers together. The auger panel 615 may additionally include status buttons 620C-620F for the front and back augers indicating the status of the front and back augers. Buttons 620C and 620E may display the operating status of each of the front and back augers, respectively. Each of the front auger and the back auger may be in one of four operational states: "STOPPED" (the auger is not operating), "STARTING" (the auger is activated but a run delay timer is still running), and "RUNNING" (the auger is activated and run delay timer has completed running), FAULTED (auger is activated but has a fault). Further, each of the front auger and the back auger may have six fault states: "NO FAULTS" (equipment is functioning normally), "INTERLOCKS" (equipment interlocks are not satisfied), "OVERLOAD" (an overload fault status read from the motor starter), "UNDERLOAD" (an underload fault status read from the motor starter), ""START FAIL" (If the PLC of the auger is calling for the motor starter to run but the run status has not been received within the set time duration), and "COMM FAIL" (PLC of the auger has detected an Ethernet communications fault).

Additionally, the interface 600 may include a loading panel 625 that may include a set of controls for each silo. For example, the loading panel 625 may include a first set of controls 630A for the first silo 210A, a second set of controls 630B for the second silo 210B, and a third set of controls 630C for a third silo at the wellsite 205. If the wellsite 205 only includes the first silo 210A and the second silo 210B, the third set of controls 630C need not be provided. Likewise, if the wellsite 205 includes additional silos, additional sets of controls may be presented on the loading panel 625. In some embodiments, the first set of controls 630A, the second set of controls 630B, and the third set of controls 630C may all be identical or substantially similar. Thus, only the first set of controls 630A are described below. However, the second set of controls 630B and the third set of controls 630C may have similar elements.

Thus, the first set of controls 630A may include an open button 635A to command the gate of the first silo 210A to open if there are no faults present. A close button 635B may command the gate of the first silo 210A to fully close to the closed limit switch. A gate status button 635C displays the current state of the gate of the first silo 210A. In some embodiments, the gate may be in one of four different states: "CLOSED" (if the gate is on the closed limit switch), "OPEN" (when the gate is on the open switch limit), "MOVING" (when the gate is between the closed and open limit switch and not faulted), and "FAULT" (when the gate is in a fault condition). A fault indicator button 635D may display the current fault status of the gate. The gate of the first silo 210A may have five fault states: "NO FAULTS" (gate is functioning normally), "INTERLOCKS" (open interlocks for the gate are not satisfied), "OPEN FAULT" (gate failed to reach the open limit switch in the allowed time, e.g., 20 seconds), "CLOSE FLT" (gate failed to reach the closed limit switch in the allowed time, e.g., 20 seconds), or "LIMIT FAULT" (both open and closed limits are activated).

In some embodiments, the silence alarm button 330 and the reset faults button 320 from the home screen 305 may be visible even when the interface 600 is open to allow the operator to see and acknowledge active alarms. Upon completing the various entries in the interface 600, the operator may return to the home screen 305 by pressing a close button 640.

Figure 7:
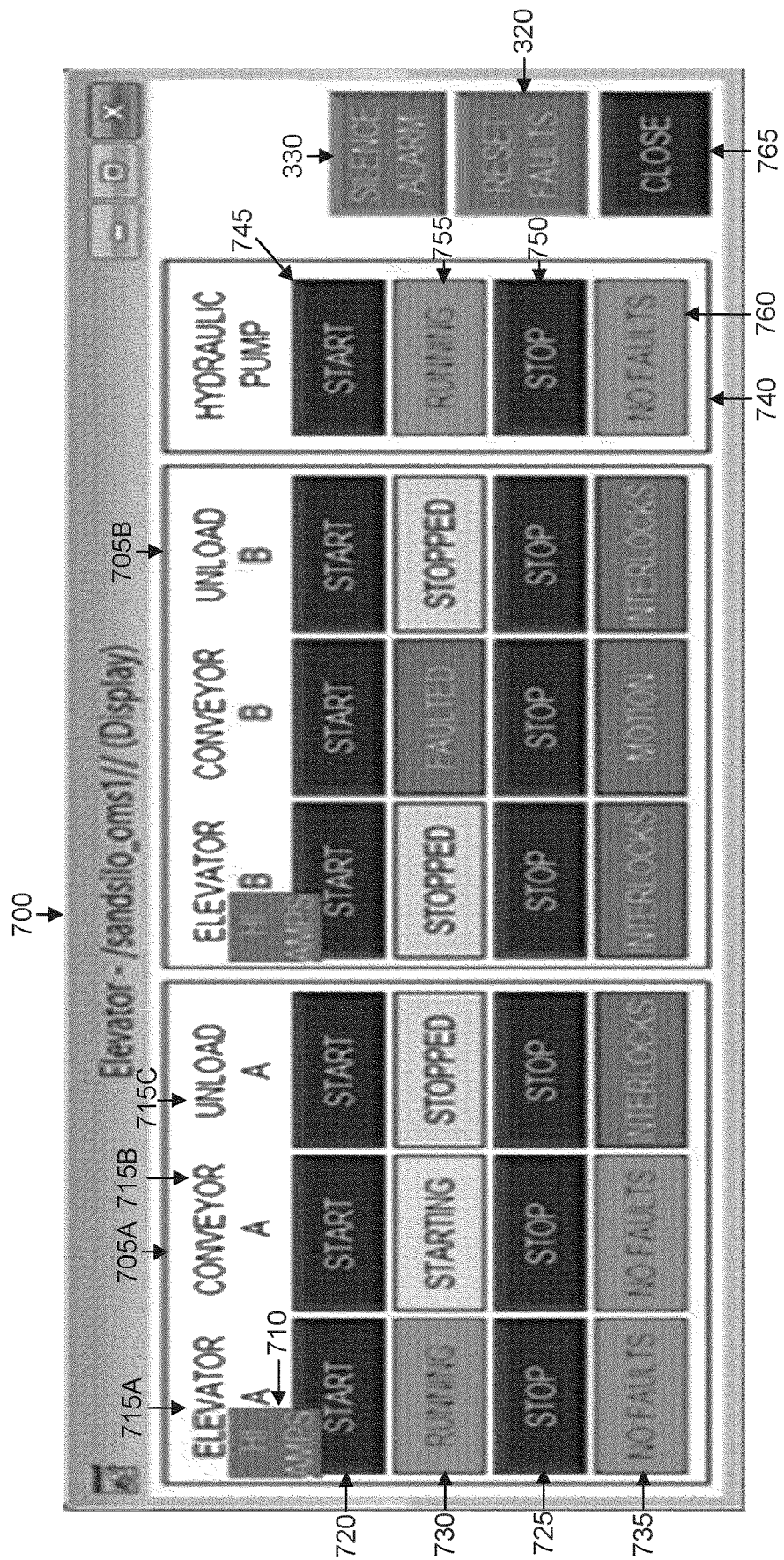

Referring to FIG. 7, an example interface 700 is shown, in accordance with some embodiments of the present disclosure. The interface 700 may be reached by clicking on the "ELEVATOR" option on the skid loading panel 360 of FIG. 3. The interface 700 allows the operator to control the elevators, the elevator feed conveyors and the truck unload conveyors, and the hydraulic pump associated with the first silo 210A and the second silo 210B. The interface 700 includes controls 705A for the A train associated with the first silo 210A and controls 705B for the B train associated with the second conveying line of the first silo. The fields in the controls 705A and 705B are identical, so only the controls 705A are described below. However, the description also applies to the controls 705B.

On the controls 705A, a hi amps indication 710 may be displayed when the current output to the elevator has exceeded a "% FLA HI" setpoint, which may be set using the motor configuration button 375. Further, the controls 705A may include separate controls 715A, 715B, and 715A for each of the respective elevator, conveyor, and gate of the A train associated with the first silo 210A. Each of the controls 715A-715C may include a start button 720 to start the conveyor, elevator, or gate, respectively, if that equipment is clear of faults. A stop button 725 may be pressed to stop the conveyor, elevator, or gate. A status indicator button 730 may display the current status of the conveyor, elevator, or gate. In some embodiments, the conveyor, elevator, or gate may each be in one three operational states: "STOPPED" (motor starter is deactivated), "STARTING" (motor starter is activated but run delay timer is not done), and "RUNNING" (motor starter is activated and run delay timer is done). A fault indicator button 735 may display the fault status of the conveyor, elevator, or gate. In some embodiments, each of the conveyor, elevator, or gate may be in one of 7 fault states: "NO FAULTS" (equipment is functioning normally), "INTERLOCKS" (equipment interlocks are not satisfied), "OVERLOAD" (an overload fault status read from starter), "UNDERLOAD" (an underload fault status read from starter), "MOTION" (motion sensor failed to sense rotation of the tail pulley), "START FAIL" (If the PLC is calling for the motor to run but the run status has not been received within the set time duration), and "COMM FAIL" (PLC has detected an Ethernet communications fault to the starter).

A hydraulic pump panel 740 may have similar buttons as the controls 705A. For example, the hydraulic panel 740 may include a start button 745, which is similar to the start button 720, and may be used to start the hydraulic pump. A stop button 750 may be considered analogous to the stop button 725 and may be used to stop the hydraulic pump. A status indicator button 755 may identity the operational state of the hydraulic pump. The operational states may be similar to those described above with respect to the status indicator button 730. Similarly, a fault indicator button 760, which may identify the fault state of the hydraulic pump, may have similar fault states as the fault indicator button 735.

In some embodiments, the silence alarm button 330 and the reset faults button 320 from the home screen 305 may be visible even when the interface 700 is open to allow the operator to see and acknowledge active alarms. Upon completing the various entries on the interface 700, the operator may return to the home screen 305 by pressing a close button 765.

Figure 8:
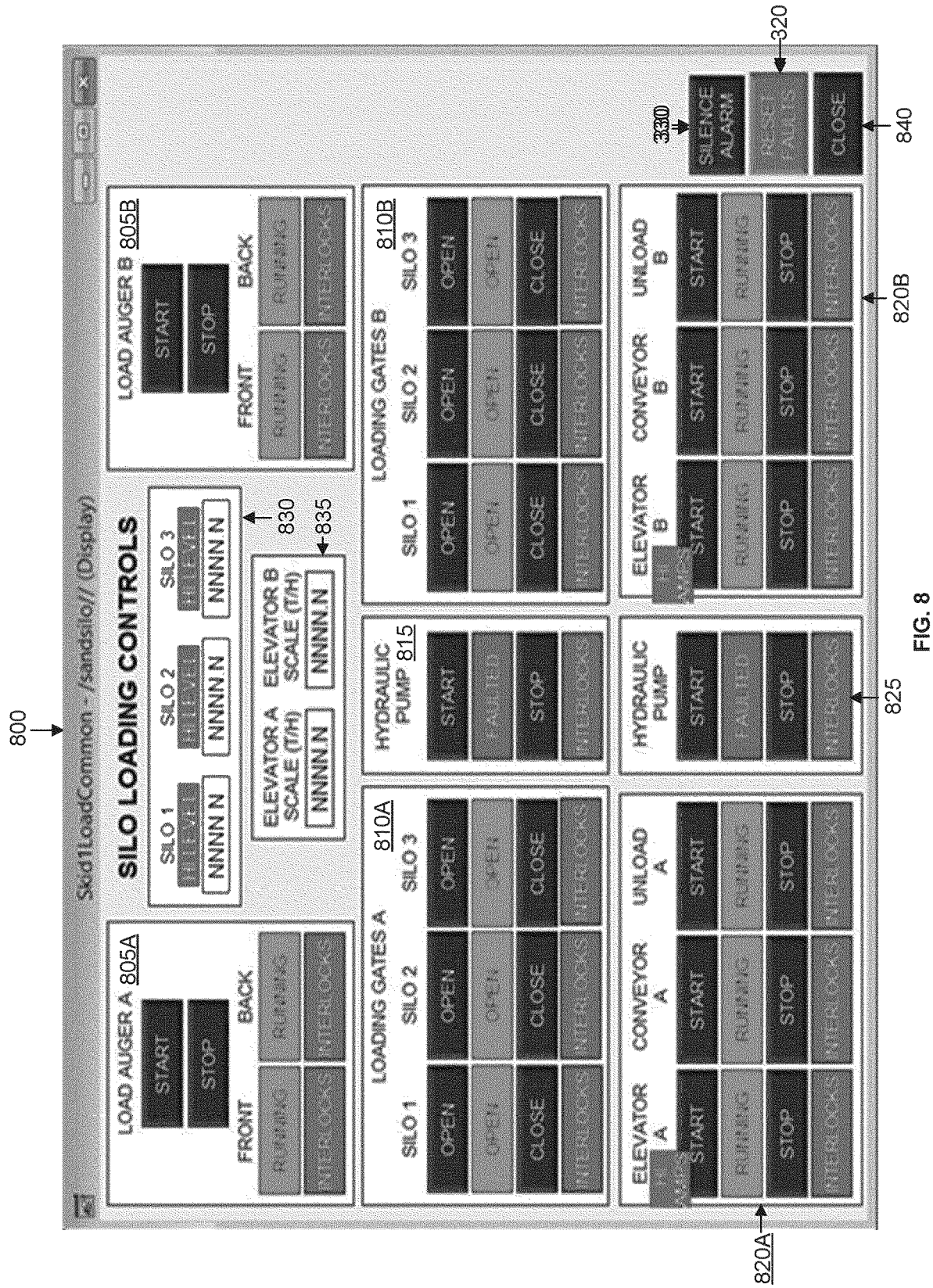

Referring to FIG. 8, an example interface 800 is shown, in accordance with some embodiments of the present disclosure. The interface 800 may be reached by clicking on the "LOAD COMMON" option on the skid loading panel 360 of FIG. 3. The interface 800 includes a variety of controls from the interfaces 400-700. For example, each auger panel 805A and 805B is similar to the auger panel 615. Each of loading panels 810A and 810B is similar to the loading panel 625, while hydraulic pump panel 815 is similar to the hydraulic pump panel 605. Similarly, each control panel 820A and 820B is analogous to the controls 705A and 705B, respectively, while hydraulic pump panel 825 is similar to the hydraulic pump panel 740. The interface 800 additionally includes a silo level panel 830 and a conveyor scale panel 835, which are similar to the silo level panel 515 and the conveyor scale panel 520, respectively. The interface 800, thus, allows, various controls to be reached from a single interface.

In some embodiments, the silence alarm button 330 and the reset faults button 320 from the home screen 305 may be visible even when the interface 800 is open to allow the operator to see and acknowledge active alarms. Upon completing the various entries on the interface 800, the operator may return to the home screen 305 by pressing a close button 840.

Figure 9:
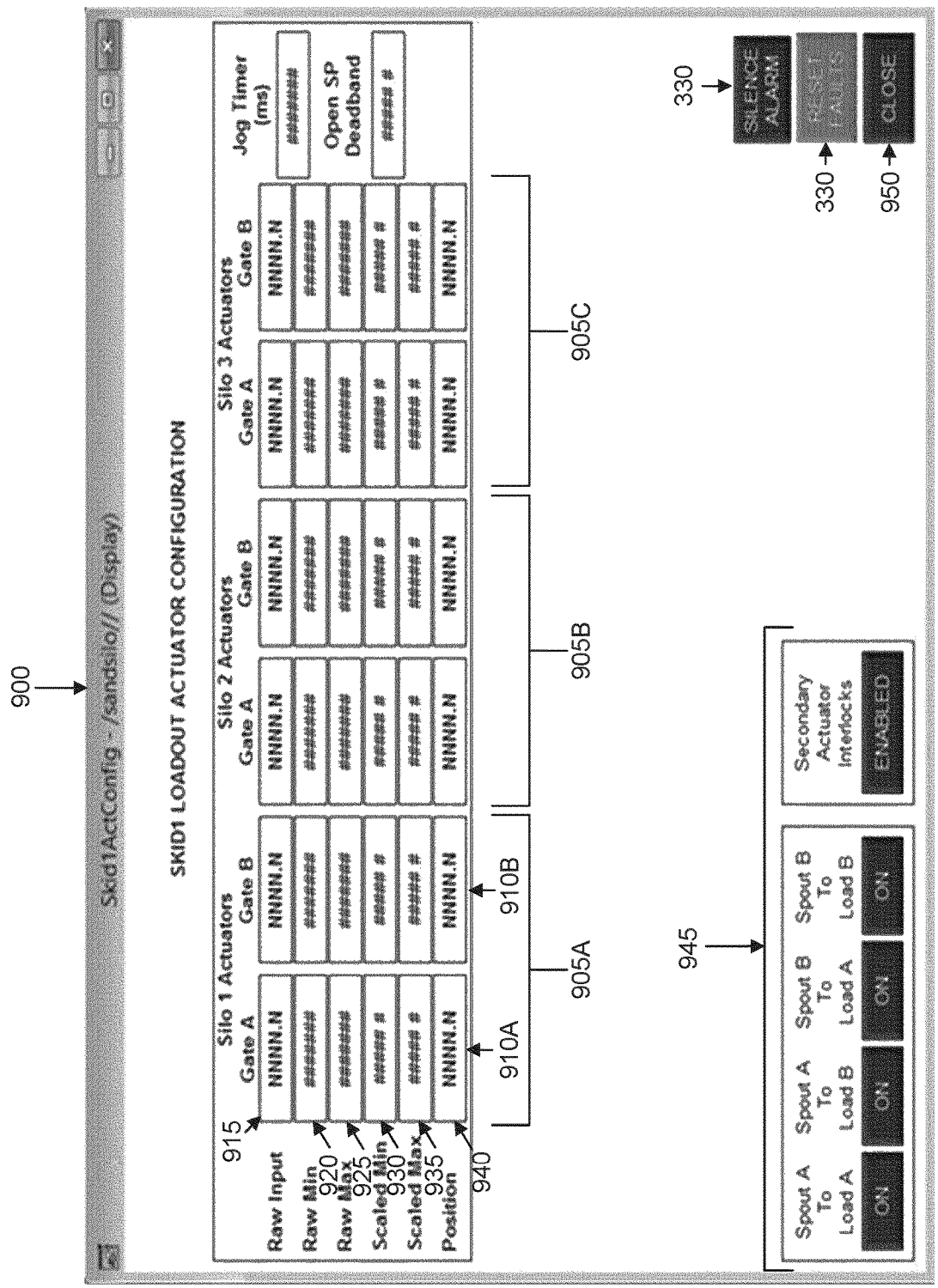

Turning to FIG. 9, an example interface 900 is shown, in accordance with some embodiments of the present disclosure. The interface 900 may be reached by clicking on the actuator configuration button 370 on FIG. 3. The interface 900 allows the operator to configure parameters for the bottom gates associated with each of the first silo 210A and the second silo 210B. The interface 900 may include, for each of the first silo 210A, the second silo 210B, and any other silo at the wellsite 205, a set of gate input controls. For example, the interface 900 may include a first set of controls 905A for each of the gates of the first silo 210A, a second set of controls 905B for each of the gates of the second silo 210B, and optionally, a third set of controls 905C for each of the gates of the third silo at the wellsite 205. If the wellsite 205 includes additional silos, a set of controls may be provided for each of those silos on the interface 900. Likewise, if the wellsite 205 only includes the first silo 210A and the second silo 210B, the third set of controls 905C need not be provided. In some embodiments, the first set of controls 905A, the second set of controls 905B, and the third set of controls 905C may all be identical or substantially similar. Thus, only the first set of controls 905A are described below. However, the second set of controls 905B and the third set of controls 905C may have similar elements.

The first set of controls 905A may include controls 910A for the first gate of the first silo 210A and controls 910B for the second gate of the first silo. The controls 910A and 910B are identical or substantially similar. Thus, only the controls 910A are described below. However, the controls 910B may have similar fields.

The controls 910A may be used to scale the analog inputs for the bottom gate position feedback. The controls 910 may include a raw input indicator 915, which may display the current raw value of the analog input. A raw min indicator 920 is a numeric entry field that may be used to set the raw input value that corresponds to a lower range value of the input variable (e.g., set to the raw input value when the gate is fully closed). A raw max indicator 925 is a numeric entry field that may be used to set the raw input value that corresponds to an upper range value of the input variable (e.g., set to the raw input value when the gate is fully open). A scaled min indicator 930 is a numeric entry field that may be used to set the value in engineering units that corresponds to an upper range value of the input variable (e.g., set to 0), while a scaled max indicator 935 is a numeric entry field that may be used to set the value in engineering units that corresponds to an upper range value of the input variable (e.g., set to 100). A position button 940 may display the current scaled gate position. The interface 900 may also include buttons 945 that allow the operator to turn off spout configurations and bypass the bottom gate interlocks.

In some embodiments, the silence alarm button 330 and the reset faults button 320 from the home screen 305 may be visible even when the interface 900 is open to allow the operator to see and acknowledge active alarms. Upon completing the various entries on the interface 900, the operator may return to the home screen 305 by pressing a close button 950.

Figure 10:
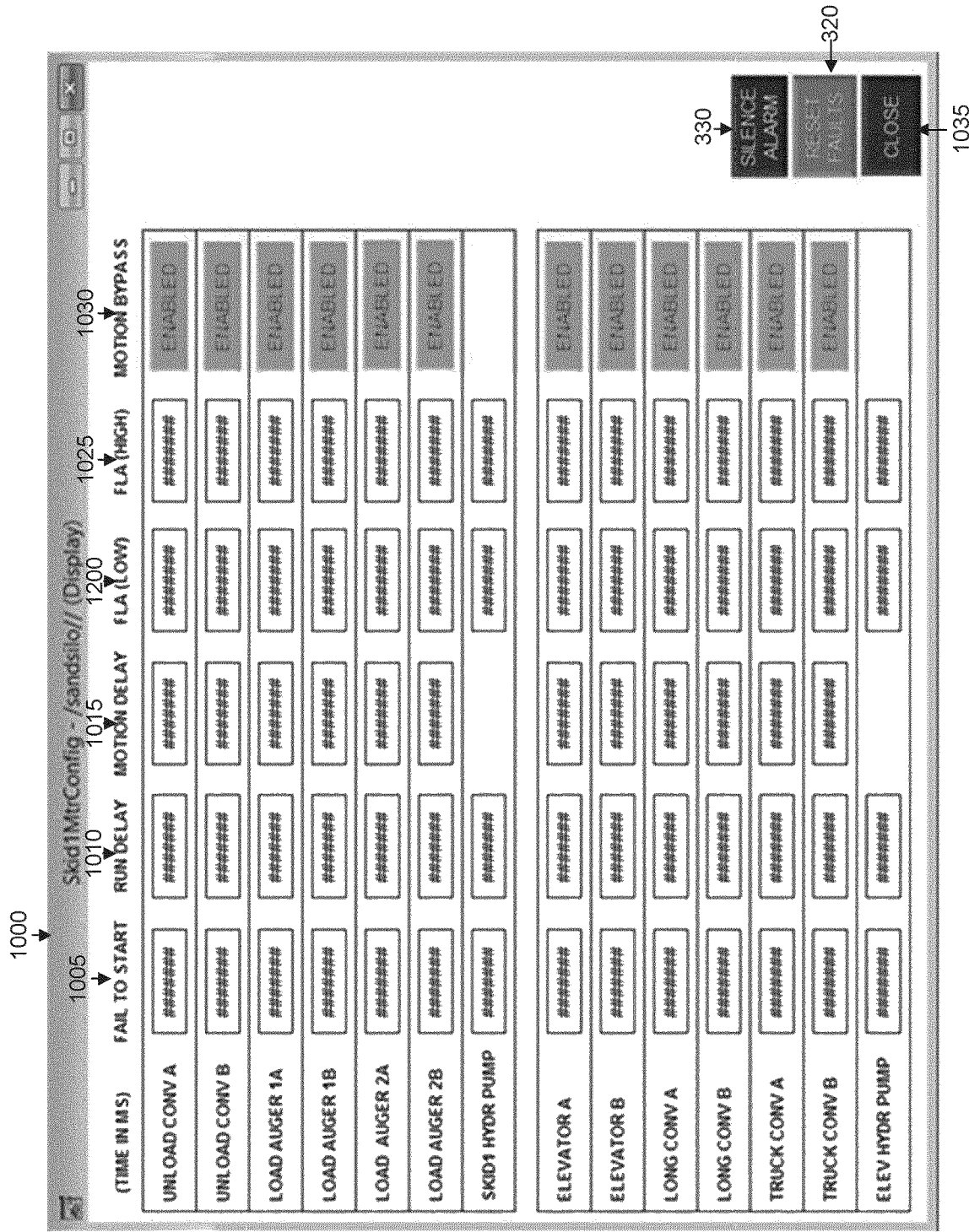

Referring to FIG. 10, an example interface 1000 is shown, in accordance with some embodiments of the present disclosure. The interface 1000 may be reached by clicking on the motor configuration button 375 on FIG. 3. The interface 1000 allows the operator to configure motor control parameters for the various equipment associated with the first silo 210A and the second silo 210B. Fail To Start 1005 is a numeric entry field to set the fail to start timer preset (e.g., in milliseconds). This preset is the time allowed for the motor status of the respective equipment to be read by the PLC of that equipment after the PLC run command turns on. Run Delay 1010 is a numeric entry field to set the run delay (e.g., in milliseconds). The run delay is the time period after the run status is received before the current draw is verified and the motor status changes from starting to running. Motion Delay 1015 is a numeric entry field to set the motion timer preset (e.g., in milliseconds). The motion delay is the time allowed between consecutive pulses from the motion proximity switch before a motion fault is triggered. FLA (low) 1020 is a numeric entry field to set the full load amps low setpoint that may be used for alarming (this value is in % FLA). FLA (high) 1025 is a numeric entry field to set the full load amps high setpoint that may be used for alarming (this value is in % FLA). Motion Bypass 1030 may be a toggle button to enable or disable the motion fault detection.

In some embodiments, the silence alarm button 330 and the reset faults button 320 from the home screen 305 may be visible even when the interface 900 is open to allow the operator to see and acknowledge active alarms. Upon completing the various entries on the interface 1100, the operator may return to the home screen 305 by pressing a close button 1035.

Figure 11:
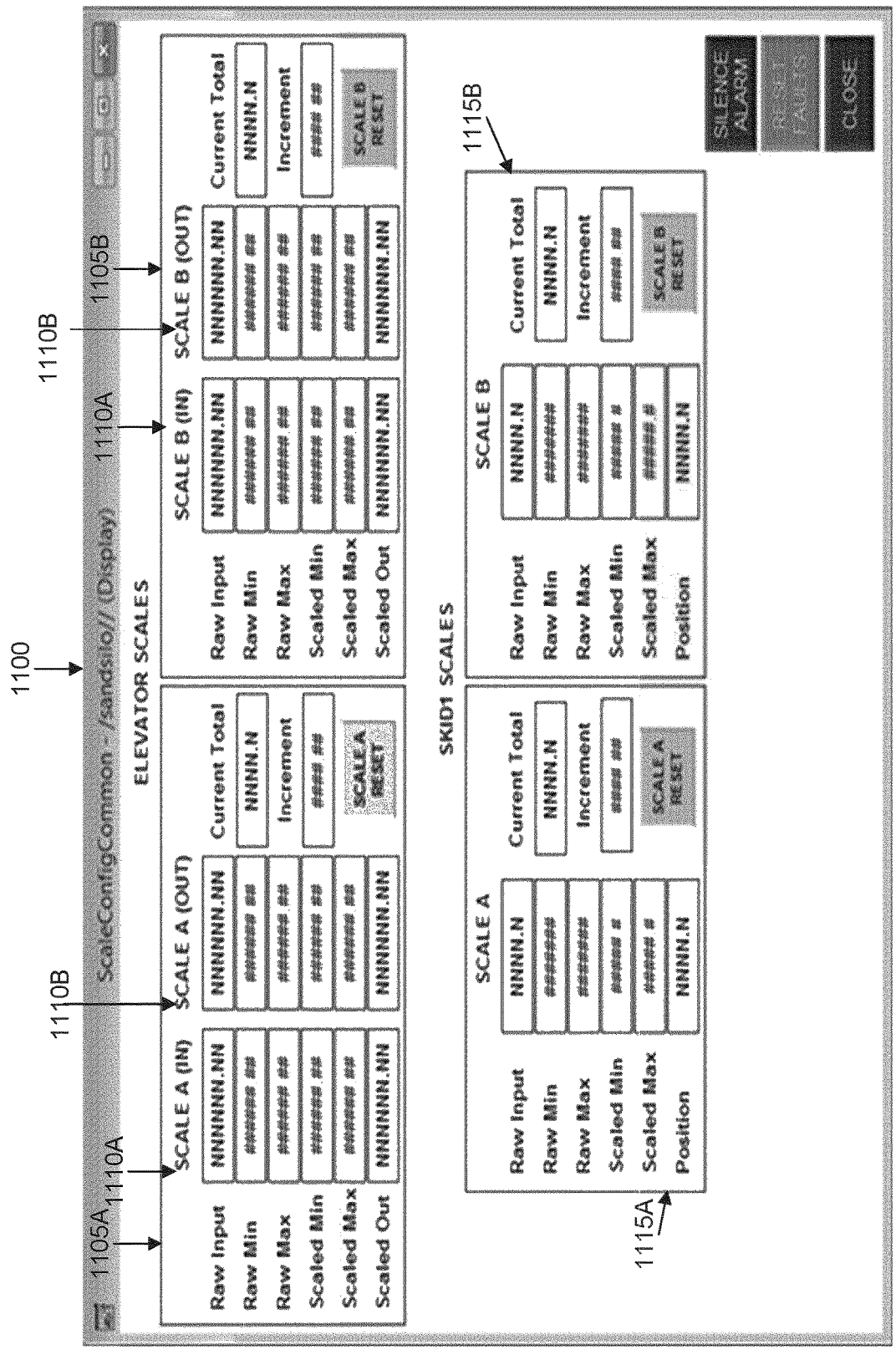

Referring to FIG. 11, an example interface 1100 is shown, in accordance with some embodiments of the present disclosure. The interface 1100 may be reached by clicking on the scale configuration button 380 on FIG. 3. The interface 1100 allows the operator to configure parameters used for conditioning belt scale inputs and outputs. The scale accumulators may also be displayed on the interface 1100. An elevator scale panel 1105A and 1105B may be provided for A and B scale configurations. Each of the elevator scale panels 1105A and 1105B may include rate input scaling, rate display output scaling, and the scale accumulator display. Further, each of the elevator scale panels 1105A and 1105B may include an "IN" scale panel 1110A and an "OUT" scale panel 1110B. The "IN" scale panel 1110A of each of the elevator scale panels 1105A and 1105B include the following information:

Raw Input displays the current raw value of the analog input. Raw Min is a numeric entry field used to set the raw input value that corresponds to lower range value of the input variable. Raw Max is a numeric entry field used to set the raw input value that corresponds to upper range value of the input variable. Scaled Min is a numeric entry field used to set the value in engineering units that corresponds to upper range value of the input variable. Scaled Max is a numeric entry field used to set the value in engineering units that corresponds to upper range value of the input variable.

The "OUT" scale panel 1110B of each of the elevator scale panels 1105A and 1105B include the following information: Raw Input displays the value in engineering units that is being scaled for the PLC analog output. Raw Min is a numeric entry field used to set lower range value of the input variable. Raw Max is a numeric entry field used to set the upper range value of the input variable. Scaled Min is a numeric entry field used to set the value in engineering units that corresponds to upper range value of the input variable. Scaled Max is a numeric entry field used to set the value in engineering units that corresponds to upper range value of the input variable. Current Total is the accumulated value in tons for the particular scale. This value is incremented by the amount set in the increment field each time a pulse is received from the scale accumulator pulse out. Increment is a numeric entry field that is set to the quantity in tons corresponding to a pulse out from the scale. Scale Reset push button when pressed may reset the current total value to 0.

The interface 1100 also includes scale panels 1115A and 1115B. The skid scale configuration (e.g., the scale panels 1115A and 1115B) may be separated into A side and B side scale configurations and accumulator totals. Raw Input displays the current raw value of the analog input. Raw Min is a numeric entry field used to set the raw input value that corresponds to lower range value of the input variable. Raw Max is a numeric entry field used to set the raw input value that corresponds to upper range value of the input variable. Scaled Min is a numeric entry field used to set the value in engineering units that corresponds to upper range value of the input variable. Scaled Max is a numeric entry field used to set the value in engineering units that corresponds to upper range value of the input variable. Current Total is the accumulated value in tons for the particular scale. This value is incremented by the amount set in the increment field each time a pulse is received from the scale accumulator pulse out. Increment is a numeric entry field that is set to the quantity in tons corresponding to a pulse out from the scale. Scale Reset push button when pressed may reset the current total value to 0.

The proppant management application 235 may also be used to manage system faults and equipment failure. Each individual piece of equipment may shutdown in the event that a fault occurs on that particular piece of equipment. The system faults and interlocking may be in place to ensure multiple pieces of equipment are functioning properly as a system.

Elevator System Faults—The elevator system faults are shutdowns to the equipment on the elevator skid. This includes both A and B truck unload conveyors, elevator feed conveyors, and the elevators, however the A and B trains work independently. The elevator system faults may include: E-Stop, Equipment Comm Status, Elevator Fault, or configuration fault. The configuration fault occurs if the elevator spout is set to a silo loading system (augers/top gates) that is in fault.

Elevator Conveyors—The truck unload conveyors are interlocked with the elevator feed conveyor (A and B trains are interlocked independently). The respective elevator spout must be set to a load system that has at least 1 open top gate or operating conveyor. The elevator high amps alarm must not be active. The elevator feed conveyors are only interlocked with the elevator that it feeds. As long as the elevator is running the feed conveyor may have the permissive to run. The elevators are interlocked based on the spout configuration and the respective load augers. Both load augers must be running on the side in which the elevator's spout is set to for the run permissive to be satisfied.

Skid1 Load System Faults—The load system faults are common shutdowns to the silo skid loading equipment. This includes the load augers and the top gates, however the A and B trains work independently. The load system faults may include: E-Stop, Equipment Comm Status, Top Gate Fault, Auger Fault. The top gates and auger faults are specific to their respective sides.

Skid1 Load Augers—The load augers or other conveyors are interlocked with the silo high levels and the top gate statuses. The forward and aft augers for a single side both start together, but both side A and side B cannot be started simultaneously. If neither auger is currently starting, for an auger to have the run permissive at least one gate on that side must be open. The gate(s) that is open must not be in fault and the respective silo must not have and active high level shutdown.

Skid1 Top Gates—The top gates are interlocked with the silo high levels, the gate open/close faults, and the skid1 hydraulic pump. When a silo's high level switch is tripped the alarm notification comes in immediately, but the shutdown is activated after 10 minutes. When a high level shutdown for a silo is activated, any open gates atop that silo may close and the top gates on that particular silo may not be allowed to open until the high level condition is cleared. In some embodiments, if conveyors are being used instead of augers, then if a conveyor #2 downstream of a conveyor #1 is not running, then the proppant may be loaded into the silo that is under the conveyor #1. If the silo under the conveyor #1 is full, and the conveyor #2 continues to not run, interlocks may be used to shut off the system. Further, if any gates on a particular side encounter an open or close fault the rest of the gates on that side may not be allowed to operate until the fault has been cleared.

Skid1 Unload System Faults—The unload system faults are common shutdowns to the silo skid unloading equipment. This includes the unload conveyors and the bottom gates, however the A and B trains work independently. The load system faults may include: E-Stop, Equipment Comm Status, and Unload Conveyor Fault. The unload conveyor fault is specific to its respective side. The unload gates are interlocked with the unload conveyors. The unload conveyor on the corresponding side must be running before the gates on that particular side may be given the permissive to open. The unload conveyors have no interlocking with other equipment as long as Skid 1 is ON in the Skid Settings on the Main screen the conveyors may have the permissive to run.

Figure 12A:
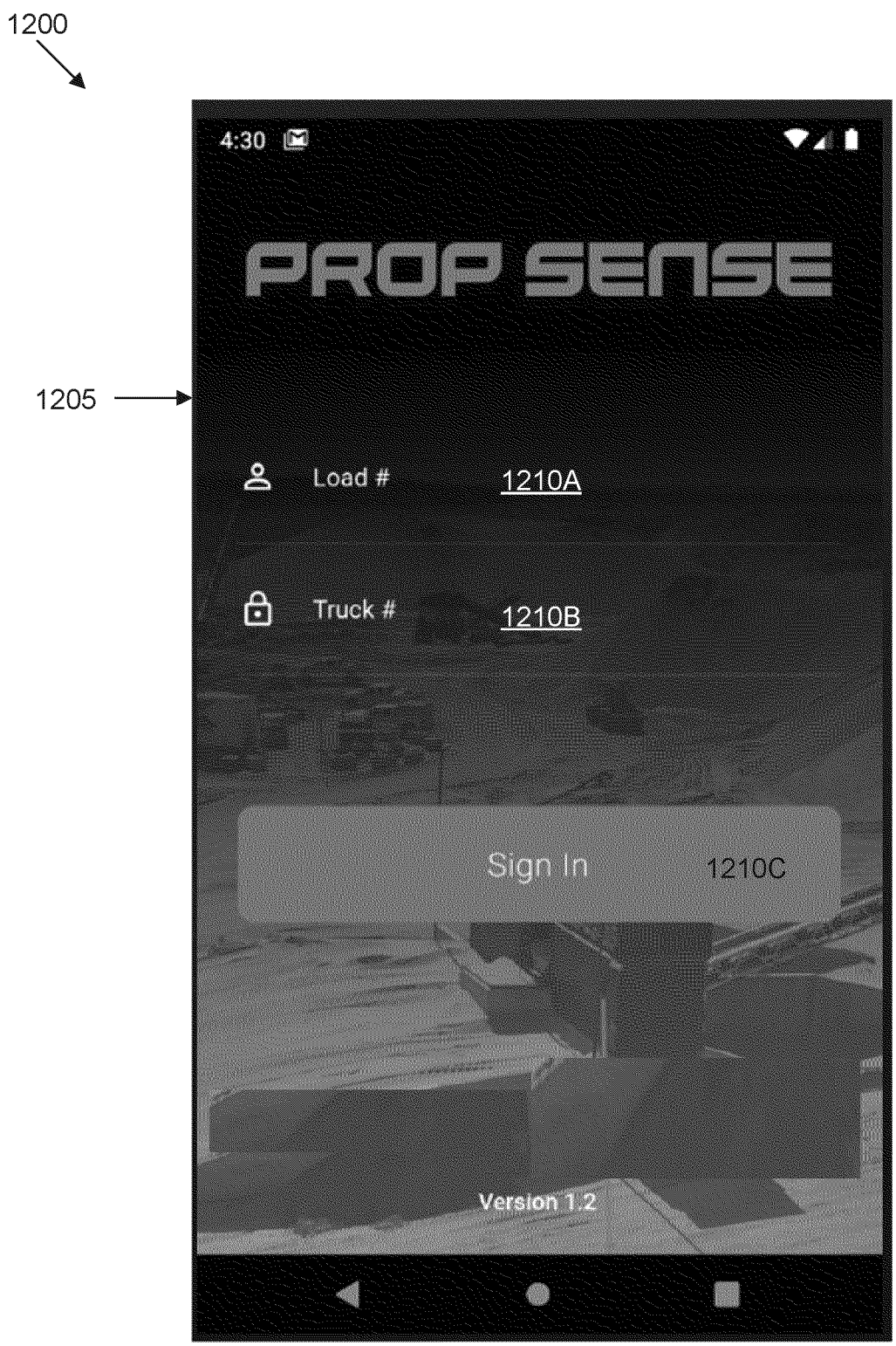
FIGS. 12A-12P are example user interfaces of a drivers application associated with the proppant management application of FIG. 1, in accordance with some embodiments of the present disclosure.
Figure 12B:
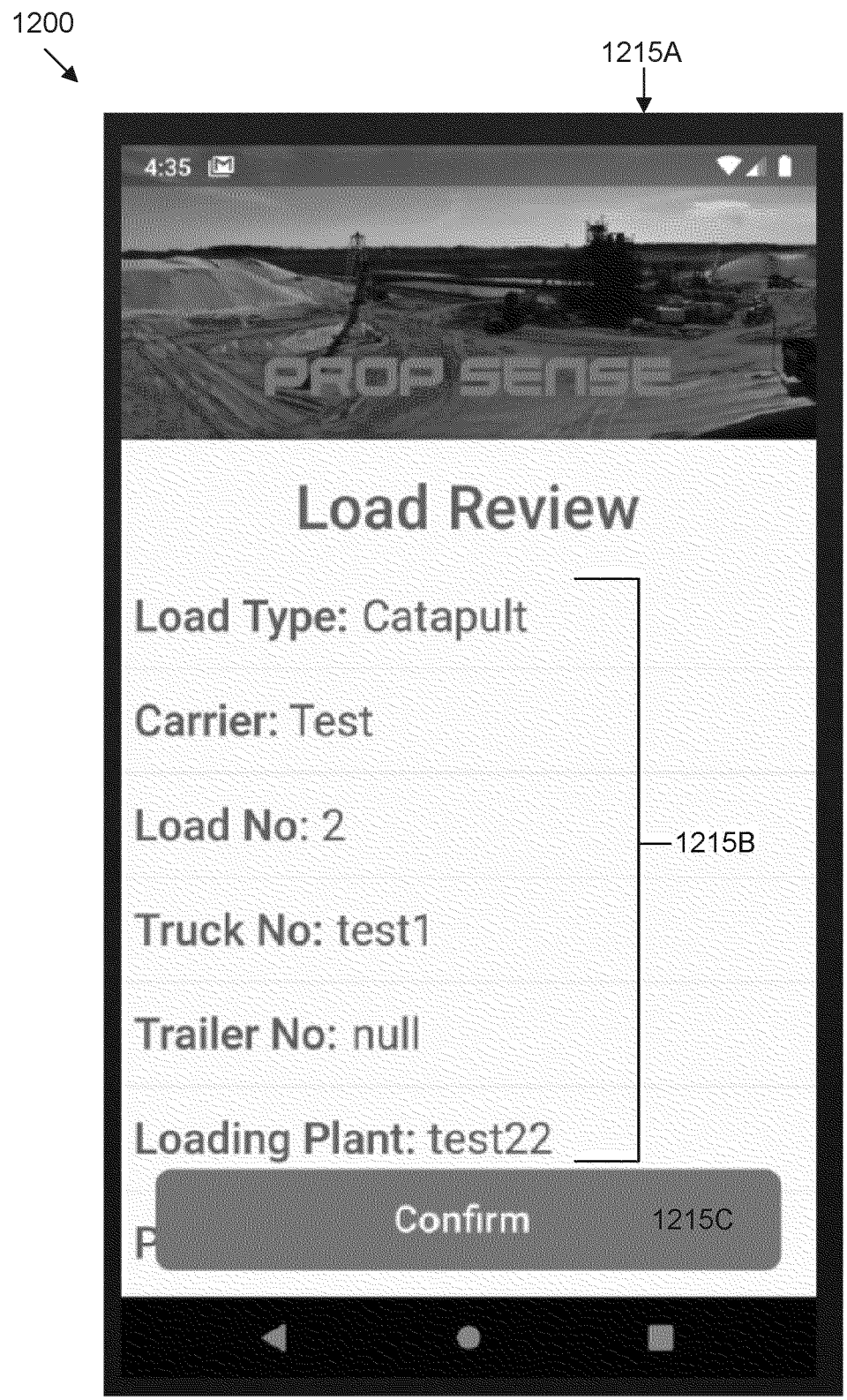
Figure 12C:
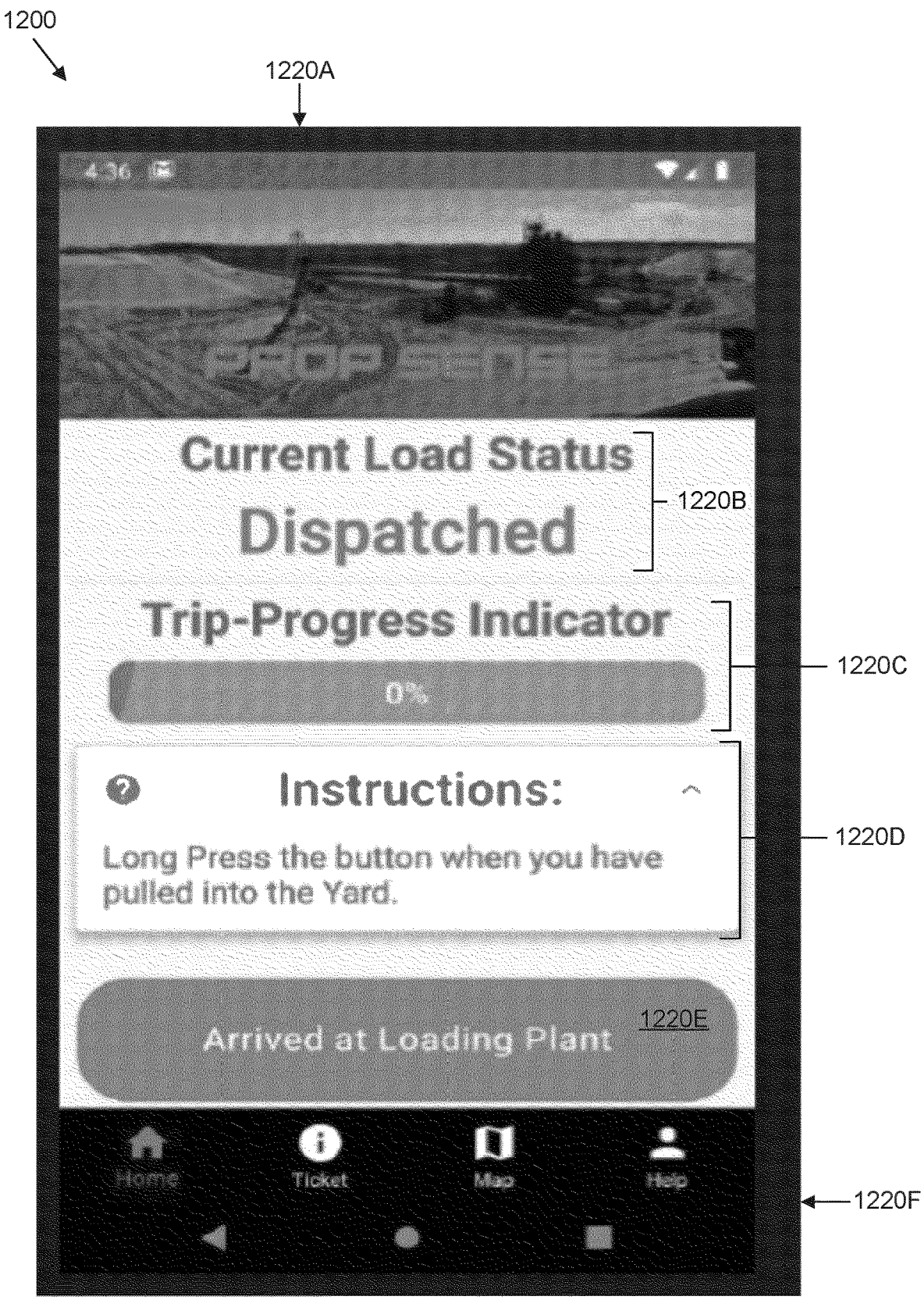
Figure 12D:
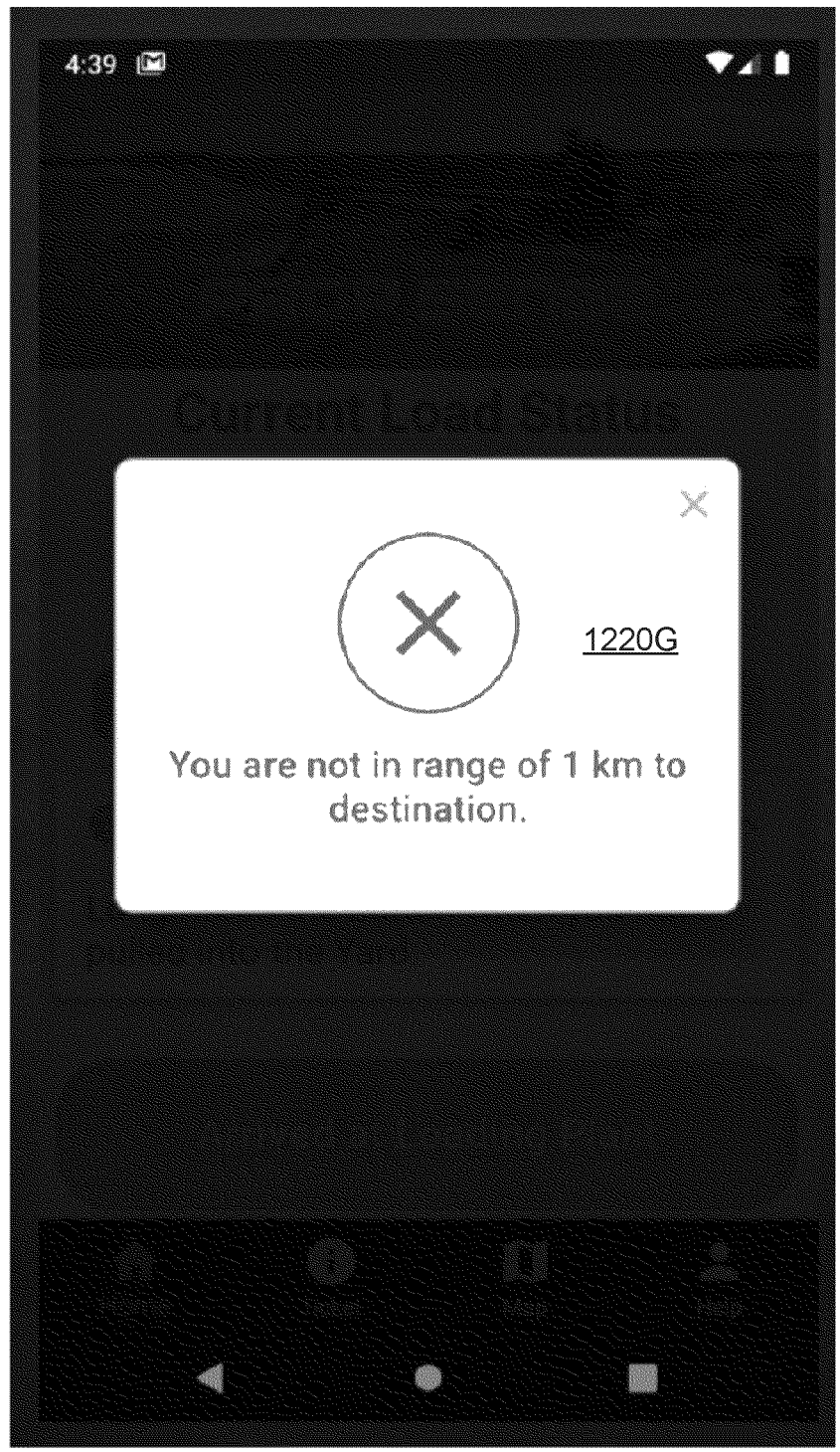
Figure 12E:
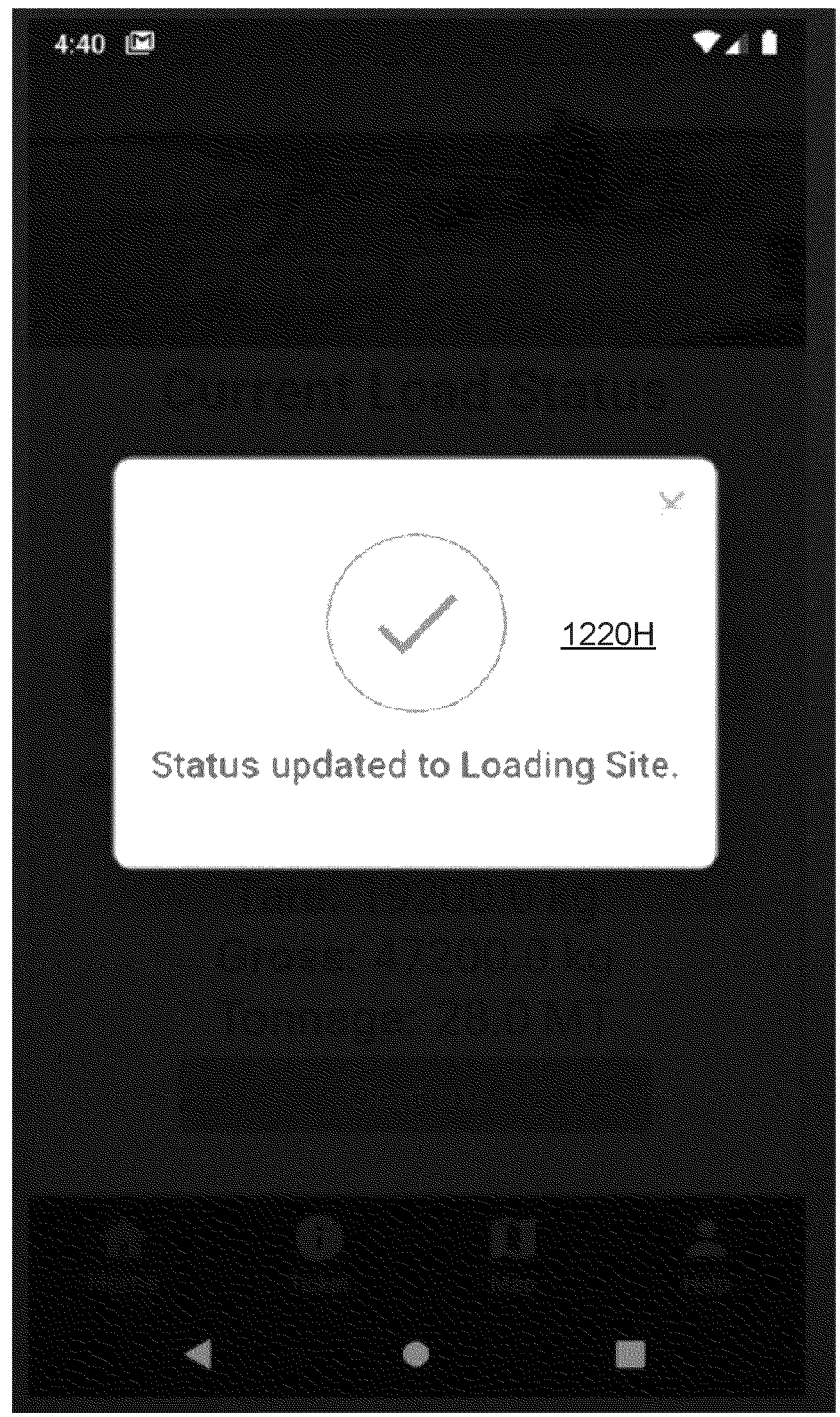
Figure 12F:
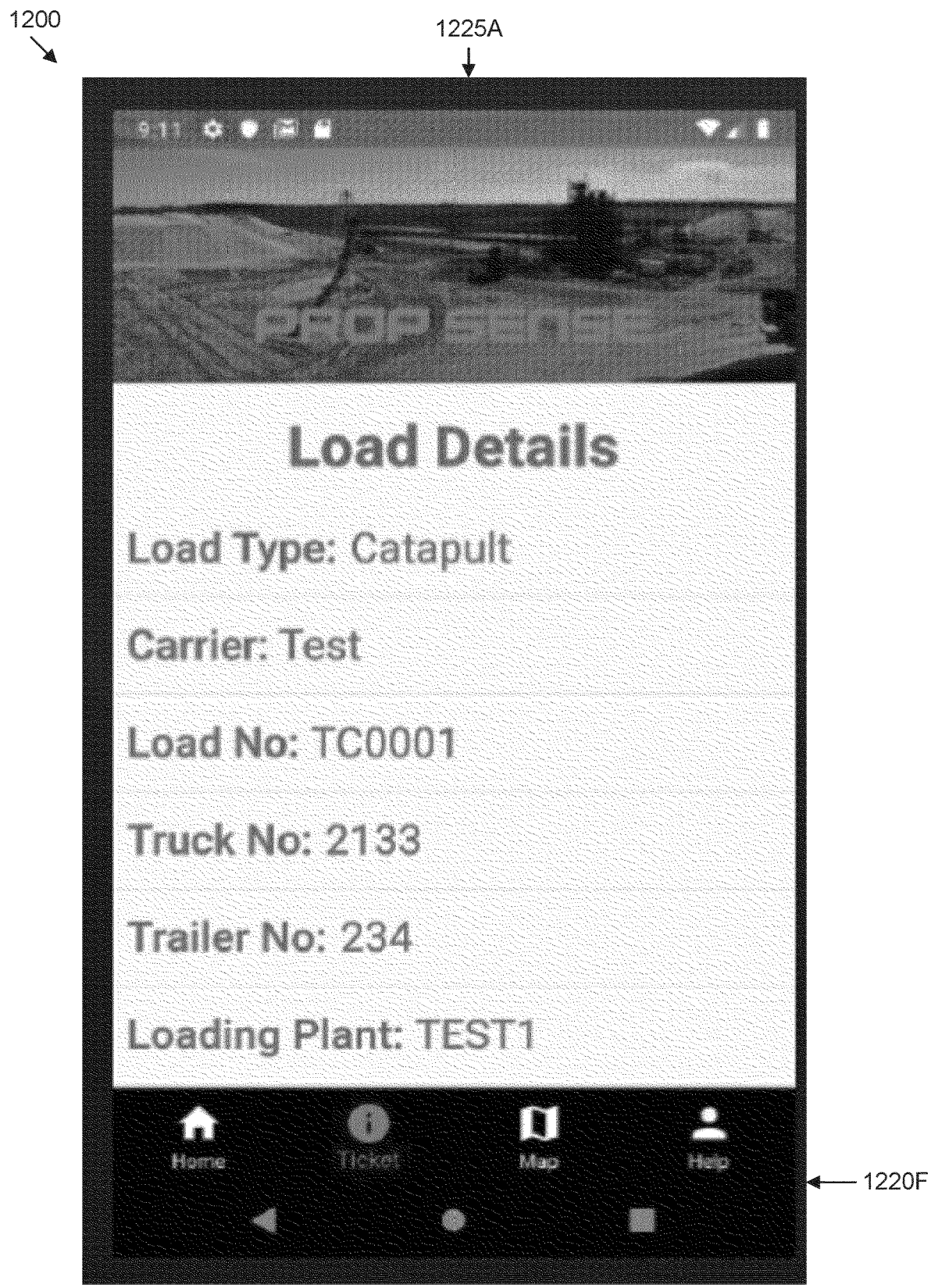
Figure 12G:
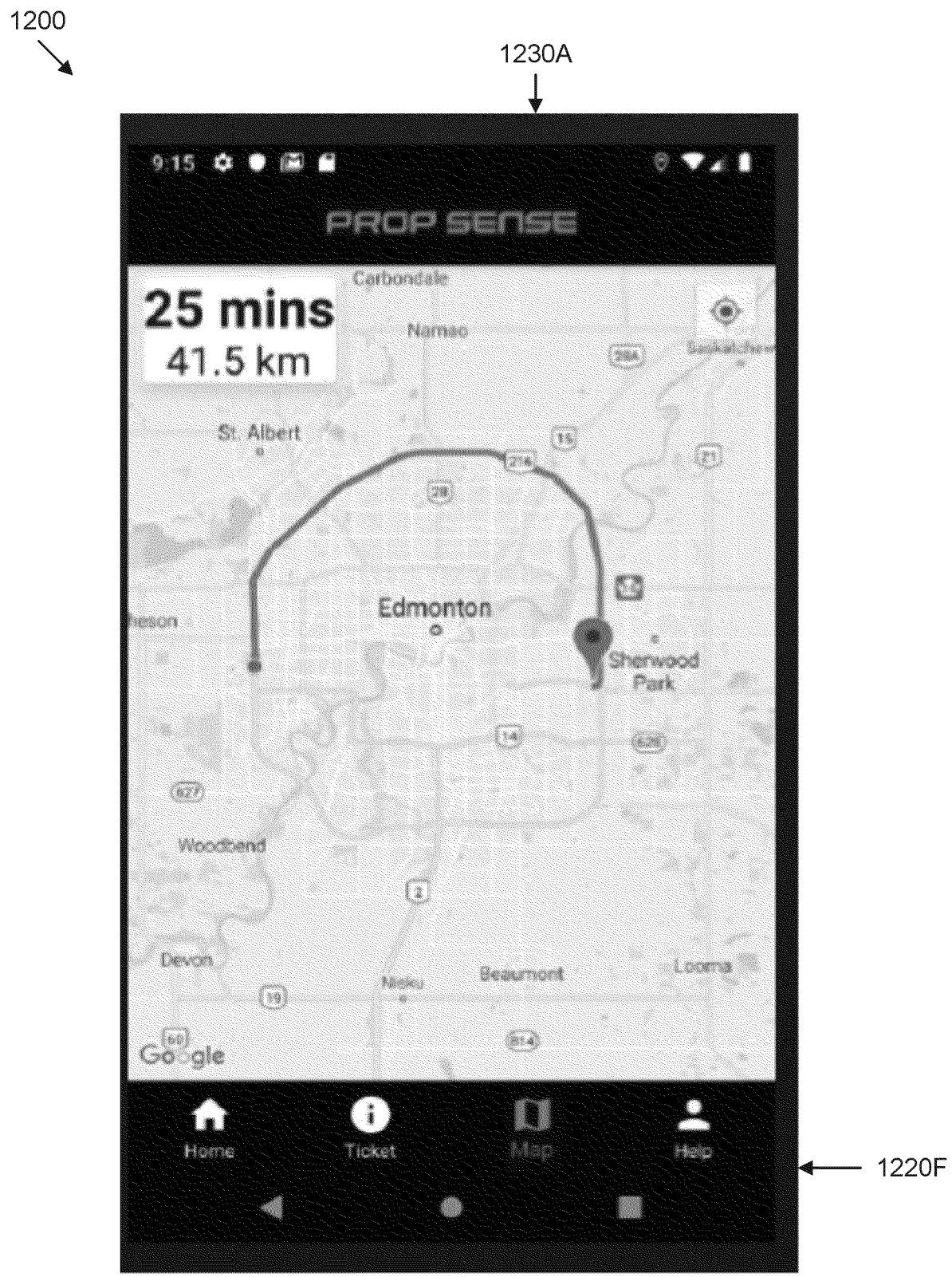
Figure 12H:
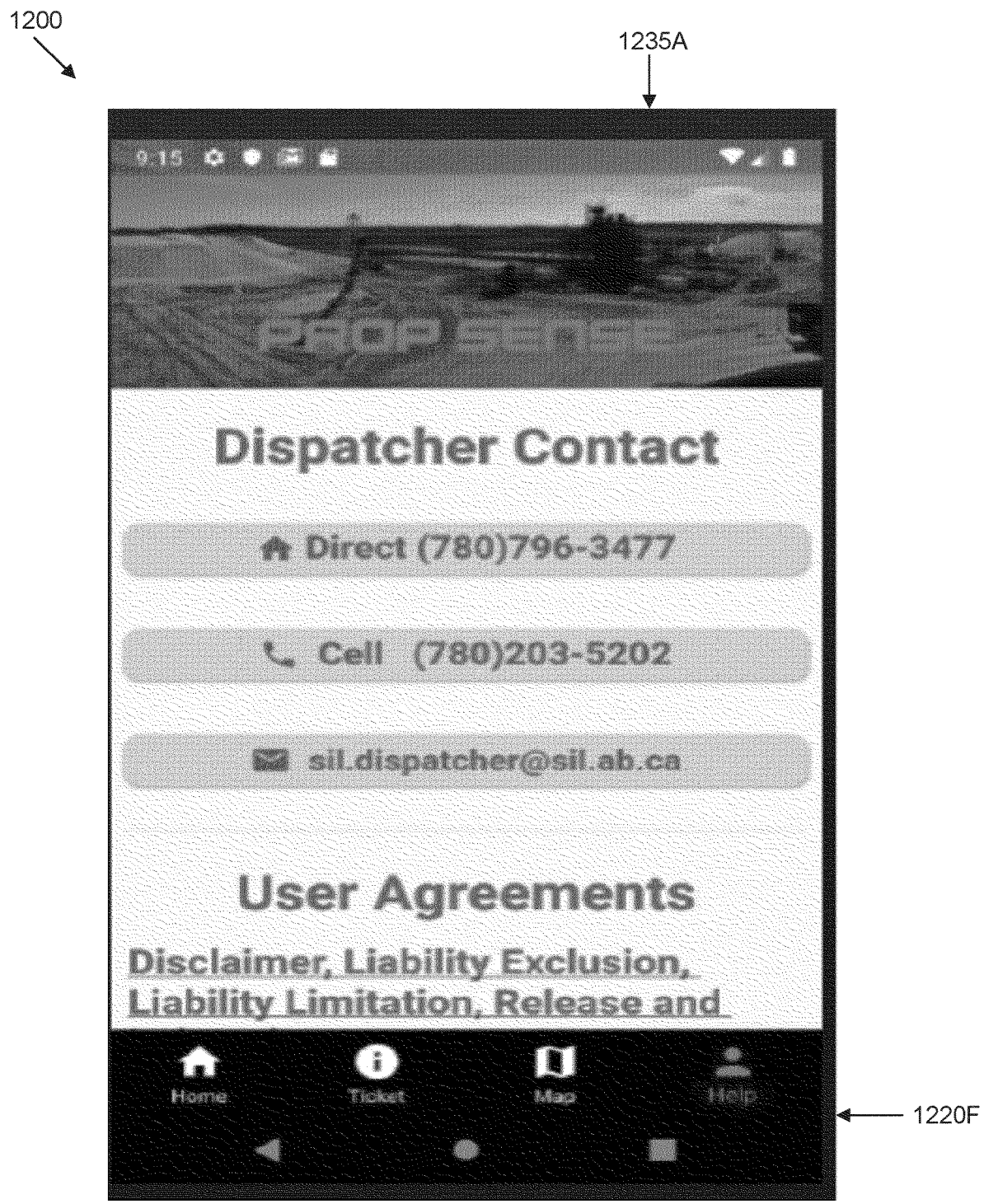
Figures 12I, 12J:
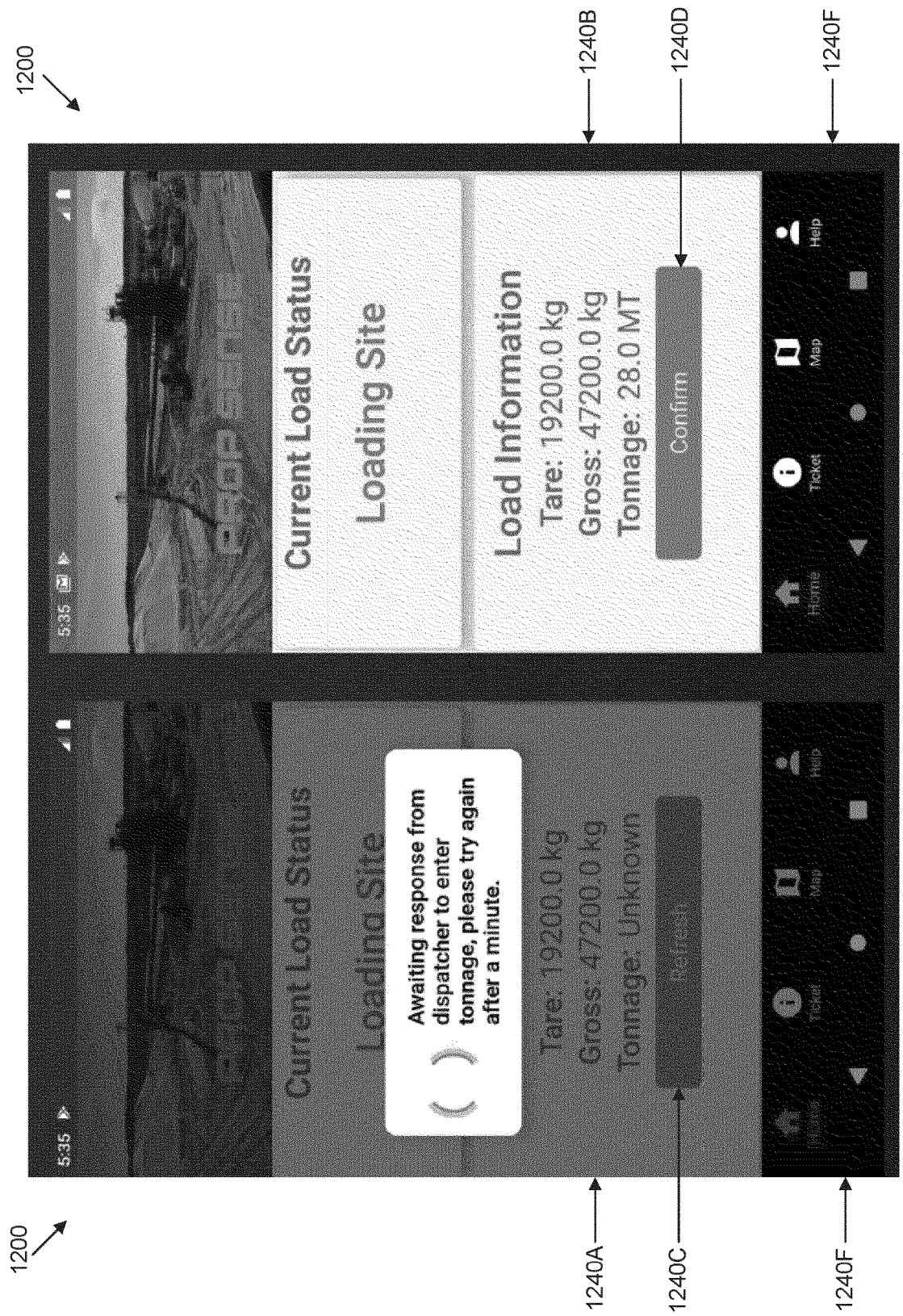
Figure 12K:
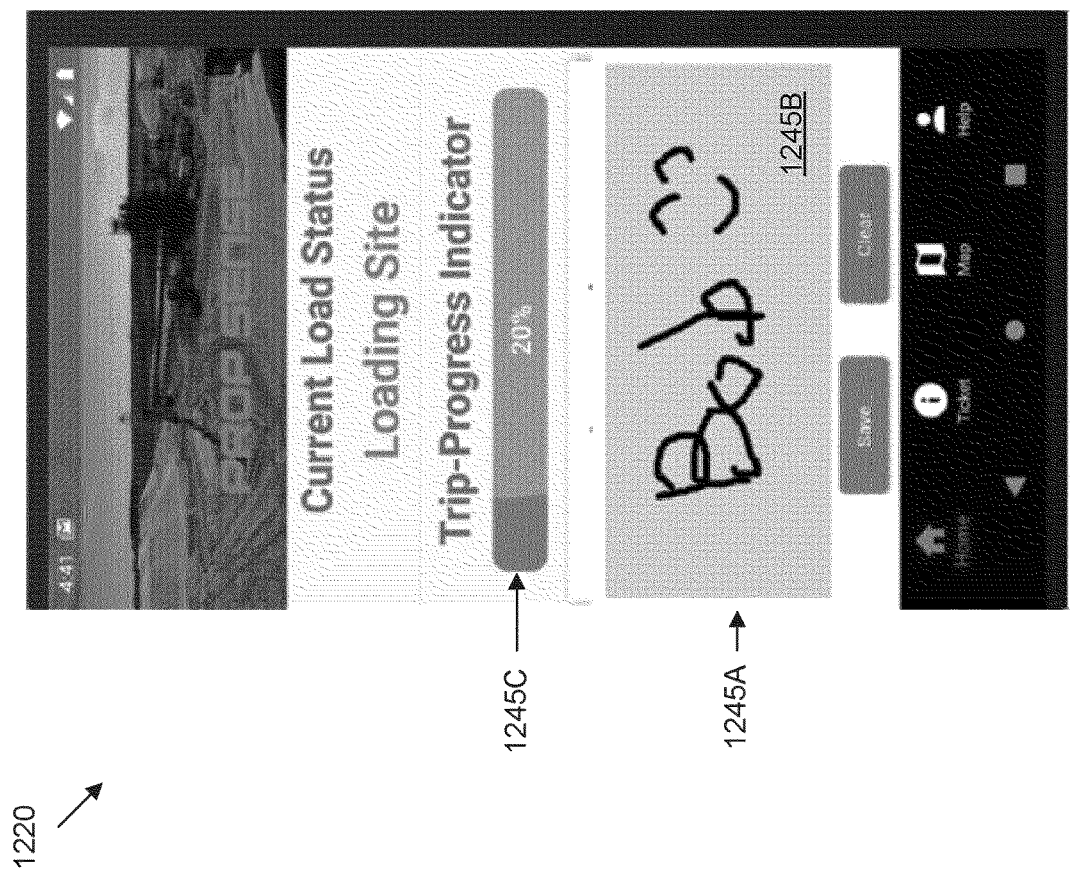
Figure 12N:
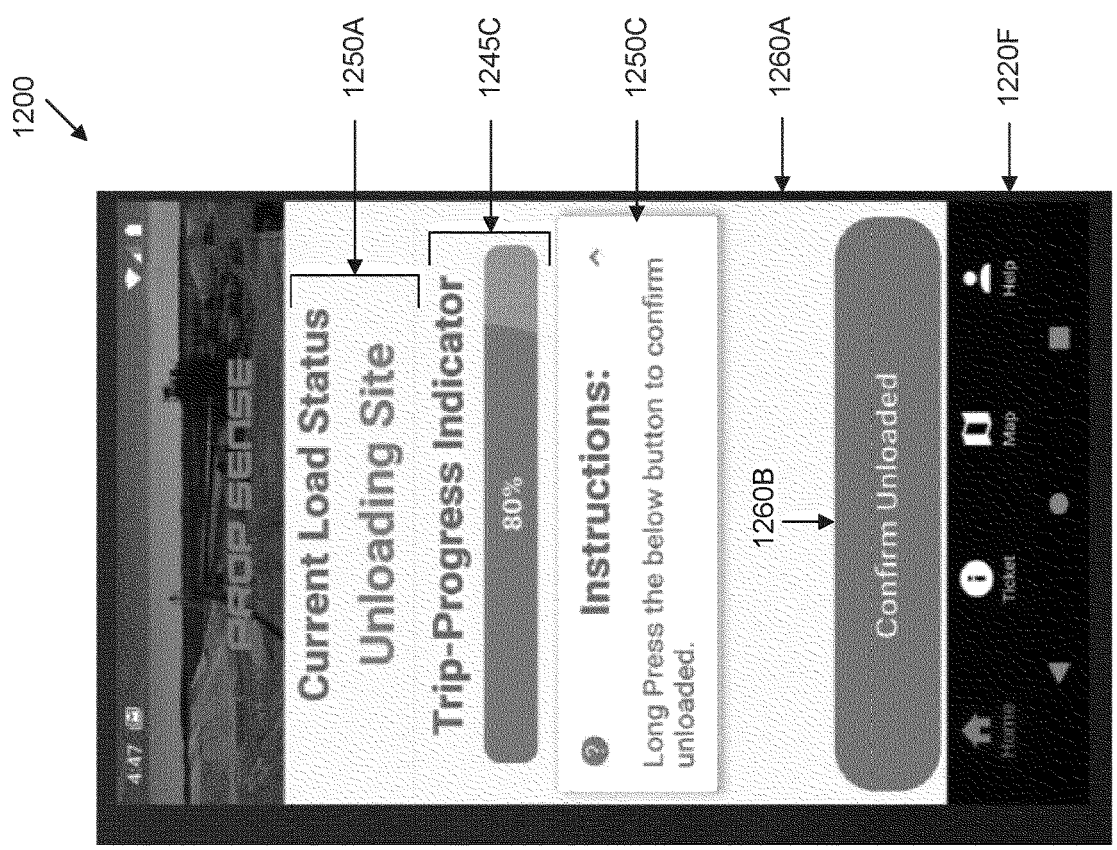
Figures 12O, 12P:
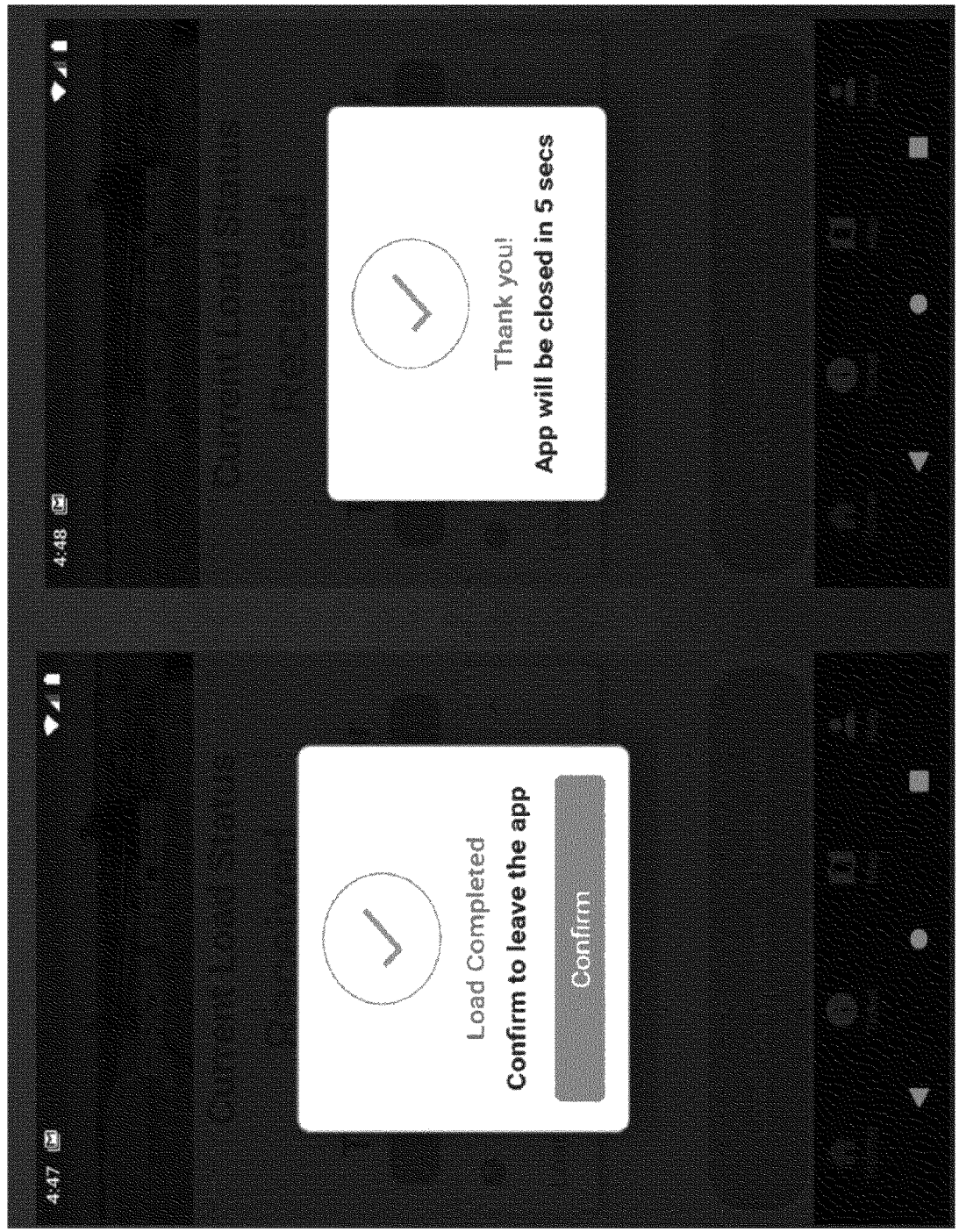

Turning now to FIGS. 12A-12P, interfaces of a drivers application 1200 are shown, in accordance with some embodiments of the present disclosure. The drivers application 1200 is analogous to the drivers application 270F of the proppant management system 200. The drivers application 1200 may be used by driver (e.g., truck driver) of a transport (e.g., truck or other vehicle carrying the proppant therein) delivering the proppant from the supplier to the wellsite 205. The drivers application 1200 may be accessible on a mobile device of the user (e.g., truck driver). The mobile device may include one or more circuits (e.g., one or more processors and non-transitory storage mediums housing one or more logics) that are structured to allow the mobile device to exchange data over a network (e.g., with the central server 240, and particularly with the proppant management application 235), execute software applications, access websites, generate graphical user interfaces, and perform other operations described herein. The mobile device may include one or more of a smartphone or other cellular device, a wearable computing device (e.g., eyewear, a watch or bracelet, etc.), a tablet, a portable gaming device, a laptop, and other portable computing devices.

In some embodiments, the user may be required to first download the drivers application 1200 prior to usage. For example, a provider (e.g., a software developer or publisher) may provide an executable file for downloading and installing the drivers application 1200 (e.g., via the developer's website, a digital marketplace, an app store, text message, etc.). Responsive to the user selection of an appropriate link associated with the drivers application 1200, the executable file may be transmitted to the user's mobile device and be installed on the mobile device. The drivers application 1200 may be embodied on the mobile device as one or more processors and instructions stored in non-transitory memory that are executed by the one or more processors, along with hardware and associated logics depending on the operations performed by the drivers application.

Upon installing and accessing the drivers application 1200 on the mobile device, the user may be taken to a home screen 1205 shown in FIG. 12A. In some embodiments, upon installing the drivers application 1200 and before allowing the user to access the home screen 1205, the user may be presented with the terms of a "privacy policy" or other types of terms of agreement. The user may be required to accept the terms of the "privacy policy" or the other terms of agreement before proceeding to the home screen 1205. In some embodiments, the "privacy policy" or the other terms of agreement may be presented the first time the user opens the drivers application 1200 upon installation. In other embodiments, the "privacy policy" or the other terms of agreement may be presented to the user each time the user accesses (e.g., opens) the drivers application 1200. In yet other embodiments, the "privacy policy" or any other terms of agreement may be presented to the user periodically. In some embodiments, the user may be required to complete other actions upon installing the drivers application 1200 before accessing the home screen 1205.

Upon reaching the home screen 1205, the user may be required to enter a username in a username field 1210A and/or a password in a password field 1210B. In some embodiments, the username to be entered in the username field 1210A may be a load number created at the wellsite 205 for ordering additional proppant and provided to the user. Further, in some embodiments, the password to be entered in the password field 1210B may be the transport number of the transport within which the user is transporting the proppant. In some embodiments, the transport number may be a numeric, alphabetic, or alphanumeric number assigned to the transport, such as a vehicle identification number, license plate number, a designated unique identification number, etc. In other embodiments, the password to be entered in the password field 1210B may include other types of designated information. In yet other embodiments, other types of authentication may be used to authenticate the user before allowing the user to access additional screens of the drivers application 1200. In some embodiments, the authentication via the username field 1210A and the password field 1210B may be skipped. In such cases, upon opening the drivers application 1200, the home screen 1205 need not be presented. Rather, the interfaces discussed below (e.g., the interface of FIG. 12B) may be presented instead. When the username/password fields are used, upon entering the username and password in the username field 1210A and the password field 1210B, respectively, the user may click on a sign-in button 1210C.

In some embodiments, if an incorrect username and/or password is entered, the home screen 1205 may present an error message to the user on the display of the mobile device, or provide another indication (e.g., vibrate) to notify the user that the authentication information is incorrect. In some embodiments, the drivers application 1200 may be configured to allow the user to try a designated number of times to enter the correct username and password before locking the user out of the drivers application. If the user is locked out of the drivers application 1200, in some embodiments, the user may be presented with contact information of an entity to unlock the drivers application. In other embodiments, the drivers application 1200 may present other options to the user to unlock the drivers application or to complete the authentication process.

Upon successful authentication, the drivers application 1200 may present an interface 1215A of FIG. 12B to the user. The interface 1215A may present a summary 1215B, for user review, of the ticket (e.g., BOL) including various details of the load (e.g., the additional proppant) that is being transported by the user. Upon confirming the accuracy of the information presented in the summary 1215B, the user may click on a confirm button 1215C. In some embodiments, if the information in the summary 1215B is incorrect, the user may be provided an option on the interface 1215A to contact an entity and/or to correct the information in the summary. Upon confirming the information in the summary 1215B, the user may be directed to an interface 1220A of FIG. 12C. It is to be understood that the details shown in the summary 1215B are only an example. In other embodiments, other, additional, or fewer details may be shown in the summary 1215B.

The interface 1220A may provide a current status 1220B of the load (e.g., the additional proppant), as shown in the database 260. Thus, the drivers application 1200 may interface with the central server 240 and access the database 260 directly or through the proppant management application 235. The database 260 may be updated with the current status of the load at several designated times from the time an order for the additional proppant is placed at the wellsite 205 to the time the additional proppant is received at the wellsite and stored in the first silo 210A and/or the second silo 210B. For example, when an order for the load is placed at the wellsite 205, the database 260 may indicate that the current status of the load is "ORDER PLACED" or the like. When the transport is loaded with the load and dispatched to the wellsite 205 and/or when the transport is sent from the carrier site to the supplier site for loading the additional proppant, the database 260 may be updated to reflect the current status of the load as "DISPATCHED," etc. In some embodiments, the current status of the load may be updated in the database 260 automatically upon certain conditions being satisfied. In other embodiments, personnel managing the proppant management application 235 or having permission to update the proppant management application may update the current status of the load in the database 260.

The interface 1220A may also display a trip progress indicator 1220C to indicate the progress of the transport from the carrier site to the supplier site and from the supplier site to the wellsite 205. For example, when the transport is still at the carrier site, the trip progress indicator 1220C may indicate "0%", while when the transport has reached a staging area at the wellsite 205, the trip progress indicator 1220C may indicate "100%." In some embodiments, the trip progress indicator 1220C may reflect the percentage of the distance covered between the carrier site and the wellsite 205 by the transport. In other embodiments, the trip progress indicator 1220C may indicate the trip progress in units of distance, time, or in any other way that is considered suitable. By virtue of reviewing the trip progress indicator 1220C, the operator, supplier, and/or carrier may track the movement of the transport. In some embodiments, separate trip progress indicators may be provided to track the trip from the carrier site to the supplier site, and from the supplier site to the wellsite 205. In some embodiments, the supplier and/or the carrier may track the progress of the transport using the carrier location portal 270C.

Additionally, the interface 1220A provides instructions 1220D for the driver to complete upon completing certain tasks or satisfying certain conditions. For example, the instructions 1220D instruct the driver to long press (e.g., press and hold) a button 1220E upon reaching the supplier site. In other embodiments, the instructions 1220D may provide other or additional instructions to the driver. In some embodiments, the supplier site may be a geo-fenced location and when the geo-fence is broken (e.g., the transport crosses the geo-fence), the current status of the load may be updated within the database 260 and/or an indication may be sent to a dispatcher at the supplier site that the transport has arrived. The instructions 1220D may include instructing the driver which loading platform to report to for loading.

Further, the interface 1220A may include a tab menu 1220F having one or more menu items (e.g., "HOME" "TICKET" "MAP" "HELP"). In other embodiments, the tab menu 1220F may include other, additional, or fewer menu items. Clicking on each menu item may display a different user interface. For example, the interface 1220A may correspond to the menu item "HOME" on the tab menu 1220F. In some embodiments, the selected menu item may be highlighted or otherwise appear different from the remaining menu items on the tab menu 1220F. Upon activating the "TICKET" menu item from the tab menu 1220F, an interface 1225A of FIG. 12F may be displayed. The interface 1225A shows the ticket details, which in some embodiments, may be the same details shown in the summary 1215B. In other embodiments, the interface 1225A may show additional details about the load. For example, in some embodiments, the interface 1225A may also display the "tare," "gross" and "tonnage" of the load that is on the transport. In some embodiments, the summary 1215B may also show the "tare," "gross," and "tonnage" of the load.

The "MAP" menu item on the tab menu 1220F may display a map interface 1230A of FIG. 12G. The map interface 1230A may highlight the route from the supplier site to the wellsite 205, may provide turn-by-turn navigation, provide an estimated arrival time at the wellsite, provide traffic and other real time road condition details, and any other information that may be considered desirable to help the driver navigate to the wellsite. In some embodiments, the information on the interface 1230A or portions thereof may be refreshed or updated periodically (e.g., every predetermined number of seconds, minutes, etc.). In other embodiments, the "MAP" menu item may show additional, different, or other types of information.

The "HELP" menu item may display a help interface 1235A of FIG. 12H. The help interface 1235A may provide contact information of the supplier, operator at the wellsite 205, carrier, etc. In some embodiments, the contact information on the help interface 1235A may be interactive such that the driver may click on a particular contact information to activate other features of the mobile device. For example, the driver may click on a phone number on the help interface 1235A to activate the phone or dialing feature on the mobile device. The "HELP" menu item may show additional, different, or other types of information to help the driver of the transport.

Upon reaching a designated area at the supplier site, the driver may long press the button 1220E to indicate arrival. In some embodiments, to prevent accidental pressing of the button 1220E, presses (single or double click) other than a long press of the button may prompt an error message. It is to be understood that "long press" of the button 1220E to indicate arrival is not intended to be limiting in any way. Rather, in other embodiments, other activation methods to activate the button 1220E may be used. For example, in some embodiments, short pressing, swiping, etc. may be used. In some embodiments, voice activation may be used to activate the button 1220E. In other embodiments, other types of activation methods may be used. Generally speaking, any of a variety of suitable activation and navigation mechanisms may be used to activate various features and/or to navigate various menus discussed throughout the present disclosure.

Further, in some embodiments, what is considered "reaching the designated area at the supplier site" may be predefined. In some embodiments, the designated area at the supplier site may be considered reached when a particular geo-fence at or near the designated area of the supplier site is broken. In other embodiments, the designated area at the supplier site may be considered reached when the transport is within a predefined distance (e.g., 1 kilometers) from that designated area. In other embodiments, the designated area at the supplier site may be considered reached upon satisfying other criteria. Thus, when the transport has reached the designated area at the supplier site, the driver may long press the button 1220E to indicate arrival. If the driver presses the button 1220E before reaching the designated area at the supplier site, the drivers application 1200 may display an error message 1220G, as shown in FIG. 12D. When the transport reaches the designated area at the supplier site and the driver presses the button 1220E, a confirmation message 1220H of FIG. 12E may be displayed to indicate arrival.

In addition to indicating arrival, the drivers application 1200 may establish contact with the central server 240 and update the current status of the load in the database 260. For example, in some embodiments, the current status of the load may change from "DISPATCHED" to "LOADING SITE" or the like. In some embodiments, a dispatcher at the supplier site may also automatically receive the ticket details from the proppant management application 235 upon the transport arriving at the supplier site. In other embodiments, the dispatcher may receive the ticket details in other ways such as manually accessing the ticket details from the proppant management application 235, scanning a bar code, QR code, or other code from the driver's mobile phone of the ticket details, using camera or Internet of Things ("IoT") sensors to "see" and identify the transport and the associated ticket.

At the supplier site, stage two of the order fulfilment process begins by assigning a load queue number to the transport to start the loading process (stage one of the order fulfilment process includes travel of the transport from the carrier site to the supplier site). The load queue number may identify the order in which the transport and all the transports that arrived before or after are to be loaded. When the transport's turn to be loaded with the proppant arrives, the transport may be driven to a loading platform. Referring now to FIGS. 12I and 12J, an interface 1240A or interface 1240B may be displayed when the transport is moved to the loading platform (or upon arrival at the supplier site). The dispatcher at the designated area at the supplier site may verify the ticket details. For example, in some embodiments, the dispatcher may verify the "tare," "gross" and "tonnage" of the load that is to be loaded on the transport and cross-reference that information with the ticket details.

If any of the "tare," "gross" and "tonnage" of the load to be loaded on the transport do not match the ticket parameters, then the proppant management application 235 may display an error message on the user interface being used by the dispatcher. In some embodiments, no variance between the "tare," "gross" and "tonnage" of the load to be loaded on the transport and the ticket details may be accepted. In other embodiments, some predetermined variance may be acceptable. Further, as the information is verified by the dispatcher, the interface 1240A may be updated. If any of the "tare," "gross," or "tonnage" fields in the interface 1240A are "UNKNOWN," the driver may press a refresh button 1240C to get the dispatcher's updated entry.

Once the verification process is over, the driver may press a confirm button 1240D. In some embodiments, the driver may also get a copy of the verification details from the dispatcher, may take a picture of the verification details/ticket information at the supplier site using a camera feature of the mobile device, and upload the picture to the drivers application 1200. In other embodiments, the driver may manually enter the order details into the drivers application 1200. Upon pressing the confirm button 1240D, an interface 1245A of FIG. 12K may be displayed. The interface 1245A may present a signature block 1245B for the driver to sign to acknowledge and confirm that the load has been loaded on the transport and verified against the ticket details. In addition, the interface 1245A may now show a trip progress indicator 1245C that provides current trip progress. Upon signing in the signature block 1245B, the stage two of the order fulfilment process is complete and a current status 1250A of the load is updated in the database 260 to "EN ROUTE" as shown in interface 1250B of FIG. 12L. The interface 1250B may also include instructions 1250C, which may instruct the driver of the transport carrying the proppant to long press a button 1250D upon reaching a staging or unloading site at the wellsite 205 from where the load is to be unloaded. Once the transport leaves the supplier site, a third stage of the order fulfillment process begins.

In some embodiments, what is considered "reaching the staging/unloading site" may be predefined similar to "reaching the designated area at the supplier site." In some embodiments, the transport may be considered to have reached the staging/unloading site when the transport crosses a geo-fenced location, when the transport has arrived at a predetermined area, when the transport within a predefined distance (e.g., 50 kilometers) from the staging/unloading site, etc. In some embodiments, when the transport arrives at the staging/unloading site, if the transport is the first in queue to be unloaded (e.g., based on an unload queue number), the driver may click on a skip button 1250E instead of long pressing the button 1250D. Upon long pressing the button 1250D or clicking the skip button 1250E, the third stage of the order fulfilment process is complete and the drivers application 1200 may display an interface 1255A of FIG. 12M, as well as update the current status 1250A to "UNLOADING STAGING" to start a fourth stage of the order fulfilment process. In some embodiments, interactions other than long pressing the button 1250D may activate error messages to prevent accidental pressing of that button. Further, in some embodiments, interactions other than long pressing the button 1250D may be used, as indicated above with respect to the button 1220E.

The interface 1255A may also display the trip progress indicator 1245C with an updated trip progress status, as well as display the instructions 1250C instructing the driver to long press on button 1255B upon reaching the unloading site. The unloading site may be the location at the wellsite 205 from where the proppant is unloaded from the transport into the first silo 210A and/or the second silo 210B. Upon long pressing the button 1255B (or other designated interactions with that button) upon reaching the unloading site, the fourth stage of the order fulfilment process is complete. Further, upon pressing the button 1255B, the current status 1250A is updated to "UNLOADING SITE," as shown in interface 1260A of FIG. 12N and the final stage of the order fulfillment process is begun.

Once the load (e.g., proppant) is unloaded from the transport, the driver may click on a button 1260B to confirm that the load has been unloaded. In some embodiments, a confirmation dialog box may pop up to request the driver to confirm that the load has been unloaded. Upon receiving confirmation from the driver, the drivers application 1200 may automatically close in some embodiments, as shown in FIGS. 12O and 12P. In other embodiments, the driver may close out the drivers application 1200.

To summarize, the driver/user using the drivers application 1200 may start the drivers application on their mobile device. The drivers application 1200 may track the journey of the transport to the wellsite 205 via the GPS capability on the mobile device. When the driver enters a designated geo-fenced area at the supplier site, various ticket details show up in a dispatch queue at the supplier site. The driver/transport is assigned (e.g., automatically upon verification of the order details) a lane or silo number to load the additional proppant. In some embodiments, a dispatcher at the supplier site may be alerted as the transport approaches the geo-fenced area. In some embodiments, transport time and location may be logged within the proppant management application 235 via automatic communication with the drivers application 1200 for use in evaluating wait times. If the transport either arrives or leaves late, alerts may start going out to the dispatcher. The fracking operation may be set up where the user establishes (e.g., via a user preference parameter) criteria for the acceptable amount of late time prior to notification to the dispatcher. When driver enters a geo-fenced area, ticket details may show up in a queue on the operator's/dispatcher's user interface (e.g., the HMI 275). Transport time of arrival and location may be logged, for use for billing wait times.

Figure 13:
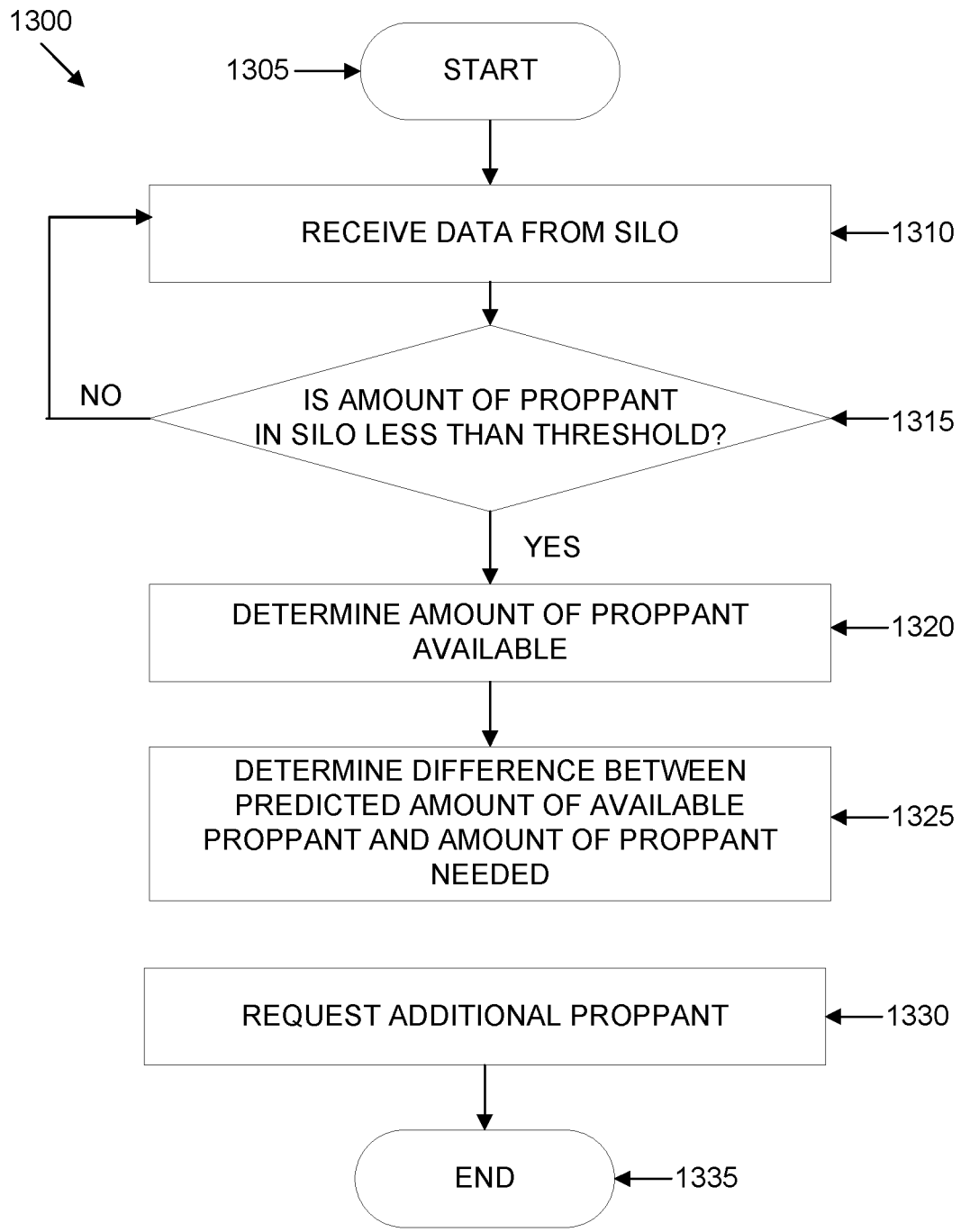
FIG. 13 is an example flowchart outlining operations of a process for ordering additional proppant based upon proppant levels within a silo at a wellsite, in accordance with some embodiments of the present disclosure.

Turning now to FIG. 13, an example flowchart outlining operations of a process 1300 is shown, in accordance with some embodiments of the present disclosure. The process 1300 may be implemented by the proppant management system 200 and particularly the proppant management application 235 and the HMI 275 of the proppant management system to monitor and replenish the proppant inventory. The process 1300 starts at operation 1305 with the customer creating an order for the fracking operation at the wellsite 205. In some embodiments, the customer may create the order for the fracking operation at the wellsite 205 using the customer portal 270A. Thus, although not shown, the customer portal 270A may include a user interface, a processor, memory, and other components to connect to and interface with the central server 240.

Using the customer portal 270A, the customer may define various operating parameters for the fracking operation. For example, in some embodiments, using the customer portal 270A, the customer may assign a customer user identification number to identify the customer and distinguish the customer from other customers at the wellsite 205 or at other wellsites. Via the customer portal 270A, the customer may also define the proppant types to be used for the fracking operation and the design parameters of the operation (e.g., the stages of the fracking operation, estimated daily consumption amount of the proppant during each stage of the fracking operation, preferred amount of proppant desired in a silo each day, etc.). In some embodiments, the design parameters may also include creating a list of labels for each stage of the fracking operation to permit the proppant management system 200 to continually update the amount of proppant needed during the remaining part of a particular stage. In some embodiments, each stage of the fracking operation may be referred to as a "frac zone."

The customer portal 270A may also be used to enter an estimated start date of the fracking operation at the wellsite 205, an estimated completion date of the fracking operation, an estimated total volume of the proppant needed during the fracking operation, geographical coordinates of the wellsite 205, list of names, locations (e.g., geographical coordinates), and other details of one or more preferred suppliers to supply the proppant, list of names, locations (e.g., geographical coordinates), and other details of one or more preferred carriers to carry the proppant from the supplier to the wellsite, travel conditions and preferred routes from the supplier to the wellsite, delivery location coordinates, together with stipulation of off-highway mileage and assumed travel speeds, identification numbers to each of the first silo 210A and the second silo 210B, user preference parameters, permission levels for each user to access the proppant management application 235, and any other details that may be considered desirable or may be needed to operate the wellsite 205 and perform the functions described herein. In some embodiments and depending upon the permission level, a particular user may have the ability to update or override one or more of the settings set by the customer via the customer portal 270A.

Thus, in some embodiments, pre job customer-driven inputs may include: Total job size by product type; Start date; End date; Daily volume by product; Loading location information: Average loading time at the wellsite 205; Loading location hours; Average haul time; Wellsite information: Average unloading times at wellsite; Unloading hours; Average loading times at the wellsite; Average haul time, including hourly fluctuations for peaking traffic (e.g., using Google map data); Average amount of time slower that the transport is versus the Google maps data; Average unloading times at wellsite, etc.

Upon creating the order for the fracking operation at the wellsite 205, the sensors 215A and 215B may be associated with/mounted on the first silo 210A and the second silo 210B, respectively. In some embodiments where sensors are used on other equipment of the wellsite 205, sensors may be associated with/mounted on the other equipment also. Further, the host device 220 may be set up to receive the sensor data from the first silo 210A, the second silo 210B, and the sensor data from any other sensor, and send that data to the central server 240. Thus, the proppant management system 200 may be set up for performing the fracking operation at the operation 1305.

In some embodiments, the customer may continue to monitor the fracking operation via the customer portal 270A. For example, in some embodiments, the customer may monitor, via the customer portal 270A, the status (e.g., completed, uncompleted, current zone, etc.) of the fracking operation, the total run time for each stage of the fracking operation, total amount of proppant consumed, by product type, during each stage, an estimated volume of the proppant needed to complete a particular stage of the fracking operation, an estimated amount of proppant needed to complete the fracking operation, current amount of proppant within each of the first silo 210A and the second silo 210B, any additional proppant that has been ordered, the current status of the additional proppant, (e.g., the additional proppant that is en-route, or dispatched but not unloaded, etc.), transports arriving to the wellsite 205 (e.g., via geofencing), etc. Generally speaking, the customer may use the customer portal 270A to set up the fracking operation and monitor the fracking operation.

Upon completing the setup for performing the fracking operation 1305, the proppant management application 235 starts receiving sensor data from the sensors 215A and 215B (and any other sensor at the wellsite 205) at operation 1310.

The proppant management application 235 may use the sensor data from the sensors 215A and 215B to automatically determine the amount of proppant currently stored within each of the first silo 210A and the second silo 210B, respectively. In some embodiments, an operator may monitor the proppant levels within each of the first silo 210A and the second silo 210B via the frac site portal 270B. Thus, although not shown, the frac site portal 270B may include a user interface, a processor, memory, and other components to connect to and interface with the central server 240. In some embodiments, the sensor data from the sensor 215A and 215B may be received continuously, while in other embodiments, the sensor data may be received periodically based upon the setup of the sensors. Similarly, the sensor data from any other equipment at the wellsite 205 may be received continuously or periodically, as desired. By receiving the sensor data and determining the amount of proppant based on the sensor data, the amount of proppant within each of the first silo 210A and the second silo 210B may be monitored and determined in real-time or substantial real-time. Further, as the operator confirms that a particular frac zone operation is completed, the proppant management application 235 may recalculate quantities of the proppant left within the first silo 210A and the second silo 210B to complete the remaining "frac zone" to enable a more accurate forecasting of the amount of proppant needed during each stage of a frac zone.

In some embodiments, the consumption of the proppant may be tracked based upon total number of frac zones and the volume per product needed for each frac zone. For each frac zone, the total amount and type of proppant may be defined. For example, in a fracking operation having two frac zones, the consumption may be defined as follows:

| Zone | 100 Mesh | 40/70 | Resin Coat |
| --- | --- | --- | --- |
| 1 | 200 | 200 | 20 |
| 2 | 180 | 200 | 10 |

It is to be understood that the above table is simply an example and not intended to be limiting in any way. Further, as the proppant is used and the as the fracking operation progresses, the belt scale depletes the total job demand. The total remaining for the job is then updated to sum the remaining planned tonnages for each of the remaining stages by product (as this could increase or reduce depending on what happened on the stages). The proppant management application 235 may automatically refresh totals to complete, and automatically starts reformatting its plans.

At operation 1315, the proppant management application 235 compares the data received at the operation 1310 with a predetermined threshold. In some embodiments, the customer may specify that the predetermined threshold as a user preference parameter when setting up at the operation 1305. In other embodiments, the predetermined threshold may be defined in other ways. Further, in some embodiments, the predetermined threshold may be a set percentage (e.g., 30%) of the total amount of proppant that may be stored within a particular silo. If the amount of proppant within a particular silo (e.g., the first silo 210A or the second silo 210B) is equal to or below the predetermined threshold, the process 1300 proceeds to operation 1320, and the proppant management application 235 may be configured to switch the discharge to another silo containing the same proppant type if it contains more than the predetermined threshold. If the amount of proppant within a particular silo (e.g., the first silo 210A or the second silo 210B) is greater than the predetermined threshold, the process 1300 may return to the operation 1310 to continue monitoring the amount of proppant.

At operation 1320, the proppant management application 235 determines the total amount of proppant that is available. The proppant management application 235 may determine the amount of a particular type of proppant that is available based upon the data received from the operation 1310. For example, if the first silo 210A stores a first type of proppant and the proppant management application 235 is determining the amount of the first type of proppant that is available, at the operation 1320, the proppant management application may consider the sensor data received from the first silo and the sensor 215A. In addition to the data from the operation 1310, the proppant management application 235 may consider other factors in determining how much proppant is currently available.

For example, in some embodiments, the proppant management application 235 may consider the amount of proppant (of the type for which the determination is being made) which is currently being unloaded into the first silo 210A and/or the second silo 210B. If proppant is currently being unloaded into the first silo 210A and/or the second silo 210B, the sensor data of the operation 1310 may change as the proppant is unloaded into those silos. In some embodiments, the proppant management application 235 may wait until the unloading is complete to receive updated sensor data at the operation 1310 before completing the analysis of the operation 1320. In other embodiments, the proppant management application 235 may receive the ticket details of the proppant that is currently being unloaded, determine the amount of the proppant being unloaded from the ticket details, and combine (e.g., add) that amount to the amount of the proppant already in the first silo 210A and/or the second silo 210B.

In some embodiments, the proppant management application 235 may also consider the amount of proppant that is not being unloaded currently but is still loaded onto a transport and waiting to be unloaded. Again, the proppant management application 235 may either wait for the transport to unload the proppant into the first silo 210A and/or the second silo 210B, and receive updated sensor data from the operation 1310. Alternatively, the proppant management application 235 may receive the ticket details of the proppant that is still to be unloaded and combine that amount with the amount of proppant already in the first silo 210A and/or the second silo 210B.

In other embodiments, the proppant management application 235 may also consider the amount of proppant (of the type for which the determination is being made) that is en-route, and therefore, anticipated to become available. For example, in some embodiments, the proppant management application 235 may obtain orders placed for additional proppant from the central server 240 to determine the amount of proppant of the particular type that has already been ordered, which is therefore expected to become available soon. In some embodiments, the proppant management application 235 may consider only those orders which are expected to be completed within a predefined period of time. In some embodiments, the proppant management application 235 may consider if other silo(s) at the wellsite 205 also store the same type of proppant. The proppant management application 235 may consider the amount of proppant stored in these other silo(s) in determining the total amount of proppant that is available for use.

Thus, at the operation 1320, the proppant management application 235 determines the total amount of proppant that is available and expected to become available based upon a combination of one or more of sensor data of the operation 1310, the amount of proppant of the type for which the prediction is being made currently being unloaded into the first silo 210A and/or the second silo 210B, the amount of proppant that is still loaded onto the transport and waiting to be unloaded, the amount of proppant that is en-route or for which orders have been placed, and the amount of proppant of the same type that may be available from other silo(s). In other embodiments, the proppant management application 235 may consider other or additional factors in determining the total amount of proppant that is available or expected to be available.

In some embodiments, the proppant management application 235 may perform the operation 1320 before the operation 1315. In such cases, the proppant management application 235 may determine the amount of proppant that is available in the silos (e.g., the first silo 210A and the second silo 210B), determine the amount of proppant that is expected to become available, as discussed above with respect to the operation 1320, and then compare the total amount of proppant that is available and expected to become available with the predetermined threshold. If the proppant management application 235 determines that the sum of the total amount of proppant that is available and is expected to become available is less than or equal to the predetermined threshold, the process 1300 may then proceed to operation 1325. If the proppant management application 235 determines that the sum of the total amount of proppant that is available and is expected to become available is greater than the predetermined threshold, the process 1300 may then return to the operation 1310.

In some embodiments, the proppant management application 235 may be configured to predict that the sum of the total amount of proppant that is available and is expected to become available is going to become equal to or less than the predetermined threshold in the near future even though that sum may be currently greater than the predetermined threshold. For example, in some embodiments, the past rate of proppant consumption may be indicative of future rate of consumption of the proppant. The proppant management application 235 may determine the actual consumption rate/consumption amount of the proppant in the past to predict how much proppant may be needed in the future. In some embodiments, the proppant management application 235 may determine the actual past consumption rate/amount for each fracking stage separately. In other embodiments, the proppant management application 235 may combine (e.g., average) the actual past consumption rate/amount for each fracking stage to obtain the actual consumption rate/amount for the entire fracking operation. Thus, in some embodiments, the proppant management application 235 may predict the amount of proppant needed in the future based upon historical consumption rate/amount of the proppant. In some embodiments, the proppant management application 235 may be configured to look at historical data of a particular fracking stage and/or historical data from a predetermined period of time (e.g., last 24 hours, last few days, etc.) to predict the anticipated consumption rate/amount.

For example, in some embodiments, the proppant management application 235 may determine that the consumption of proppant in the next predetermined period of time (e.g., next 24 hours) may be same as or similar to the consumption of proppant in the past predetermined period of time (e.g., past 24 hours). In other embodiments, the proppant management application 235 may look at the proppant consumption of a similar frac stage as the current frac stage and predict the consumption rate/amount. In other embodiments, the proppant management application 235 may use mechanisms to predict the future rate/amount of proppant consumption. In some embodiments, the proppant management application 235 may also consider other factors for predicting future need of proppant. For example, in some embodiments, the proppant management application 235 may consider weather conditions when predicting future consumption of proppant. For example, upon anticipating weather that is not conducive to a fracking operation, the proppant management application 235 may determine that the consumption of proppant may reduce. Likewise, upon determining that upcoming weather is expected to be optimal for fracking operations, the proppant management application 235 may determine that the consumption of proppant may increase. Thus, based upon the amount of proppant available, as computed at the operations 1310 and 1320, and the predicted rate of proppant consumption in the future, the proppant management application 235 may predict that the amount of proppant that is currently available (and is expected to become available) may become less than or equal to the predetermined threshold.

At the operation 1325, the proppant management application 235 may compare the amount of available proppant determined at the operation 1320 with a total amount of proppant that is still needed. In some embodiments, the process 1300 may be performed for each fracking stage in which case the total amount of proppant that is needed may be the amount still needed to complete the remaining fracking stage (e.g., current fracking stage), or the expected remaining frack stages within a defined period such as the remainder of the shift or over the next 24 hours, for instance. In other embodiments, the process 1300 may be performed for the entire fracking operation in which case the total amount of proppant that is needed may be the amount still needed to complete the remaining fracking operation. In some embodiments, the process 1300 may be performed for each type of proppant that is used and the total amount of proppant that is needed may be for each type of proppant needed to complete a particular fracking stage or the entire fracking operation.

Further, in some embodiments, the total amount of proppant that is still needed may be determined based upon the consumption of the proppant so far. For example, in some embodiments, the amount of proppant that may be needed for each particular stage and/or for the entire fracking operation may be specified by way of the user preference parameter by the customer at the operation 1305 while setting up the fracking operation at the wellsite 205. As each fracking stage progresses, proppant is consumed. The amount of proppant that is consumed may be tracked. By determining a difference between the amount of proppant consumed so far and the total amount of proppant needed for a particular fracking stage, the total amount of proppant that is still needed to complete that particular fracking stage may be determined. In some embodiments, the total amount of proppant that is still needed may be adjusted by an operator based upon anticipated operating conditions that may impact the consumption of the proppant. In other embodiments, other mechanisms may be used to determine the total amount of proppant that is still needed.

Thus, at the operation 1325, the proppant management application 235 may compute a difference between the total amount of proppant that is still needed and the predicted amount of proppant that is available to determine how much additional proppant is still needed. For example, when the total amount of proppant is for a particular fracking stage and the predicted amount of proppant that is available is also computed for a particular fracking stage, the difference that the proppant management application 235 computes at the operation 1325 is the amount of additional proppant needed for that particular fracking stage. When the total amount of proppant is for the entire fracking operation and the predicted amount of proppant that is available is also computed for the entire fracking stage, the difference that the proppant management application 235 computes at the operation 1325 is the amount of additional proppant needed for the entire fracking operation.

To order the additional proppant at operation 1330, the proppant management application 235 may automatically generate a new order having a new load number, and associate a variety of information with that load number. For example, in some embodiments, the proppant management application 235 may also provide the type and amount of the additional proppant that is needed, one or more suppliers from which to get the additional proppant, the unloading site (e.g., where the additional proppant is to be delivered), the date/time by when the additional proppant is needed, and any other information that may be needed or considered desirable in ordering the additional proppant. In some embodiments, the proppant management application 235 may determine the quantity of the additional proppant that is needed based upon a daily consumption rate of the proppant and a total amount of the proppant in the first silo 210A (and/or any other silo storing the same proppant type) that is available for use. Upon creating the order for the additional proppant, the proppant management application 235 may send the order to the carrier selected for transporting the additional proppant. The order details may also be visible to the operator via the frac site portal 270B. In some embodiments, the order may be generated automatically upon determining the proppant levels, as discussed above, without user input. In other embodiments, some user input may be needed or considered desirable (e.g., to override details in the order, etc.). The process 1300 ends at operation 1335.

In some embodiments, the proppant management application 235 may also be associated with a blender portal that may be used to monitor the flow rate of the proppant from the first silo 210A and/or the second silo 210B, the customer frac design status (e.g., completed, uncompleted, current zone, etc.), the run time, the product consumed by proppant type, the estimated volume to complete the project by proppant type, inventory onsite by storage compartment, inventory onsite by product type, inventory enroute by product type, inventory dispatched but not yet loaded by product type.

In some embodiments, depending upon the amount of proppant remaining with the first silo 210A at the operations 1310-1320, the proppant management application 235 may also slow the discharge rate of the proppant from the silos (e.g., the first silo 210A and/or the second silo 210B) or halt the discharge of the proppant from those silos while waiting for the additional proppant. For example, in some embodiments, the proppant management application 235 may modify the discharge rate (e.g., the amount of proppant being discharged from the silos during a given unit of time) for discharging the proppant when the amount of proppant remaining within a particular silo at the time of ordering the additional proppant is below a first low proppant level. The first low proppant level may be set as part of the user preference parameter by the customer at the operation 1305. In some embodiments, upon the proppant level in a particular silo reaching a second low proppant level, the proppant management application 235 may halt the discharge of the proppant from that silo for a predetermined time period. The second low proppant level and the predetermined time period may be based on the user preference parameter defined by the customer at the operation 1305. The proppant management application 235 may perform other management operations while waiting for the additional proppant.

Figure 14:
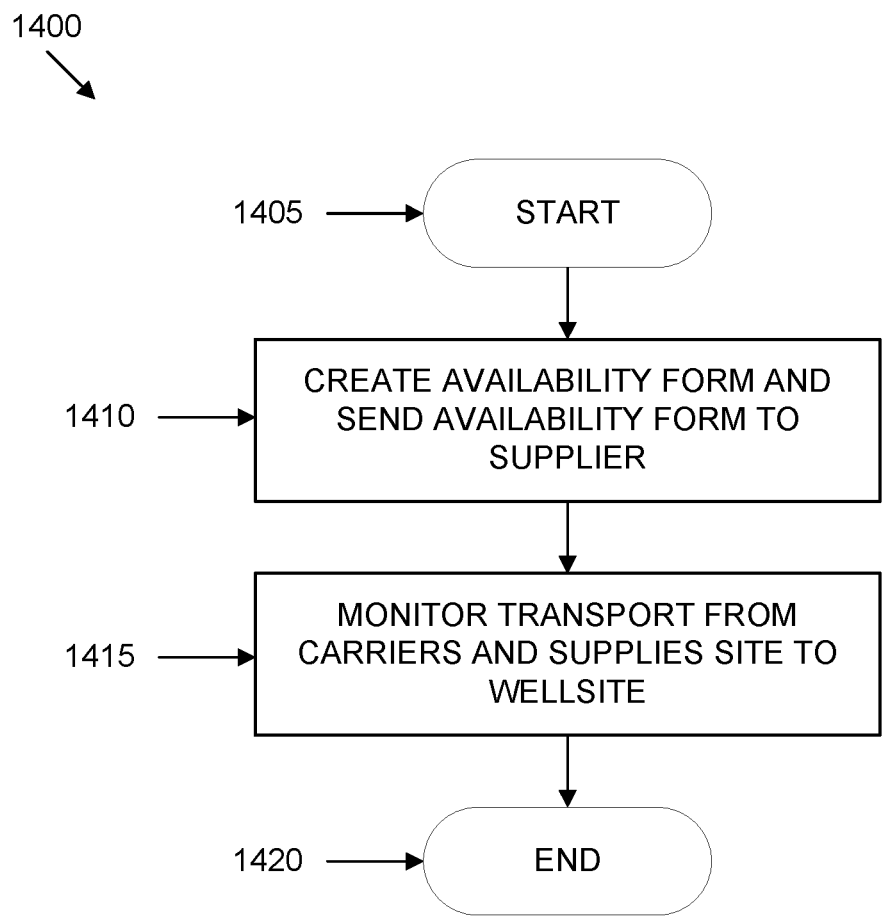
FIG. 14 is an example flowchart outlining operations of a process for receiving the order of FIG. 13 by a carrier, and assigning transport to carry the additional proppant, in accordance with some embodiments of the present disclosure.

Referring now to FIG. 14, an example flowchart outlining operations of a process 1400 is shown, in accordance with some embodiments of the present disclosure. The process 1400 may be implemented by the proppant management system 200, and particularly the proppant management application 235 and the carrier portal 270E of the proppant management system. Thus, although not shown, the carrier portal 270E may include a user interface, a processor, memory, and other components to connect to and interface with the central server 240. The process 1400 begins at operation 1405 with the carrier (to whom the order for the additional proppant was sent at the operation 1325) receiving the order via the carrier portal 270E. In some embodiments, the carrier may receive an indication via the carrier portal 270E that a new order is available, and the carrier may access the order details (e.g., type of the additional proppant, amount of the additional proppant, supplier to use for the additional proppant, etc.) using the load number assigned to the order.

Upon receiving the order for the additional proppant, the carrier may review its current transport inventory at operation 1410. In some embodiments, the carrier may maintain and control a fleet of vehicles (e.g., a fleet of transport). Each transport may be assigned a truck number (or other type of identification number to distinguish one transport from another transport). Each transport may also be associated with one or more transport drivers (e.g., truck drivers) who may be designated to drive that transport, as well as preferred routes and/or distances that the transport is designated to cover, safety and other maintenance inspection details, and any other information associated with each transport. Each transport may also be designed a carry a designated amount of material therein. In some embodiments, the carrier may review the current status of its fleet of transport using the carrier portal 270E and create an availability form. The availability form may identify one or more transports that are currently available and considered suitable to carry the additional proppant from the supplier to the wellsite 205. Depending upon the amount of the additional proppant that is needed and the volume that each transport is designated to carry, in some embodiments, the carrier may select a single transport on the availability form to fulfil the order. In other embodiments, the carrier may identify multiple transports to fulfil the order. In some embodiments, the availability form may also list the distance that each of those selected transports is willing to service, as well as any other details pertaining to those transports. In some embodiments, the review of the current transport inventory and creation of the availability form may occur automatically upon receiving the order at the operation 1405 without user input. In other embodiments, some user input may be needed or considered desirable (e.g., to override details in the availability form that is automatically generated, etc.).

In some embodiments, depending upon the permission level set by the customer for the carrier, the carrier may also use the carrier portal 270E to track the current status of the order. For example, in some embodiments, the carrier may use the carrier portal 270E to review the quantity of the additional proppant needed in the current order (e.g., order quantity by proppant type, product consumed by proppant type, estimated volume to complete the project by proppant type, site inventory levels by proppant type), an estimated total amount of proppant needed to complete a particular stage of the fracking operation, an estimated amount of proppant needed to complete the fracking operation, the total amount of proppant consumed during a particular stage, estimated amount of proppant consumed daily, current amount of proppant in each of the first silo 210A and the second silo 210B, a ticket (e.g., bill of ladings (BOL)) assigned to the current order by the supplier, information associated with the BOL, any past or future orders and associated BOLs, current status of the order (e.g., the location of the transport on its way to the wellsite 205), carrier's assigned BOL and associated information such as product types and volumes of proppant which are enroute but not yet delivered, carrier's dispatched BOL and associated information such as product types and volumes of proppant which are dispatched but not yet loaded, carrier's new BOL which are yet to be dispatched, and any other information that may be needed to perform the operations described herein or considered desirable to have for the carrier to manage the fleet of transport (e.g., to predict the need of transport for fulfilling any future orders, etc.). In other embodiments, the carrier may have the permission level to view additional, other, or less information from the proppant management application 235. In some embodiments, the carrier may retrieve information from the database 260 to track the current status of the order. In some embodiments, the carrier portal 270E may be configured to automatically pull relevant information from the database 260 without user input. In other embodiments, the carrier portal 270E may be configured to pull information from the database 260 on demand (e.g., upon receiving user input).

The carrier may send the availability form to the supplier listed in the order received at the operation 1405. The carrier may also notify the transport driver(s) associated with the transport(s) noted in the availability form to fulfil the order. At operation 1415, the carrier may monitor the transport(s) as they travel from their current location to the supplier, and from the supplier to the wellsite 205. The process 1400 ends at operation 1420. Travel of the transport(s) from the carrier site to the supplier site may be considered a stage one of the order fulfilment process. Thus, at the end of stage one, when the transport has arrived at the designated area at the supplier site, the current status of the load may be "LOADING SITE" or the like.

Figure 15:
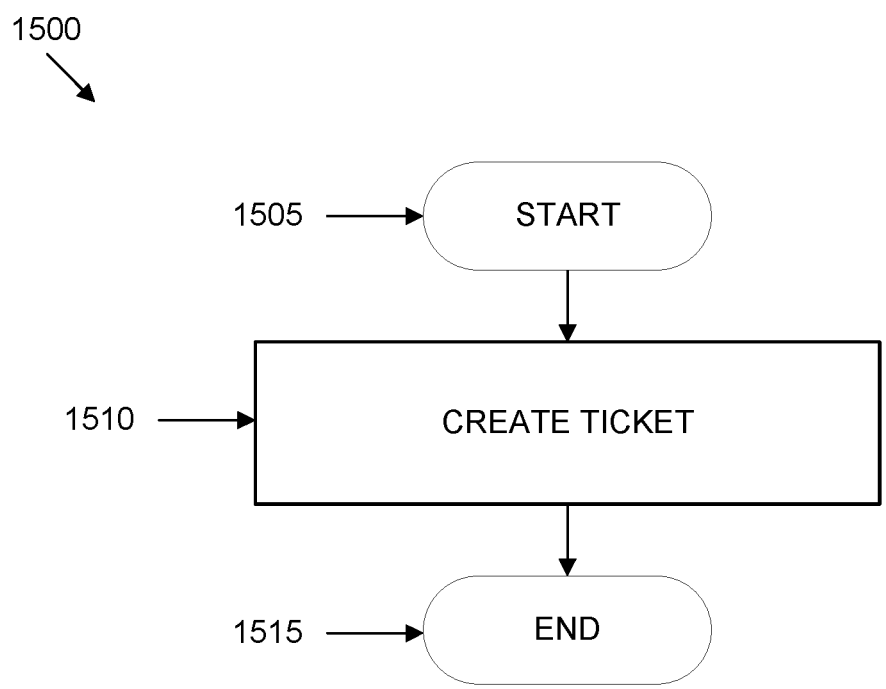
FIG. 15 is an example flowchart outlining operations of a process performed by a supplier upon receiving the order of FIG. 13 and the transport of FIG. 14, and loading the additional proppant on to the transport, and sending the additional proppant to the wellsite, in accordance with some embodiments of the present disclosure.

Turning to FIG. 15, an example flowchart outlining operations of a process 1500 is shown, in accordance with some embodiments of the present disclosure. The process 1500 may be implemented by the proppant management system 200 and particularly the proppant management application 235 and the supplier portal 270D of the proppant management system. Thus, although not shown, the supplier portal 270D may include a user interface, a processor, memory, and other components to connect to and interface with the central server 240. The process 1500 begins at operation 1505 with the supplier portal 270D receiving the availability form from the carrier portal 270E. Upon receiving the availability form from the carrier, the supplier portal 270D may automatically create a ticket (e.g., BOL) for the order at operation 1510. The BOL may include a variety of information. For example, in some embodiments, the BOL may include the order details (e.g., proppant type, proppant volume, etc.) from the order created at the wellsite 205. In some embodiments, the BOL may also include scheduled load times for loading the proppant, carrier information that sent the availability form at the operation 1505, estimated volume of the load being dispatched under the current BOL, anticipated volume of the load still to be dispatched within a predetermined amount of time (e.g., within 12 hours, within 24 hours, etc.), the weight (e.g., "tarre," "gross," and "tonnage") of the load being loaded into the transport, and any other details (e.g., identification number of the proppant, supplier location, load number, current status of the load, scheduled unload date at the wellsite 205, etc.) that may be needed or considered desirable in loading, dispatching, and tracking the load from the supplier site to the wellsite 205.

Upon creating the BOL, the proppant may be loaded into the transport and dispatched to the wellsite 205. The loading of the proppant into the transport and dispatch of the transport from the supplier site may be considered a stage two of the order fulfilment process. The process 1500 then ends at operation 1515. In some embodiments, the supplier and/or the carrier may track the movement of the transport to the wellsite 205. For example, in some embodiments, the supplier and/or the carrier may track the movement of the transport via the carrier location portal 270C. Further, depending upon the permission level set for the supplier in the user preference parameter, the supplier via the supplier portal 270D may be able to view certain types of information related to the order. For example, in some embodiments, the supplier may review order quantity, by product type; amount of proppant consumed, by product type, at the wellsite 205; estimated volumes of proppant needed in each stage to complete the fracking operation, by product type; inventory levels of the proppant, by product type, at the wellsite 205; BOLs (including past, present, and future BOLs) and associated information such as product types and volumes) which are enroute but not yet delivered, updated scheduled load and delivery times and carrier information, updated anticipated volumes still to be dispatched within 12 hours and within 24 hours, and any other information that may be needed or considered useful for the supplier to have.

The assigned BOL number and associated BOL data may also be visible on the drivers application 1200. For example, in some embodiments, the drivers application 1200 may display scheduled load time, scheduled delivery time, supplier site location, supplier loading lane assignment (e.g., load queue), delivery location, product type, and any other information that is desirable.

Figure 16:
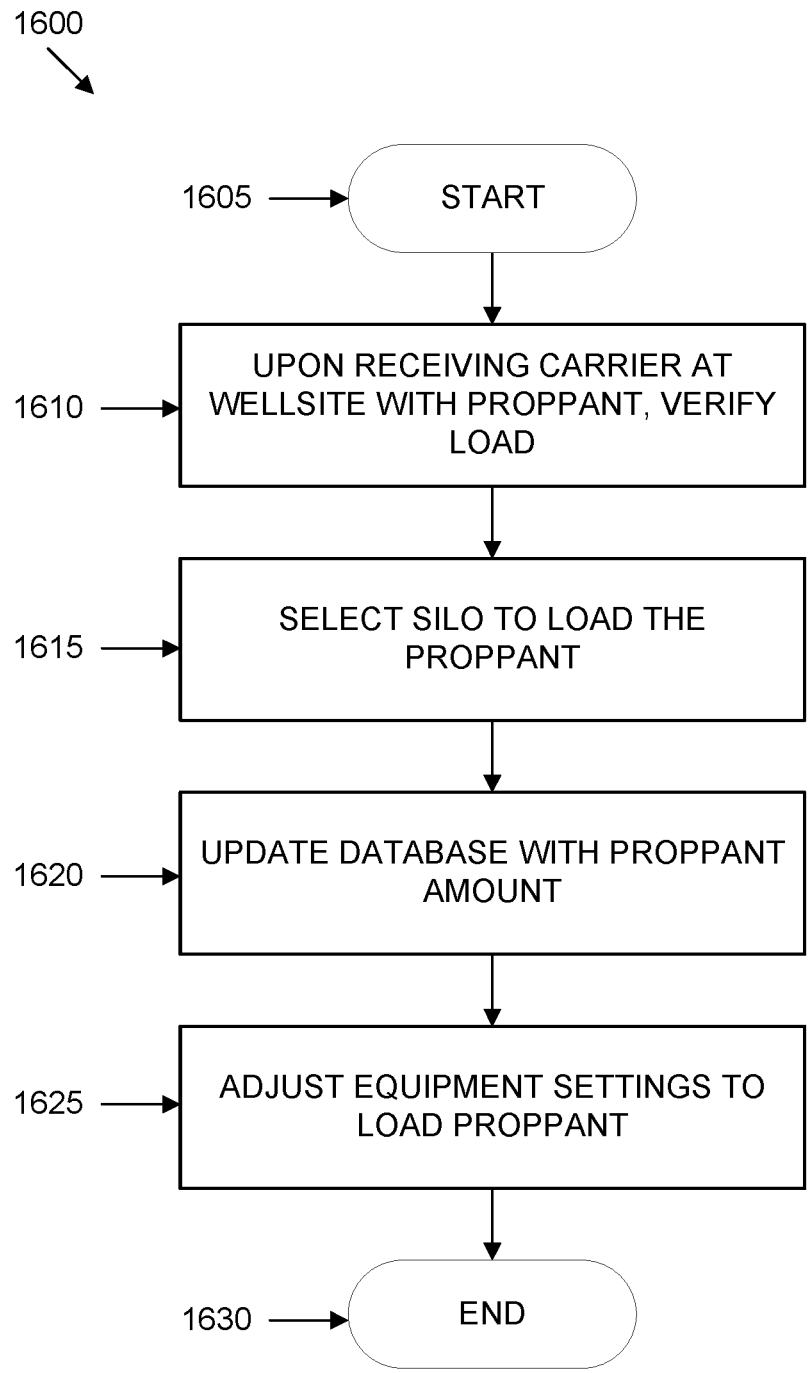
FIG. 16 is an example flowchart outlining operations of a process performed at the wellsite upon receiving the additional proppant, in accordance with some embodiments of the present disclosure.

Turning to FIG. 16, an example flowchart outlining operations of a process 1600 is shown, in accordance with some embodiments of the present disclosure. The process 1600 may be implemented by the proppant management system 200 and particularly the proppant management application 235 and the frac site portal 270B of the proppant management system. Thus, although not shown, the frac site portal 270B may include a user interface, a processor, memory, and other components to connect to and interface with the central server 240. The process 1600 starts at operation 1605 with the transport arriving at the wellsite 205 (e.g., at a designated area of the wellsite). When the transport arrives at the staging/unloading site at the wellsite 205, the frac site portal 270B may automatically pull up order details from the proppant management application 235, as discussed above.

The frac site portal 270B may include functionality to see the bins (e.g., the first silo 210A and/or the second silo 210B) that are available for use and bins that are "locked out" from receiving additional material. The frac site portal 270B may also be used for (a) Operator-defined preference for each compartment (e.g., the first silo 210A and/or the second silo 210B) for ideal percentage full for stocking in each compartment; (b) Customer consumption "frac design" status (completed, uncompleted, current zone); (c) Run time; (d) Product consumed, by product type; (e) Estimated volumes to complete the project, by product type; (f) Inventory onsite by storage compartment; (g) Inventory onsite by product type; (h) Inventory enroute, by product type; (i) Inventory dispatched but not yet loaded, by product type; and (h) Trucks arriving to site based on GPS geofence alerts for BOLs for trucks arriving to site, but not yet noted as unloaded.

Further, at operation 1610, the operator may verify the load on the transport against the order details. For example, in some embodiments, the operator may verify that the transport is carrying the right type of proppant as indicated on the order details. The operator may also verify the weight of the proppant on the transport and compare the weight with the information listed on the ticket that the supplier provided. In some embodiments, the operator may need to send an input via the frac site portal 270B to the proppant management application 235 upon completing the verification process. In other embodiments, the operator may scan the ticket into the proppant management application 235 upon completing the verification process. In yet other embodiments, the operator may take other actions to indicate that the verification process has been completed.

Upon verifying the information, at operation 1615, the proppant management application 235 may auto-select a silo (e.g., the first silo 210A or the second silo 210B) for loading the proppant from the transport into. In some embodiments, the proppant management application 235 may auto-select the silo based upon the user preference parameter. Thus, the proppant management application 235 may allow the customer to provide "preferred instructions" to build prioritization of silos to fill or empty based upon ensuring that the load is only loaded into silos with the same product, provide instructions to preferably not fill silos which are currently unloading, provide preference to fill the emptiest silo of that particular product type, or perhaps fill the fullest silo of that product type first, or any other specific instructions to allow the proppant management application 235 to auto-select a silo.

Thus, in some embodiments, the user preference parameter may define that the additional proppant is to be loaded into the silo having the lowest (or the highest) proppant level of the same type as the additional proppant. In such cases, the proppant management application 235 may compare the proppant level in each of the silos that store the same proppant type as the additional proppant, and identify the silo with the lowest (or the highest) proppant level. The proppant management application 235 may then select the identified silo for loading the additional proppant.

In other embodiments, the user preference parameter may define that a silo cannot receive the additional proppant while discharging the proppant previously stored therein at the same time. In such cases, the proppant management application 235 may select a silo that stores the proppant of the same type as the additional proppant and is not currently discharging proppant therefrom, or is not scheduled to discharge proppant when the additional proppant is to be unloaded into that silo. In some embodiments, if the proppant management application 235 identifies multiple silos, the proppant management application 235 may select one or more silos based upon a predefined criteria specified in the user preference parameter. For example, in some embodiments, the proppant management application 235 may select a silo having a lowest proppant level therein. In other embodiments, the proppant management application 235 may use other criteria.

Further, in some embodiments, the proppant management application 235 may receive an override indication from the operator of the frac site portal 270B. The override indication may be to override the user preference parameter for auto selecting the silo to load the additional proppant into. By overriding the user preference parameter, the operator may input the silo into which the additional proppant is to be unloaded. In other embodiments, the proppant management application 235 may use other criteria to auto-select the silo within the additional proppant is to be unloaded.

Upon assigning one or more silos to unload the additional proppant into and when the additional proppant is unloaded into the one or more silos, the proppant management application 235 may update the amount of proppant within the one or more silos. For example, the proppant management application 235 may receive indication from the sensors 215A and 215B and update the proppant levels. At operation 1625, the proppant management application 235 may optionally also alter the operation of one or more equipment. For example, in some embodiments, if the discharge rate of the proppant was modified (e.g., decreased) when the order was placed, the proppant management application 235 may again modify (e.g., increase) the discharge rate after the proppant levels have gone to up a predefined amount. Similarly, if certain equipment was stopped when the order for the additional proppant was placed, that equipment may be restarted. The proppant management application 235 may take any other action that may have been impacted while waiting for the additional proppant. The process 1600 ends at operation 1630.

In some embodiments, when the proppant has been unloaded, the following information may be attached back to the BOL: what silos the additional proppant was loaded into; what time the transport was unloaded; if the additional proppant is unloaded into multiple silos, then how much went into each of the silos.

Thus, the present disclosure provides a proppant management system which connects to and controls measuring devices, I/O controllers, sensors and components on handling and storage equipment. The proppant management system may include a proppant management application that may be accessible on the HMI directly (e.g., the HMI 275), or on apps accessible by tablet, computer, mobile devices, etc. with login credentials via various portals. The proppant management application may be programmed with various permission levels to allow different users (e.g., dispatcher, operator, carrier, supplier, and any other entity using the proppant management application) different levels of access to the proppant management application. The different permission levels may define the portions of the proppant management application that a particular user may access, whether a particular user may change information within the proppant management application, what type of information may the user change, etc. In some embodiments, the different permission levels may be indicated by the user preference parameter by the customer, and may be implemented by assigning and using user IDs. The customer (or a designated administrator) may enable, modify or terminate the permission levels. Thus, the permission levels may control access to various functions of the proppant management application, data or views for any user within the portals either by limitations established per type of user, or by limitations established for each user.

Further, the proppant management application permits auto-selection for unloading materials into containment compartments (e.g., silos) based on user-defined preferences, such as a preference to load into silo with the lowest volume of a product type or a preference not to select to load into a storage area which is simultaneously being unloaded at the same time unless it is the only storage area with sufficient storage capacity for the load, yet with the ability for operator to override these preference settings, "lock out" any or all compartments, or disable the auto-selection process. The proppant management application may also automatically monitor the inventory levels of proppant within each silo, and communicate through the remote SCADA system and host to monitor, report and display such inventory levels, inform the auto-order and auto-dispatch functionality, set alerts to user-defined alert recipients for certain user-defined conditions, such as high limit inventory levels or low limit inventory levels either on a system or product-specific basis, which the alert recipient may then manually intervene to resolve if desired.

A storage discharge system which may be selected to run in an autonomous mode, whereupon the operator tells the proppant management application what product or products are to be discharged simultaneously, and at what rate per product, then the rate per product may be controlled with either measuring devices such as belt scales, or with automation programming for unloading actuators which are programmed to certain percentages open to regulate discharge at certain discharge rates. The operator may specifically instruct the system not to discharge from one or a plurality of containment compartments within the storage system, yet the autonomous functionality would still work to discharge from the remaining containment compartments, and the PLC identifies all the containment compartments which already contain that product and what volume each has, and would look for the storage area which has the highest volume of that particular product type and may select that storage area to discharge from, set with a preference not to unload from a storage area which was being filled at the same time unless there are no other containment compartments with the same product required for the discharge. The present disclosure additionally permits either a weighing device, such as a load cell or belt scale, or a level sensor device, such as a radar or laser unit, to control the delivery of the inventoried material from the handling and storage system into the customers' downstream equipment to ensure that the actuators and/or belt scales react to speed up, slow down, stop or start the discharge of material from the handling and storage unit to ensure that the customers' downstream equipment neither runs out of material nor is overloaded with material.

When the system is using either a measuring device such as a laser or radar or a weighing device such as a load cell to control of flow of the inventoried material into the customers' downstream equipment, this may be accommodated by incorporating a small storage receptacle, which may be regulated by the bridging off of material at the discharge point or may alternatively be utilized with an actuated outlet which responds to either the measuring device or weighing device. In either scenario, the storage receptacle would be either measured or weighed by the load cell, and the handling and storage system would discharge material in order to maintain either a set level or a set weight on the load cell, thus permitting the system to speed up, slow down, stop or start the discharge of material from the handling and storage unit.

In some embodiments, the proppant management system permits the operator (and/or the customer) to define user-defined preferences to enable auto-selection of material to be discharged to customer's downstream equipment, such as a preference to always discharge from storage compartments with the lowest volume of the specified product type or a preference not to select to discharge from a storage compartment which is simultaneously being filled at the same time unless it is the only storage compartment with sufficient storage of that same specified product type, yet with the ability for the operator to override these preference settings or disable the auto-selection process In some embodiments, the proppant management system permits the Customer to determine if it may specify which one or more loading locations from which the material supply may be derived, thus permitting selection of a plurality of suppliers, or a plurality of supply locations from the same material supplier. In the event that supply is intended to be completed from a plurality of supplier locations, the Customer may determine its expected supply plan by assigning preset options including fixed tonnage per day which may be sourced from supply location #1, supply location #2, etc. until the full daily consumption is fulfilled, each of the foregoing being calculated by material type; percentages of each material type which may be assigned for dispatch from supply location #1, supply location #2, etc. until the full daily consumption is fulfilled, together with a maximum daily tonnage for each supply location; or setting preference by proximity or pricing, together with maximum daily volume for each supply location.

In some embodiments, the proppant management system may alert the operator and/or customer if the system determines that one of the materials may deplete faster than it may be replenished, such as if the supply source for that material involves a long haul route or if the supply of that material is limited in its supply and such limitation may affect the supply to the project. In such cases, the operator and/or customer may determine if it may accept similar material from another supply source or whether it may adjust the blend of the materials being discharged to customer's downstream equipment to include a higher discharge of the alternate material, updating the automated dispatch of BOL's accordingly.

In some embodiments, the proppant management system (e.g., via the carrier portal) may receive and prioritize job requests, and select individual transport units from a fleet to carry out the job requests. The job requests specify a virtual (e.g., mapped job location) representing an actual job location in the physical environment. The proppant management system may automatically determine the actual job locations associated with the virtual job locations, and automatically selects suitable transport unit(s) from the carriers to handle each job request. In some embodiments, the proppant management system may select the transport unit to handle the job request based on the selected transport unit's current status, configuration, or both the current status and the current configuration. The proppant management system may also send one or more commands to the selected transport unit to communicate the job request.

In some embodiments, the proppant management system may obtain GPS coordinates for the delivery location and all supplier locations, and uses both third party GPS systems as well as ongoing actual performance calculated by the proppant management system based on historic loads, in order to plan optimal routing together with transport time for various time periods in order to adjust load and unload times on the BOL in accordance with anticipated peak or non-peak hourly calculations. In some embodiments, the proppant management system may frequently communicate with GPS systems to update traffic or weather delays which may impact the distance or duration of the haul between the supplier and the destination, using such information to informing loading and unloading times associated with a BOL.

In some embodiments, the proppant management system may factor in calculations for the quantity of off-highway miles together with average travel speed in order to determine load and delivery times for the BOL. In some embodiments, the proppant management system may obtain average loading times at each supplier location, and factors the same into the BOL assigned by the proppant management system. In some embodiments, the proppant management system may obtain average dwell times for delivery at the destination for each delivery point, and factor the same into the BOL assigned by the proppant management system.

In some embodiments, the proppant management system may autonomously select or to permit human selection of a specific transport unit from the fleet and to determine an actual job location associated with the request, all in accordance with the map, and a network interface device to transmit one or more commands to the selected transport unit. The map also may define a set of virtual job locations, each virtual job location representing an actual job location in the physical environment. In some embodiments, the memory associated with the proppant management system 200 may also contain a status profile and a configuration profile for each transport unit. The status profile may include a file or data structure stored in the memory that includes records and/or fields suitable for holding and/or indicating one or more of a wide variety of different current status values or conditions for each mobile transport unit in the fleet, including without limitation the following: a transport unit identifier; a transport unit position; a current transport unit speed; a current job identifier; a current job status; a current job location; a proximity to material supplier location; a proximity form material supplier location to the job location; a proximity to the current job location; a current job destination path; an estimated time of arrival; an estimated time of departure; a transport unit idle time; a transport unit performance level; a transport unit payload status; and/or a transport unit payload error condition.

The configuration profile may include a file or data structure stored in the memory that includes records and/or fields suitable for holding and/or indicating one or more of a wide variety of different current configurations for each transport unit in the fleet, including the following: a material handling configuration; a maximum payload capability; a maximum drive speed; a maximum height; a minimum height; a location restriction; a zone restriction; a forbidden operation; a permitted operation; and/or a minimum clearance requirement.

In some embodiments, the proppant management system may automatically select a transport unit from the fleet to handle the job request based on the status profiles and the configuration profiles stored in the memory. Thus, the proppant management system may determine, based on the data in the status profile or the configuration profile, for example, whether the selected transport unit has a current status and a current configuration that is compatible with the job request. The proppant management system may further generate a BOL instruction which, when accepted by the selected transport unit, may cause the selected transport unit to drive to the material supplier in accordance with the assigned loading time, and then drive to the job location as defined by the map.

The proppant management system may permit the carrier to allow automatic assignment of the BOL to drivers wherein it factors in the drivers' capabilities, preference for assignment to certain transport units or types of transport units, and further calculates and anticipates hours of work ("Hours of Work") to comply with local standards. Such hours of work calculation may permit the transport carrier to detail the local regulations, such as: allowable driving hours per day; allowable non-driving hours per day; allowable consecutive days of work; and/or quantity of consecutive days required between consecutive days of work. The proppant management system may then calculate the anticipated daily driving and non-driving hours for the driver, the number of days since the driver was not working and puts the driver onto a schedule for forecasted days off. The forecasted days off is updated if the driver has days off which were not expected. The transport carrier may see a list of drivers which all appear differently, signaling their status by date, appearing as "Available", "Forecasted to be Out of Hours," "Unavailable," and "Out of Hours." If the carrier's dispatcher attempts to assign a BOL to a driver who is "Forecasted to be Out of Hours", an alert may come up to which the dispatcher may choose to dismiss, however, the system would not permit the dispatcher to assign a BOL to a driver labeled as "Unavailable" or "Out of Hours."

In some embodiments, personnel responsible for dispatching with the carrier may accept the BOL and instead manually select and assign each transport unit to each BOL generated by the proppant management system. In some embodiments, two or more transport units in the fleet may have statuses and configurations that are compatible with the job location and job operation in the job request. In these situations, the proppant management system may be configured to automatically determine, in accordance with an established status-based criteria, an established configuration-based criteria, or both, which one of the two or more compatible transport units in the fleet has a more favorable status and configuration for the job request. For example, a particular transport unit may be judged to have a more favorable status and configuration than any of the other candidates because it is closer to the job location, capable of moving with a higher velocity, has a higher number of idled hours to meet hours of service requirements and/or has a higher customer rating.

In addition, in specific embodiments, the proppant management system may receive with the job request a specified time for performance of the job request. In this case, the proppant management system may be configured to determine, based on the status profile for the selected transport unit, whether the current status for the selected transport unit is compatible with the specified time for performance. The current status of the selected transport unit may be determined to have a current status that is compatible with the specified time for performance because, for example, the selected transport unit may be idle and not otherwise engaged at the specified time for performance. Similarly, the proppant management system may determine, based on the configuration profile stored in the memory for the selected transport unit, whether the current configuration for the selected transport unit is compatible with the specified time for performance.

In specific embodiments, the proppant management system may receive a request to assign a particular transport unit to handle the job request and determine, based on the status profile for the particular transport unit, whether the current status for the particular transport unit is compatible with the job request. In that regard, a different transport unit may be selected for the job requests automatically if the status profile for the particular transport unit is not compatible with the job request. Similarly, the proppant management system may determine, based on the current configuration profile stored in memory for the particular transport unit, whether the current configuration for the particular transport unit is compatible with the job request. In that regard, a different transport unit could be selected for the job request automatically if the configuration profile for the particular transport unit is not compatible with the job request.

In some embodiments, the queue may also be configured to periodically receive status profile updates and/or configuration profile updates for the selected transport unit, as well as for every transport unit in the fleet. Further still, in some embodiments, the proppant management system may receive a first planned path that the selected transport unit plans to use to drive to the specified material supplier and then to the specified job location and a second planned path that a second transport unit in the fleet plan to use. The proppant management system may make a determination as to whether the first planned path intersects the second planned path and, if so, select a different transport unit to handle the job request. In specific embodiments, the BOL may remain with a status "pending acceptance" until the dispatcher "accepts" the BOL and may either assign the transport unit or permit the proppant management system to automatically assign the transport unit, and the proppant management system may permit the user to stipulate the amount of time within which the dispatcher at the transport fleet to accept the BOL before the proppant management system retracts the BOL and reassigns it to another transport fleet.

In alternate embodiments, the proppant management system may post the loads together with requisite information including the pay rate for the load, and the system could permit transport fleet dispatchers to accept the BOL as desired, which once accepted, the BOL may no longer show up as an available BOL. In some embodiments, the proppant management system may receive a signal indicating that no transport unit in the fleet is available to handle the job request and, in that case, may either select transport units from alternate transport fleets, or may automatically delay selecting a transport unit from the fleet to handle the job request until a transport unit from the fleet becomes available. Additionally, in specific embodiments of the method, the proppant management system may receive a signal indicating that the selected transport unit failed to accept the job request and, in that case, may automatically select a different transport unit from the fleet or from other fleets to handle the job request based on the status profile and the transport unit configuration profile stored in the memory for the different have a transport unit. In some embodiments, if the carrier users multiple drivers who may operate any transport unit within a section of the carrier's fleet, then the carrier may match the BOL to a driver from a list of drivers in its fleet. In some embodiments, the driver's application (or dispatcher) may then assign the BOL to a driver. The supplier receives the BOL and sees the loads scheduled, with controlled information as Master User determines, such as: (a) Freight company; (b) Truck driver information; (c) E&P data; (d) Pressure pumper data; (e) Maximum load size (e.g., 35 tons vs. 28 tons); (f) Load/BOL number. The supplier may also be able to assign the lane or silo number which the truck should go to for loading.

In some embodiments, BOL may be configured to automatically assign a transport hauler to the BOL based on the database of the transport hauler capabilities and capacity, quantity of suitable transport units and transport base location or to permit a transport dispatcher to make such assignment manually; BOL have load time and unload times, but which information could be edited by a user such as a dispatcher or transport hauler; BOL specify quantity and product type that the transport hauler may be picking up; material supplier may interface with the BOL in order to assign the area in which the transport hauler should attend in order to be loaded with the material covered in the BOL; and material supplier may upload their material and attach it to the BOL, whereupon such information is available to users who have permission to view such field in the BOL.

In some embodiments, BOL orders may be created automatically factoring in the volume of storage for each product type, ideal storage levels for that product type, anticipated consumption, anticipated haul distances and duration including factors for weather or transport delays, BOL which are loaded but not yet received to the storage system, BOL's which are issued to transport haulers but not yet loaded by material supplier including the system which: the auto-dispatch volume may then be divided by the operator's defined "load size" to derive a "load quantity"; such auto-dispatch BOL creates unassigned BOL's which a transport dispatcher may manually assign to haulers or which the system may automatically assign to haulers; factors in scheduled maintenance time at destination which a user interfaces to input fields for the scheduled dates and times in which no consumption may occur, such system which would additionally request if the user intends to fill the storage system areas higher than typical stocking levels; may permit the user to enter an unexpected consumption delay, whereby the functionality may permit the user to use a field signaling that there is an unscheduled delay onsite, together with how long the user thinks the delay could be, estimated consumption restart time, such that the auto-dispatch system stops dispatching more BOL; following such interruptions in intended consumption, may send alerts to users and transport dispatchers if there is more product dispatched that may fit in the remaining storage, so they may contemplate resolutions, such as rerouting the trucks to alternate storage systems, canceling the BOL which are not yet loaded, or to leave BOL as is together with risk that wait time could accrue for the transport hauler; may permit either the user or the measuring devices to signal when site conditions are known to be resolving in order for dispatch of BOL to restart whereupon user updates the consumption requirements for the current shift, next shift, and the following shift, thus restarting the auto-dispatch.

In some embodiments, load assignments and BOL's are autogenerated using algorithms which calculate factoring customer daily demand, inventory in stock, haul distance and duration together with weather or traffic factors which may impact either the distance or duration, and product loaded by not yet received, such that: (a) BOL's may be configured to automatically assign a transport hauler to the BOL based on the database of the transport hauler capabilities and capacity, quantity of suitable transport units and transport base location or to permit a transport dispatcher to make such assignment manually; (b) BOL's have load time and unload times, but which information may be edited by a user such as a dispatcher or transport hauler; (c) BOL's specify quantity and product type that the transport hauler is to be picking up; (d) material supplier may interface with the BOL in order to assign the area in which the transport hauler should attend in order to be loaded with the material covered in the BOL; and (e) material supplier may upload their scale ticket and attach it to the BOL, whereupon such information may be available to users who have permission to view such field in the BOL.

In some other embodiments, algorithms may calculate and create BOL orders automatically factoring in the volume of storage for each product type, ideal storage levels for that product type, anticipated consumption, anticipated haul distances and duration including factors for weather or transport delays, BOL's which are loaded but not yet received to the storage system, BOL's which are issued to transport haulers but not yet loaded by material supplier. In some embodiments, the auto-dispatch volume is then divided by the operator's defined "load size" to derive a "load quantity." Such auto-dispatch BOL creates unassigned BOL's which a transport dispatcher may manually assign to haulers or which the system can automatically assign to haulers. The BOL also factors in scheduled maintenance time at destination which a user interfaces to input fields for the scheduled dates and times in which no consumption occurs, such system may additionally request if the user intends to fill the storage system areas higher than typical stocking levels. The BOL may also permit a user to enter an unexpected consumption delay, whereby the functionality permits the user to use a field signaling that there is an unscheduled delay onsite, together with how long the user thinks the delay could be, estimated consumption restart time, such that the auto-dispatch system stops dispatching more BOL's. Following such interruptions in intended consumption, alerts may be sent to users and transport dispatchers if there is more product dispatched that fits in the remaining storage, so they can contemplate resolutions, such as rerouting the trucks to alternate storage systems, canceling the BOL's which are not yet loaded, or to leave BOL's as is together with risk that wait time could accrue for the transport hauler. The user may be permitted either the user or the measuring devices to signal when site conditions are known to be resolving in order for dispatch of BOL's to restart whereupon user updates the consumption requirements for the current shift, next shift, and the following shift, thus restarting the auto-dispatch.

In some embodiments, the proppant management system may permit a user (e.g., carrier or supplier, etc.) to invoice the customer from the proppant management system based upon pricing entered into the order. In some embodiments, the proppant management system may permit the user to create a payable invoice to reflect amounts owing to material suppliers or transport carriers.

In some embodiments, for a scheduled maintenance time, the Storage Operator may input scheduled dates and times in which no pumping is to occur (which would deplete the site inventory). The system may ask if the Storage Operator wants to "fill the bins", as would typically be preferable to ready the site for continued operation. If "Yes", BOLs may be generated for storage volumes which are available, less the volumes enroute to wellsite. If "No", the system permits the Storage Operator to either keep the scheduled stocking level, or choose another level.

In some embodiments, the proppant management system may include a conveying system and one or a plurality of storage system and downstream secondary equipment may be collectively operated by the main controller to enable loading of the storage system with material from the transport trucks and to enable on-demand discharging of the material from the storage system into the downstream secondary equipment. As the material is discharged by transport units into the conveying system, the conveying system transports the material into either the inlet of a contained area in the storage system or to the end of conveyors which are part of the storage system and which transport the material to other contained areas within the storage system. Each containment area in the storage system has the inlet port which may have a manually operated or actuated gate therewith, and if the first storage containment is desired to be filled, then such gate would be in an opened position so that material conveyed by the conveyor system may discharge through the open gate into that containment area. Alternatively, if the gate is closed, material may be conveyed using conveying equipment in the storage system to the next available open gate. If all the gates of the upper conveyor of the first storage system are closed, the conveying units in the storage system may discharge the material from the outlet end thereof into the inlet hopper of the next storage system in series therewith. The process may be automated by initially filling the first containment area in the row until the measuring devices detect that the first containment area is full, causing the controller to close the inlet gate associated therewith so that material is conveyed to the next containment area with the same product type along the row. The inlet gate associated with that next containment area remains open until the measuring device associated therewith detects that the next containment area is full, causing the controller to close the inlet gate associated therewith so that material is conveyed to the next containment area with the same product type along the row. This operation may continue until all containment areas of that same product type are full. If all containment areas have levels which exceed the upper thresholds thereof as detected by the measuring devices, the controller may cease operation of the conveying system to prevent overfilling.

In an alternate configuration, a series of belt conveyors may be used without actuated gates, wherein if the first conveyor is turned on but the second one is not, the material may be discharged into the first storage compartment, whereas if the second conveyor is turned on but the third conveyor is not, then the material is discharged into the second storage compartment. The conveying system may transport the material for discharge into successive storage compartments in series therewith until discharged into the first compartment system wherein the conveyor system is not operating. The process may be automated by initially filling the first containment area in the row until the measuring devices detect that the first containment area is full, causing the controller to initiate the start of the successive conveyors in the series so that material is conveyed to the next containment area with the same product type along the row. The downstream conveyor in the conveying series may remain inactive until the measuring device associated therewith detects that this next containment area is full, causing the controller to initiate the start of this next conveyor in series so that material is conveyed to the next containment area with the same product type along the row. This operation may continue until all containment areas of that same product type are full. If all containment areas have levels which exceed the upper thresholds thereof as detected by the measuring devices, the controller may cease operation of the conveying system to prevent overfilling.

In some embodiments, the storage system may have sensors which control discharge into secondary equipment. If the containment units within a storage system have multiple discharge controllers, then the sensors on the discharge controllers would distinguish in the PLC and HMI which of the discharge controllers are activated. In some configurations, there may be only one discharge conveyor below the discharge controllers, so sensors may confirm that the discharge controller which would be activated would be limited to the discharge controllers which are positioned over the discharge conveyor. The discharge conveyor may transfer material to secondary equipment or to an additional storage system in series, or to another discharge conveyor which may discharge into secondary equipment.

In some embodiments, if the storage system has only one discharge conveyor below the discharge controllers, and if there are separate discharge controllers which are located parallel to the discharge controllers which are over the discharge conveyor, the discharge conveyor may be repositionable such that an actuator such as a hydraulic cylinder may shuttle the conveyor to the parallel location and discharge as noted above. When used together with downstream secondary equipment such as a blender, a control system may be provided having a main controller which is in communication with each of the containment units in the storage system, the conveying system, and the downstream secondary equipment. More particularly, when each discharge controller is controlled by a respective gate actuator that may variably control the gate opening size and each conveyor is controlled by a respective conveyor motor, all of the gate actuators and the motors are operated under control of the main controller. The main controller may also communicate with the level sensor of the downstream secondary equipment in addition to communicating with additional measuring devices associated with each of the containment compartments within the storage system for measuring the respective level of material within each compartment. Each of the level sensors may include multiple different measuring devices or sensors or an individual measuring device capable of measuring height through an infinite range of heights between the top and bottom of the storage silo.

The controller may be configured to vary the rate of material discharge from the silos and into the secondary equipment such as a blender by varying the gate opening size of any one or more of the discharge controllers of the containment compartments within the storage system which may actively discharge material onto the lower discharge conveyors. The overall discharge rate may be varied by opening additional discharge controllers or increasing the opening size of any one or more discharge controllers which are already opened. In the event that the controller detects that the height of material within the blender falls below a lower threshold, the configuration of the discharge gate may be configured to increase the discharge rate. Likewise, if the level in the blender exceeds an upper limit threshold, the controller may reduce the collective discharge controller gate opening size associated with any discharging containment compartments or may close the discharge controllers entirely. As the rate of discharge from the containment compartments is varied, the controller may operate the discharge conveyors at a constant operating speed, or the operating speed may be varied proportionally to the discharge controller gate opening size of the one or more gates being used for discharging material therefrom.

The system controller may be further connected to conveying system to similarly vary the operating status of the conveying system according to the level status in one or more containment compartments in the storage system. Accordingly, the operation of the conveying system may be shut off if one or more containment units in the storage system reaches a level of material sensed by a respective level sensor which exceeds an upper threshold stored on the controller. Alternatively, the conveying system may resume operation or increase the rate of operation thereof if one of the containment compartments reaches a level of material sensed by a respective measuring device which is below a lower threshold stored on the controller. In further arrangements, if one of the containment compartments being used to discharge material into the blender falls below a lower threshold, the controller may close the discharge controller gate associated therewith and open the discharge controller gate of a different one of the containment compartments having the same material therein so as to maintain an overall discharge rate from the storage system while transferring which containment compartment is used to supply the granular material.

When it is desirable to discharge material from the storage system for use by the downstream equipment, one of the discharge controller gates of a selected one of the containment compartments is opened and the lower discharge conveyors are operated to convey the discharged material to the downstream equipment. It is possible to vary the rate of material being conveyed by simply adjusting the discharge controller gate opening size as described above under control of the main controller. Feedback from the level sensors of the downstream equipment may be used as input to determine the desirable discharge rate from the storage system. As the discharge controller gate opening side is primarily used to control the discharge rate, the lower discharge conveyors may be operated at a fixed rate or at a variable rate as controlled by the controller.

In some embodiments, the discharge conveyor may have a discharge measuring device to measure the amount of material discharged, such as a belt scale, other scaling mechanism, or a measuring mechanism. The discharge measuring device is controlled by the controller, so the Blender Operator may define a desired discharge rate, and the discharge measuring device may automate with the controller to adjust either or both of the opening settings of discharge controller gates and the belt speed of the discharge conveyor. The scales log the information in the PLC which is integrated into the proppant management system so that the consumption information may be used by the proppant management system to inform the algorithms in the automated dispatch system.

Also as described above, each containment compartment in the storage system includes one or more lower discharge conveyors spanning substantially the full length of the base frame in the longitudinal direction. The storage system may be provided with a pair of lower discharge conveyors or with a single lower discharge conveyor. When the storage system contains a pair of lower discharge conveyors, each of the conveyors are controlled separately by the controller, together with the discharge controller gates in the containment compartments of the storage system. Safeguards may be incorporated into the system controller system: use of zero-speed sensors or monitoring of amp draw on conveying equipment in the conveying systems and storage systems to sense whether a conveyor is failing to convey at times in which the PLC and drives are engaged, to prevent events such as material plugging the conveying equipment; when different containment areas of the storage system are designated for storage of different materials therein, the conveyor system determines which material is being conveyed and then the controller may dictate opening only of the inlet gate associated with the containment area or containment areas designated for storage of that material, or in the case of the conveying system wherein loading compartments is facilitated by turning off the next downstream conveyor in a series, then the controller may dictate which compartment to load the material into by stopping the next downstream conveyor in that same series; when the PLC reports a zero-speed condition in the conveying equipment and the conveying equipment is under load from the material, the PLC may turn off that conveyor, and initiate a sudden shutdown sequence which may immediately shutdown all upstream conveying components on both the conveying system or the storage system or storage systems, wherein such information may inform the Proppant Management System 200 in order that it may adjust dispatch as some of the storage compartments may be inaccessible until the Storage Operator confirms that the conveying equipment is repaired; shutdown sequences which are initiated by signals from the measuring devices in containment units in the storage system and which provide a timed sequence to shut down conveying units in the storage system and any convening units which are in the conveying system which may be integrated and controlled in series with the storage system, such that all upstream conveying components are shut down in a timed sequence.

Conveying components within a conveying system and within the storage system may include the following in generality, listed from upstream to downstream, a truck unload conveyor, one or more transfer conveyors, one or more elevating conveyors, and one or more conveyors which discharge into separate storage containment units within the storage system. The shutdown sequence may be set up by the user to react to a high limit condition which could be set such that an entire compartment of a transport truck could still be unloaded into the containment unit before the containment unit would become full, and a type of alarm could signal the Storage Operator that it would be the last compartment of the truck which could be unloaded into that storage system. Once that truck unload conveyor is shut off, it would signal the end of unloading of that truck's compartment, and the storage system would not permit any material to continue to be loaded into that same full containment unit until such time as the measuring device no longer sensed a high limit condition.

If the high limit condition is signaled for a period exceeding a user preference, such as ten minutes, then the signal may be activated again, and all truck unloading equipment may be stopped, and when restarting the conveying equipment following either this event or following a zero-speed condition, the system may firstly restart the conveying component which is conveying into the containment unit, and may then restart each component one at a time in 10 second intervals from downstream to upstream in order to ensure that material does not become plugged anywhere in the system. When restarting the conveying components following the timed shutdown sequence initiated following a high limit condition, the conveying components on either the conveyor system or the storage system may be operable if the material is programmed to load into a containment unit which doesn't have the high limit condition. Unless operated in with a manual override, when two or more discharge controllers are incorporated into the same containment units within the storage system, sensors may determine if the discharge conveyor is in line underneath the discharge controller, and may not permit a discharge controller to be opened unless the discharge conveyor is underneath.

Thus, the present disclosure provides an automated dispatch, ticketing and inventory management system ("AITMS") in which the user defines job parameters such as total material anticipated by material type, anticipated start date, anticipated end date, compartments which the Storage Operator is removing from service, the product in each of the containment compartments in the storage; the percentage of full level that user prefers to manage each containment compartment or product type; the average haul time period, the average load size for each truck; and a "frac design" including total product requirements by material type, expected daily consumption by material type, ideal inventory stocking by material type and the list of labels for each stage of consumption commonly called "frac zones" together with the consumption of each material for each "frac zone", whereupon load assignments as identified on BOL's are automatically generated using algorithms which calculate volume of storage for each product type, ideal storage levels for that product type, anticipated customer daily consumption demand which are updated by Storage Operator at regular intervals, actual consumption from storage, completed "frac zones" and the resulting remaining quantity demand anticipated to complete the job, product inventory in stock, product loaded on BOL's but not yet received, and BOL's which are not yet loaded, the result of which volume is then divided by the transport company's defined load size, whereupon such auto-dispatch BOL system creates BOL's which the system can automatically assign to transport haulers or which a transport dispatcher can manually assign to haulers. Some of the aforementioned information may not require user-defined parameters as it may be collected by the AITMS based on historic information collected from previous or existing projects, such as average loading times at the sand mine, average haul time, including hourly fluctuations for peak hour traffic, average deviation for actual transport unit travel versus third party mapping software anticipates, and average unloading times at wellsite.

In some embodiments, the automated dispatch, ticketing and inventory management system permits the storage system user to input scheduled maintenance dates and times in which no consumption may occur, the system thus factoring in reductions in generation of BOL's in order to ensure that the storage is not filled beyond desired volumes or that transport haulers do not incur waiting time to unload. In some embodiments, the automated dispatch, ticketing and inventory management system permits a user to input an unexpected consumption delay into a field, together with how long the user thinks the delay could be, estimated consumption restart time, such that the auto-dispatch system stops dispatching more BOL's and sends alerts to users and transport dispatchers if there is more product dispatched that may fit in the empty portions of the storage system in order for them to contemplate resolutions to transport haulers waiting onsite.

In some embodiments, the automated dispatch, ticketing and inventory management system provides either the user or the measuring devices on the storage system signal when site conditions are known to be resolving in order for the auto generation of BOL's to restart whereupon the user updates the anticipated consumption requirements. In some embodiments, the automatically generated BOL's can automatically assign a transport hauler to the BOL based on the database of the transport hauler capabilities and capacity and upon which the BOL's have load time and unload times, specific quantity and product type, material supplier information. The automated dispatch, ticketing and inventory management system automatically determines the actual job locations associated with the virtual job locations, and automatically selects suitable transport unit(s) from the Transport Carriers to handle each job request; an automated dispatch, ticketing and inventory management system of the present invention which is used to manage, control and monitor job requests for a fleet of transport units; an automated dispatch, ticketing and inventory management system which obtains GPS coordinates for the delivery location and all supplier locations, and uses both third party GPS systems as well as ongoing actual performance calculated by the automated dispatch, ticketing and inventory management system based on historic loads in order to plan optimal routing together with transport time for various time periods in order to adjust load and unload times on the BOL in accordance with anticipated peak or non-peak hourly calculations; an automated dispatch, ticketing and inventory management system which frequently updates with GPS systems to update traffic or weather delays which may impact the distance or duration of the haul between the supplier and the destination, using such information to informing loading and unloading times associated with BOL's; an automated dispatch, ticketing and inventory management system which factors in calculations for the quantity of off-highway miles together with average travel speed in order to determine load and delivery times for the BOL's; an automated dispatch, ticketing and inventory management system which obtains average loading times at each supplier location based on historic performance within a set period, and factors the same into the BOL's assigned by the automated dispatch, ticketing and inventory management system; an automated dispatch, ticketing and inventory management system which obtains average dwell time for delivery at the destination for each delivery point, and factors the same into the BOL's assigned by the automated dispatch, ticketing and inventory management system; an automated dispatch, ticketing and inventory management system which can include an API link to the inventory tracking system at the material supplier in order to enhance the efficiency of the automation for BOL's; and an automated dispatch, ticketing and inventory management system which monitors transport units and identifies events wherein queues build anywhere along the routing including at material suppliers, at the destination or because of traffic enroute, and amends dispatch orders to ensure the optimal supply of material to destination.

In some embodiments, when the AITMS automatically selects a transport unit from the fleet to handle the job request based on whether the status profile, the configuration profile, or both the status profile and the configuration profile, indicate that the current status and/or the current configuration for the selected transport unit is compatible with the job request. The current status may be judged "compatible" with the current job request, for example, if the status profile for the selected transport unit shows that the current status of the selected transport unit is "available for dispatch" and "not currently performing another assigned job request." On the other hand, the current status of the a transport unit may be judged to be "incompatible" with the job request when the status profile indicates that the transport unit's configuration does not match the job request, or when the job request cites a payload which is higher than the job request. Similarly, in specific embodiments of the job management system, the AITMS could determine, based on the current configuration profile for the selected transport unit, that the selected transport unit has a current configuration that is compatible with the job request. The current configuration may be judged to be "compatible" with the job request when the configuration profile for the selected transport unit indicates, for example, that the selected transport unit is "available for dispatch", the transport unit's configuration matches the job request, when the job request cites a payload which is the same as the transport unit, the transport unit has the proper equipment, the proper size and weight, and/or the proper characteristics and capabilities to handle both traveling to the actual job location and carrying out the job operation in the job request.

In some embodiments, the automated dispatch, ticketing and inventory management system includes a memory; a microprocessor coupled to the memory; integration to an online mapping system to plot the routing for the transport unit(s) corresponding to the physical environment; a AITMS that operates cooperatively with the microprocessor and the memory to either autonomously select or to permit human selection of a specific transport unit from the fleet and to determine an actual job location associated with the request, all in accordance with the map, and a network interface device to transmit one or more commands to the selected transport unit; the map which also defines a set of virtual job locations, each virtual job location representing an actual job location in the physical environment; the memory which also contains a status profile and a configuration profile for each transport unit, in which the status profile may comprise a file or data structure stored in the memory that includes records and/or fields suitable for holding and/or indicating one or more of a wide variety of different current status values or conditions for each mobile transport unit in the fleet, including without limitation the following: a transport unit identifier; a transport unit position; a current transport unit speed; a current job identifier; a current job status; a current job location; a proximity to material supplier location; a proximity form material supplier location to the job location; a proximity to the current job location; a current job destination path; an estimated time of arrival; an estimated time of departure; a transport unit idle time; a transport unit performance level; a transport unit payload status; and/or a transport unit payload error condition; the configuration profile which may comprise a file or data structure stored in the memory that includes records and/or fields suitable for holding and/or indicating one or more of a wide variety of different current configurations for each transport unit in the fleet, including the following: a material handling configuration; a maximum payload capability; a maximum drive speed; a maximum height; a minimum height; a location restriction; a zone restriction; a forbidden operation; a permitted operation; and/or a minimum clearance requirement.

In some embodiments, the automated dispatch, ticketing and inventory management system generates a BOL instruction which, when accepted by the selected transport unit, may cause the selected transport unit to be dispatched to the material supplier in accordance with the assigned loading time, and then drive to the job location as defined by the map, and which automated dispatch, ticket and inventory management system automatically selects a transport unit from the fleet to handle the job request based on whether the status profile, the configuration profile, or both the status profile and the configuration profile, indicate that the current status and/or the current configuration for the selected transport unit is compatible with the job request.

In some embodiments, the automated dispatch, ticketing and inventory management system manages live-time status profile updates and/or configuration profile updates for the selected transport unit, as well as for every transport unit in the fleet. In other embodiments, the automated dispatch, ticketing and inventory management system automatically selects a driver to handle the job request. In some embodiments, the automated dispatch, ticketing and inventory management system has a mechanism to confirm "acceptance" by the transport carrier, such that the BOL remaining with a status "pending acceptance" until the dispatcher "accepts" the BOL and either assigns the transport unit or permits the automated dispatch, ticketing and inventory management system to automatically assign the transport unit and wherein the automated dispatch, ticketing and inventory management system permits the master user to stipulate the amount of time within which the dispatcher at the transport fleet to accept the BOL before the automated dispatch, ticketing and inventory management system would instead retract the BOL and reassign it to another transport carrier.

In some embodiments, the automated dispatch, ticketing and inventory management system receives an alert indicating that no transport unit in the fleet is available to handle the job request may then either select transport units from alternate transport fleets or may automatically delay selecting a transport unit from the transport fleet to handle the job request until a transport unit from the fleet becomes available. In some embodiments, the automated dispatch, ticketing and inventory management system automatically generates alerts and sends those alerts to the dispatcher and Storage Operator when any transport unit is delayed at either the loading point or at destination, so that the dispatcher and Storage Operator can intervene with the situation.

In some embodiments, the automated dispatch, ticketing and inventory management system permits the Customer to determine if it may specify which one or more loading locations from which the material supply may be derived, thus permitting selection of a plurality of suppliers, or a plurality of supply locations from the same material supplier, wherein in the event that supply is intended to be completed from a plurality of supplier locations, the user specifies in the project parameters whether a fixed tonnage per day which may be sourced from supply location #1, supply location #2 and so forth until all supply locations are specified and until the entire anticipated daily consumption would be calculated to be fulfilled, each of the foregoing being calculated by material type; or whether percentages of each material type which may be assigned for dispatch from supply location #1, supply location #2 and so forth until the full daily consumption is fulfilled, together with a stipulated maximum daily tonnage for each supply location; or whether material supply would be determined by setting preference by proximity or pricing, together with maximum daily volume for each supply location.

In some embodiments, the automated dispatch, ticketing and inventory management system alerts the Storage Operator and Customer if the system determines that one of the materials may deplete faster than it can be replenished, such as if the supply source for that material involves a long haul route or if the supply of that material is limited in its supply and such limitation may affect the supply to the project, thus permitting the Storage Operator or Customer to determine if it may accept similar material from another supply source or whether it may adjust the blend of the materials being discharged to Customer's downstream equipment to include a higher discharge of the alternate material, thereby updating the automated dispatch of BOL's accordingly.

In some embodiments, the automated dispatch, ticketing and inventory management system creates databases and detailed receiving logs from each BOL including which storage area or areas the product was loaded into and what time the truck was unloaded so that the database log for transport unload times are used to calculate potential transport unit demurrage and used to factor into algorithms for transport efficiencies and dispatch requirements. In other embodiments, the automated dispatch, ticketing and inventory management system performs operations in which the Storage Operator inputs live-time changes on the daily demand, such as material quantity desired during the shift, the next shift, or for further periods of time, whereupon the system predicts storage replenishment requirements based on the most updated information about customer consumption, and whereupon the system which uses storage volume measuring devices and devices which calculate discharge volumes to determine actual consumption versus a user-input planned consumption per customer interval, upon which the system adjusts total remaining consumption by product type once the Blender Operator identifies each interval consumption as having been completed, all of which results of such algorithms calculate and automatically refreshes totals to complete, and dispatch and inventory planning generated from the system are automatically adjusted.

In some embodiments, the automated dispatch, ticketing and inventory management system calculates when inventory is escalating based on delivery times of trucks and when inventory is declining based on the most updated information about customer demand. The same system which monitors consumption of the stored products, whether by human interface, or by using measuring devices which monitor consumption of the stored goods, such as a system in which users input planned consumption intervals, and compare planned consumption versus actual upon which the system adjusts total remaining consumption by product type once the Blender Operator identifies each interval as completed. Such mechanisms calculate and automatically refresh totals to complete, and dispatch and inventory planning generated from the system are automatically adjusted.

In some embodiments, the automated dispatch, ticketing and inventory management system performs operation in which when transport hauler enters a geofenced area at storage system location, BOL shows up in a queue on the Storage Operator's HMI, and when the Storage Operator is ready to unload the material, either the automated dispatch, ticketing and inventory management system may use cameras and IoT sensors to identify the transport unit and the associated BOL or the Storage Operator can select any of the BOL's which are showing as being on the location or the Storage Operator can scan a unique identifying code such as a bar code or QR code from the BOL on the transport unit driver's app, whereupon the Storage Operator selects which containment compartment to which the material may fill and only in the event the material on the BOL matches the product type assigned to the storage area, whereupon the HMI may permit the Storage Operator to unload the material unless a manual override is provided, notwithstanding the user is able to input into a control field to remove any of the containment compartments from either loading into or discharging from. This integration with the machine controls of handling and storage equipment serves to prevent cross-contamination by preventing loading materials into wrong storage compartments.

In some embodiments, the automated dispatch, ticketing and inventory management system together with integrated handling and storage system controls including: User-defined product type for each of the containment compartments together with preferred fill levels, such that the PLC uses information from measuring devices to identify live stocking levels in each storage area and permits auto-selection for unloading materials into containment compartments based on user-defined preferences; Autonomous storage discharge system wherein the user defines in the PLC what product or products are to be discharged simultaneously from one or a plurality of containment compartments, and at what rate per product, whereupon the rate per product can be controlled with measuring devices such as belt scales or with automation programming for discharge actuators programmed to certain percentages open to regulate discharge at certain discharge rates notwithstanding the user can remove one or more containment compartments from use, whereupon the PLC identifies all the active containment compartments which contain the specified product and discharges in accordance with user-defined preferences. Alternatively, the Storage Operator may also set the PLC controls to control select preferred compartments to load into based on the compartments not being simultaneously discharged from.

In some embodiments, the automated dispatch, ticketing and inventory management system is integrated with either or both of storage system and conveying system, and may additionally be integrated to downstream secondary equipment, all of which are collectively operated by the main controller to enable filling the storage system with material from the transport trucks to enable on-demand discharging of the material from the storage system into the downstream secondary equipment.

In some embodiments, the automated dispatch, ticketing and inventory management system is operated such that the material is discharged by transport units into the conveying system, which transports the material into either the inlet of a containment compartment in the storage system or to the end of conveyors used to load the various containment compartments of a storage system wherein if the first storage containment is desired to be filled, then such gate would be in an opened position so that material conveyed by the conveyor system may discharge through the open gate into that containment area. Alternatively, if the gate is closed, material may be conveyed using conveying equipment in the storage system to the next available open gate, in which if all the gates of the upper conveyor of a first storage system are closed, the conveying units in the storage system may discharge the material from the outlet end thereof into the inlet hopper of the next storage system in series therewith. The process may be automated by initially filling the first containment area in the row until the measuring devices detect that the first containment area is full, causing the controller to close the inlet gate associated therewith and instead convey that to the next containment area with the same product type along the row, which method is repeated until all containment compartments for that product line are filled to upper thresholds. If all containment areas have levels which exceed the upper thresholds thereof as detected by the measuring devices, the controller may cease operation of the conveying system to prevent overfilling.

In some embodiments, the automated dispatch, ticketing and inventory management system operates such that the material is discharged by transport units into the conveying system, which transports the material into a series of conveyors conveying into separate storage compartments, in which the material would convey along the series until it reaches a conveyor which is not operating wherein instead the material would discharge into the storage compartment below, such that the selection process is controlled by machine controls which stop downstream conveying equipment beyond the desired storage compartment. The process may be automated by initially filling the first containment area for the specified material in the row until the measuring devices detect that the first containment area is full, causing the controller to close the inlet gate associated therewith and instead convey that to the next containment area with the same product type along the row, which method is repeated until all containment compartments for that product line are filled to upper thresholds. If all containment areas have levels which exceed the upper thresholds thereof as detected by the measuring devices, the controller may cease operation of the conveying system to prevent overfilling.

In some embodiments, the automated dispatch, ticketing and inventory management system operates such that the sensors control discharge into downstream secondary equipment such as a blender, a control system is typically provided having a main controller in communication with each of the containment compartments, conveying components and the downstream secondary equipment, such that each discharge controller is controlled by a respective gate actuator that can variably control the gate opening size and each conveyor is controlled by a respective conveyor motor, all of the gate actuators and the motors are operated under control of the main controller. The main controller may also communicate with the level sensor of the downstream secondary equipment and with additional measuring devices associated with each of the containment compartments simultaneously in order to use the main controller to vary the rate of material discharged from the containment compartments into the secondary equipment such as a blender by varying the gate opening size of any one or more of the discharge controllers of the containment compartments which are actively discharging material onto the lower discharge conveyors. The overall discharge rate can must be varied by opening additional discharge controllers or increasing the opening size of any one or more discharge controllers which are already opened. In the event that the controller detects that the height of material within the blender falls below a lower threshold, the configuration of the discharge gate can be configured to increase the discharge rate. Likewise, if the level in the blender exceeds an upper limit threshold, the controller may reduce the collective discharge controller gate opening size associated with any discharging containment compartments or may close the discharge controllers entirely. As the rate of discharge from the containment compartments is varied, the controller may operate the discharge conveyors at a constant operating speed, or the operating speed may be varied proportionally to the discharge controller gate opening size of the one or more gates being used for discharging material therefrom.

In some embodiments, the automated dispatch, ticketing and inventory management system operates such that unless the Storage Operator overrides the automatic selection described herein, the system selects which storage compartment to discharge from in order to fill the Customer's downstream equipment in order to avoid human error in selection of material to discharge to the Customer's downstream equipment, such that the Storage Operator informs the AITMS or HMI what product(s) the customer wants discharged into the Customer's downstream equipment together with an approximate discharge flow rate per product, and the system identifies each storage compartment containing the required product(s) together with the volume each compartment contains; the Storage Operator is able to "lock out" one or more actuators which would remove the same actuators form consideration for discharge until the "locks" were removed by the Storage Operator; the AITMS looks for the compartment which has user-defined preferences for unloading, such as containing the highest volume of that particular product type or a preference not to discharge from a storage compartment at the same time as the compartment was having material loaded into it, and the AITMS may then select that compartment to discharge from, provided however that unless a compartment is locked out, a compartment may be discharged from even if it were not a preferred discharge configuration in the event that it was the only remaining option for discharge in Customer's downstream equipment; and the AITMS controls switching discharge from the storage compartment currently discharging into the Customer's downstream equipment to discharge from another storage compartment containing the same material when the first storage compartment is depleting.

In some embodiments, the automated dispatch, ticketing and inventory management system operates such that the system controller may be connected to conveying system which is responsive to the measuring devices in one or more containment compartments in the storage system, and the conveying system can be shut off if one or more containment units in the storage system reaches a level of material sensed by a respective level sensor which exceeds an upper threshold stored on the controller. Alternatively, the conveying system can resume operation or increase the rate of operation thereof if one of the containment compartments reaches a level of material sensed by a respective measuring device which is below a lower threshold stored on the controller.

In some embodiments, the automated dispatch, ticketing and inventory management system is such that if one of the containment compartments being used to discharge material into the Customer's downstream equipment, such as a blender, falls below a lower threshold, the controller may close the discharge controller gate associated therewith and open the discharge controller gate of a different one of the containment compartments having the same material therein so as to maintain an overall discharge rate from the storage system while transferring which containment compartment is used to supply the granular material.

In some embodiments, the automated dispatch, ticketing and inventory management system operates such that discharge of material from the storage system may be directed into downstream equipment using one or more of the discharge controller gates of one or more containment compartments and one or more lower discharge conveyors, and such delivery rate of material being conveyed may be simply adjusted by either adjusting the discharge controller gate opening size under control of the main controller or adjusting the belt speed for the lower discharge conveyor, or a combination of both, as controlled by the controller. The discharge conveyor can be equipped with a discharge measuring device such as a belt scale or a measuring mechanism to determine the amount of material discharged, which is controlled by the controller, enabling the Blender Operator to define a desired discharge rate which can be autonomously performed.

In some embodiments, the automated dispatch, ticketing and inventory management system incorporates safeguards into the system controller system: use of zero-speed sensors or monitored amp draw on conveying equipment in the conveying systems and storage systems to sense conveyor failure to prevent events such as material plugging the conveying equipment; when different containment areas of the storage system are designated for storage of different materials therein, the controller prevents loading of the wrong material into the inlet gate of a containment compartment associated with a different product type; when the PLC reports a zero-speed condition in the conveying equipment and the conveying equipment is under load from the material, the PLC may immediately turn off that conveyor, and initiate a sudden shutdown sequence which may immediately shutdown all downstream conveying components on both the conveying system or the storage system or storage systems; when restarting the conveying equipment following a shutdown sequence or following a zero-speed condition, the system may firstly restart the conveying component which is conveying into the containment compartment, and may then restart each component one at a time in 10 second intervals from upstream to downstream in order to ensure that material does not become plugged anywhere in the system; shutdown sequences which are initiated by signals from the measuring devices in containment units in the storage system and which provide a timed sequence to shut down conveying units in the storage system and any convening units in the conveying system which are controlled in series with the storage system, such that all upstream conveying components are shut down in a timed sequence. The shutdown sequence may be set up by the user to react to a high limit condition which could be set to still permit an entire compartment of a transport truck to be unloaded into the containment compartment before the containment compartment would become full, when upon a type of alarm could signal the Storage Operator that it would be the last compartment of the truck to be unloaded into that containment compartment. Upon the earlier of the truck unload conveyor being disengaged or a defined period of time, the storage system would not permit any additional material to continue to be loaded into that same full containment unit until such time as the measuring device no longer sensed a high limit condition. When restarting the conveying components following the timed shutdown sequence initiated following a high limit condition, the conveying components on either the conveyor system or the storage system may only be operable if the material is programmed to load into a containment unit which doesn't have the high limit condition; unless operated in with a manual override, when two or more discharge controllers are incorporated into the same containment units within the storage system, sensors may determine if the discharge conveyor is in line underneath the discharge controller, and may not permit a discharge controller to be opened unless the discharge conveyor is underneath.

In some embodiments, the shutdown sequencing may include a high limit shutdown sequence such that a particular silo may send a signal that the silo is getting full by tripping a high limit sensor. In some embodiments, the high limit sensor may be set up to up to give between 15 and 30 tons notice prior to a full condition, so that the entire hopper of the truck may finish being unloaded before the bin gets full. A bin level sensor may indicate that the silo is within 30 tons of being full. Sequence actions: an audible alarm may go off so Storage Operator is alerted that it is the "last hopper" that can be unloaded into that bin; once that Truck unload conveyor is shut off (within 10 minutes or as the Bin Level Sensor tells it to shut off), then the system won't allow sand to be loaded into that silo until the High Limit Sensor is no longer triggered; shut down all the components listed in "shutdown equipment" starting with #1 and going through the list, turning them off in 10 second intervals; when restarting the "shutdown equipment" after a high limit shutdown sequence, restart the components only once the components may be loading into a Bin which doesn't have the High Limit Sensor triggered, and which a Bin Level Sensor is indicating that that new bin has in excess of 20 tons of capacity to load into. At that point, components may be restarted as per the normal programming.

If the Bin Level Sensor indicates the bin is at a level of 10 tons from being full prior, and the Storage Operator has not shut off the Truck Unload Conveyor, then the audible alarm may be activated until the "shutdown equipment" stop sending any material to that same bin. An immediate shut down may be initiated on the Truck Unloader equipment so it stop sending sand to that bin.

A sudden shutdown sequence may be triggered when a zero speed sensor on any conveyor triggers a zero speed when the PLC thinks it was supposed to be turning (including any conveyors on the elevator unit). The "shutdown equipment" may be shut down which are upstream of the equipment with the Zero Speed issue. In other words, if the 3rd top conveyor, then items #1 to #5 of the following list may be shut down:
1. Truck unload conveyor
2. Main conveyor
3. Elevator which feeds that line (either line A or B)
4. 1st Top Conveyor
5. 2nd Top Conveyor
6. 3rd Top Conveyor
7. 4th Top Conveyor
8. If multiple systems are daisy-chained, then it could be #5-8,5 or #9-12, or #13-16 etc.

When restarting the "shutdown equipment" after a sudden shutdown sequence, restart the component which had the Zero Speed Sensor failure, and once it is confirmed to be operating, then restart each component one at a time in 10 second intervals.

Shutdown equipment may include a list of conveyors from upstream to downstream (in some embodiments, one set of silos may have 2 lines of either of the below conveyor systems, so either 8 top conveyors or 2 auger/drag conveyors):

Systems with cascading jump conveyors on top: (1) Truck unload conveyor; (2) Main conveyor; (3) Elevator which feeds that line (either line A or B); (4) 1st Top Conveyor; (5) 2nd Top Conveyor; (6) 3rd Top Conveyor; (7) 4th Top Conveyor; and (8) If multiple systems are daisy-chained, then it could be #5-8,5 or #9-12, or #13-16 etc.

Systems with multi-discharge conveyor on top (ie: auger conveyor or drag conveyor) may include (1) Truck unload conveyor; (2) Main conveyor; (3) Elevator which feeds that line (either line A or B); (4) 1st Top Conveyor; and (5) If multiple systems are daisy-chained, then it could be #2, #3, #4 etc.

In some embodiments, the automated dispatch, ticketing and inventory management system is operated such that user-defined alerts are sent out to user-defined recipients based on exceptions to planned optimal operations, to which the alert recipient can then manually intervene to resolve if desired, for conditions defined by the user in the controller, such as a transport hauler who arrives or leaves geofenced areas later than expected, or storage system volumes which reach low or high limit thresholds.

In some embodiments, the automated dispatch, ticketing and inventory management system is a preventative maintenance planning system in which transport units or the storage system can be managed to permit scheduled maintenance into the planning to increase operational efficiency by decreasing downtime associated with lack of maintenance and also by ensuring automated dispatch creates BOL's around scheduled maintenance periods for the storage system or transport units, wherein it predicts downtime requirements and sets alerts to transport carriers or Storage Operators advising of the needed maintenance, and adjusts the creation of BOL's to plan for such fluctuation in either the storage system operating time or the operating time of any of the transport units; preventative maintenance planning for the storage system in which the automated dispatch, ticketing and inventory management system logs the run hours of each of the motors and the Storage Operator can assign the "lead time" it wants alerts to be created in advance of the impending maintenance, whereupon when the maintenance is completed, the Storage Operator logs the completion of the maintenance, at which time the trigger may reset to calculate the next scheduled maintenance; and each transport carrier can create a checklist for each transport unit type for preventative maintenance complete with scheduled frequencies most typically calculated by mileage, whereupon the transport carrier can permit the GPS on the transport unit to continually update the mileage or can enter such mileage manually or through an API, and then the transport carrier can assign the "lead time" it wants alerts to be generated in advance of the impending maintenance in order that when the maintenance is completed, the transport carrier can log the completion of the maintenance, at which time the trigger may reset to calculate the next scheduled maintenance.

In some embodiments, system integration of the inventory and dispatch systems to the storage systems and conveying systems may be such that: the AITMS interfaces with the PLC and HMI of the storage system; the Storage Operator provides a specification for each storage compartment determining which material may be contained therein; each storage compartment has level sensors which interface with the PLC, HMI and AITMS in order to function with the automated dispatching features of the AITMS and to additionally interface with controls setup to interlock and stop upstream conveying systems in the event that the compartment is approaching full load, one component may be assigned as the master controller; if a conveying system is selected as the master controller, then an unlimited number of storage systems can be added to conveying system, together with system labelling convention which permits each to be assigned unit numbers and storage area numbers or similar; if there are more than one conveying system, then each of the conveying systems would be the master controllers for the storage systems which are integrated to operate with the conveying system, creating effectively two or more master controllers; a storage system could run independently without a conveying system and could be assigned as the master controller, and could have countless additional storage units attached thereto and controlled by the master controller. In some embodiments, a priority may be assigned such that an elevator is the Master and a silo may run independently without an Elevator if customer uses their own conveyor (e.g., upon adding an external PLC).

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
   a plurality of silos located at a wellsite, each of the plurality of silos comprising a sensor to sense a proppant level of proppant stored therein; and
   a proppant management system comprising:
   a memory having computer-readable instructions stored therein; and
   a processor that executes the computer-readable instructions to:
   determine, based on sensor data received from the sensor of one or more of the plurality of silos, the proppant level within at least one of the plurality of silos;
   determine an amount of proppant that is expected to become available at the wellsite to be added to the plurality of silos;
   compute a total amount of available proppant based on the proppant level within the at least one of the plurality of silos and the amount of proppant that is expected to become available;
   predict a total amount of needed proppant for a fracking operation;
   compute an amount of additional proppant needed for completing the fracking operation based on the total amount of available proppant and the total amount of needed proppant;
   automatically request a proppant carrier to send the amount of additional proppant from a supplier site to the wellsite; and
   automatically select one or more of the plurality of silos to unload the amount of additional proppant into, wherein the automatic selection of the one or more of the plurality of silos is based upon the proppant level in each of the plurality of silos at the time of unloading the amount of additional proppant and at least one of a user preference parameter or historical data from a previous fracking operation.

2. The system of claim 1, wherein the user preference parameter defines that the amount of additional proppant is to be loaded into a silo of the plurality of silos having a lowest proppant level, and wherein the processor:
compares the proppant level in each of the plurality of silos to determine the silo having the lowest proppant level; and
requests unloading of the amount of additional proppant into the silo having the lowest proppant level.

3. The system of claim 1, wherein the user preference parameter defines that a silo of the plurality of silos cannot receive the amount of additional proppant while discharging the proppant previously stored therein at the same time, and wherein the processor:
identifies a subset of the plurality of silos that contain a same proppant type and that are not discharging the proppant previously stored therein at the time of unloading the amount of additional proppant; and
selects the one or more of the plurality of silos from the subset of the plurality of silos that contain the same proppant type and that are not discharging the proppant stored therein, and have a lowest proppant level to receive the amount of additional proppant.

4. The system of claim 1, wherein the processor:
receives an indication to override the user preference parameter;
upon receiving the indication to override the user preference parameter, receives another indication that identifies the one or more of the plurality of the silos to unload the amount of additional proppant into; and
requests unloading of the amount of additional proppant into the one or more of the plurality of silos based on the another indication.

5. The system of claim 1, wherein the processor monitors the proppant level in each of the plurality of silos such that:
upon the proppant level in a first silo of the plurality of silos reaching a first low proppant level, the processor automatically modifies a discharge rate for discharging the proppant from the first silo, wherein the first low proppant level and the discharge rate are based on the user preference parameter;
upon the proppant level in the first silo reaching a second low proppant level, halting the discharging of the proppant from the first silo for a predetermined time period, wherein the second low proppant level and the predetermined time period are based on the user preference parameter; and
upon halting the discharge rate from the first silo, the processor automatically starts discharge from a second silo of the plurality of silos.

6. The system of claim 1, wherein to request the amount of additional proppant, the processor:
generates a load number;
identifies a type of proppant that is needed;
determines a quantity of the proppant that is needed;
identifies a supplier to supply the proppant that is needed; and
sends the load number, the type of proppant that is needed, the quantity of proppant that is needed, and the identity of the supplier-to a carrier portal.

7. The system of claim 1, wherein the processor determines the amount of proppant that is expected to become available based upon a first amount of proppant that is waiting to be unloaded into the plurality of silos, a second amount of proppant that is enroute, and a third amount of proppant for which a previous order was placed.

8. The system of claim 1, wherein the processor predicts the total amount of needed proppant for the fracking operation based on past consumption of the proppant during the fracking operation.

9. The system of claim 1, wherein the proppant management system is configured to monitor the proppant level at a plurality of fracking wellsites.

10. The system of claim 1, wherein the user preference parameter comprises a permission level for each user of the proppant management system, and wherein the processor allows each of the users access to at least a portion of the proppant management system based upon the permission level for that user.

11. A method comprising:
determining, by a proppant management system, a proppant level within at least one of a plurality of silos located at a wellsite, wherein the proppant level is determined based upon sensor data received from a sensor mounted at each of the plurality of silos;
determining, by the proppant management system, an amount of proppant that is expected to become available to be added to the plurality of silos;
computing, by the proppant management system, a total amount of available proppant based on the proppant level within the at least one of the plurality of silos and the amount of proppant that is expected to become available at the wellsite;
predicting, by the proppant management system, a total amount of needed proppant for a fracking operation;
computing, by the proppant management system, an amount of additional proppant needed for completing the fracking operation based on the total amount of available proppant and the total amount of needed proppant;
automatically requesting, by the proppant management system, a proppant carrier to send the amount of additional proppant from a supplier site to the wellsite; and
automatically selecting, by the proppant management system, one or more of the plurality of silos to unload the amount of additional proppant into, wherein the automatic selection of the one or more of the plurality of silos is based upon the proppant level in each of the plurality of silos at the time of unloading the amount of additional proppant and at least one of a user preference parameter or historical data from a previous operation.

12. The method of claim 11, wherein the user preference parameter defines that the amount of additional proppant is to be unloaded into a silo of the plurality of silos having a lowest proppant level, and wherein the method comprises:
comparing, by the proppant management system, the proppant level in each of the plurality of silos to determine the silo having the lowest proppant level of a same proppant type; and
requesting, by the proppant management system, to unload the amount of additional proppant in the silo having the lowest proppant level.

13. The method of claim 11, wherein the user preference parameter defines that a silo of the plurality of silos cannot receive the amount of additional proppant while discharging the proppant previously stored therein at the same time, and wherein the method comprises:

identifying, by the proppant management system, a subset of the plurality of silos that store a same proppant type and that are not discharging the proppant previously stored therein at the time of unloading the amount of additional proppant; and selecting, by the proppant management system, the one or more of the plurality of silos from the subset of the plurality of silos that store the same proppant type and that are not discharging the proppant stored therein, and have a lowest proppant level to receive the amount of additional proppant.

14. The method of claim 11, further comprising determining, by the proppant management system, the amount of proppant that is expected to become available based upon a first amount of proppant that is waiting to be unloaded into the plurality of silos, a second amount of proppant that is enroute, and a third amount of proppant for which a previous order was placed.

15. The method of claim 11, further comprising:
overriding, by the proppant management system, the user preference parameter based on a first indication for selecting the one or more of the plurality of silos for loading the amount of additional proppant; and
selecting, by the proppant management system, a silo from the plurality of silos to load the amount of additional proppant based upon a second indication received after the first indication.

16. The method of claim 11, further comprising:
adding, by the proppant management system, a transport carrying the amount of additional proppant to a load queue upon the transport arriving at a supplier site; and
verifying, by the proppant management system, order information provided by a driver of the transport with an order that was created before selecting the one or more of the plurality of silos to load the amount of additional proppant into when the transport is on a loading platform in accordance with the load queue.

17. A non-transitory computer-readable media comprising computer-readable instructions stored thereon that when executed by a processor of a proppant management system cause the processor to:
determine a proppant level within at least one of a plurality of silos located at a wellsite, wherein the proppant level is determined based upon sensor data received from a sensor mounted at each of the plurality of silos;
determine an amount of proppant that is expected to become available to be added to the plurality of silos;
compute a total amount of available proppant based on the proppant level within the at least one of the plurality of silos and the amount of proppant that is expected to become available at the wellsite;
predict a total amount of needed proppant for a fracking operation;
compute an amount of additional proppant needed for completing the fracking operation based on the total amount of available proppant and the total amount of needed proppant;
automatically request a proppant carrier to send the amount of additional proppant from a supplier site to the wellsite; and
automatically select one or more of the plurality of silos to load the amount of additional proppant into, wherein the automatic selection of the one or more of the plurality of silos is based upon the proppant level in each of the plurality of silos at the time of loading the amount of additional proppant and at least one of a user preference parameter or historical data from a previous operation.

18. The non-transitory computer-readable media of claim 17, wherein the user preference parameter defines that the amount of additional proppant is to be loaded into a silo of the plurality of silos having a lowest proppant level and that is not discharging the proppant previously stored therein at the same time.

19. The non-transitory computer-readable media of claim 17, wherein a first portion of the amount of additional proppant is loaded into a first silo of the plurality of silos and a second portion of the amount of additional proppant is loaded into a second silo of the plurality of silos.

20. The non-transitory computer-readable media of claim 17, wherein the processor predicts the total amount of needed proppant for the fracking operation based on past consumption of the proppant during the fracking operation.

21. The non-transitory computer-readable media of claim 17, wherein the processor determines the amount of proppant that is expected to become available based upon a first amount of proppant that is waiting to be unloaded into the plurality of silos, a second amount of proppant that is enroute, and a third amount of proppant for which a previous order was placed.

22. The non-transitory computer-readable media of claim 17, wherein the processor receives a timeline of when no consumption of the proppant is to occur, and wherein the processor postpones the request for the amount of additional proppant by an amount of time based upon the timeline.

23. The non-transitory computer-readable media of claim 22, wherein the timeline comprises a maintenance day and time.

24. The non-transitory computer-readable media of claim 22, wherein the timeline comprises an input of how long the consumption is expected to be delayed and an estimated restart time of the consumption.

25. The non-transitory computer-readable media of claim 24, wherein the amount of time by which the request for the amount of additional proppant is postponed is based upon the estimated restart time.

26. The non-transitory computer-readable media of claim 17, wherein the processor automatically assigns a carrier upon requesting the amount of additional proppant for carrying the additional proppant, and associates the carrier with an order.

27. The non-transitory computer-readable media of claim 26, wherein the processor automatically assigns a transport of the carrier to carry the amount of additional proppant based upon a configuration of the transport.

28. The non-transitory computer-readable media of claim 26, wherein the processor allows the carrier to select one of a plurality of pre-approved suppliers for supplying the amount of additional proppant.

29. The non-transitory computer-readable media of claim 17, wherein the processor determines a delivery time of the amount of additional proppant based upon at least one of a travel distance that a transport carrying the amount of additional proppant has to travel, an average dwell time, and traffic conditions.

* * * * *